US012726248B2

(12) United States Patent
Huang et al.

(10) Patent No.: US 12,726,248 B2
(45) Date of Patent: Sep. 1, 2026

(54) METHOD AND APPARATUS FOR PERFORMANCE MONITORING IN A WIRELESS COMMUNICATION SYSTEM

(71) Applicant: ASUS Technology Licensing Inc., Taipei City (TW)

(72) Inventors: Chun-Wei Huang, Taipei City (TW); Li-Chih Tseng, Taipei City (TW); Meng-Hui Ou, Taipei City (TW); Cheng-Hsiu Chen, Taipei City (TW)

(73) Assignee: ASUS Technology Licensing Inc., Taipei City (TW)

( * ) Notice: Subject to any disclaimer, the term of this patent is extended or adjusted under 35 U.S.C. 154(b) by 0 days.

(21) Appl. No.: 19/431,737

(22) Filed: Dec. 23, 2025

(65) Prior Publication Data

US 2026/0189282 A1 Jul. 2, 2026

Related U.S. Application Data

(60) Provisional application No. 63/740,292, filed on Dec. 30, 2024, provisional application No. 63/748,408, filed on Jan. 22, 2025.

(51) Int. Cl.
*H04W 4/00* (2018.01)
*H04B 7/06* (2006.01)
(Continued)

(52) U.S. Cl.
CPC ....... *H04B 7/0626* (2013.01); *H04B 7/06952* (2023.05); *H04B 17/328* (2023.05); *H04W 24/10* (2013.01)

(58) Field of Classification Search
CPC .............. H04B 7/0626; H04B 7/06952; H04B 17/328; H04W 24/10; H04W 28/04;
(Continued)

(56) References Cited

U.S. PATENT DOCUMENTS

2022/0417776 A1* 12/2022 Manolakos ........... H04L 5/0048
2024/0113794 A1* 4/2024 Jeon ..................... H04B 17/373
2025/0047331 A1* 2/2025 Abebe ................. H04B 7/0417

FOREIGN PATENT DOCUMENTS

CN 120434687 A * 8/2025 ............ H04W 24/10
WO 2024168724 A1 8/2024
WO 2024198452 A1 10/2024

OTHER PUBLICATIONS

Nokia; Summary of the discussion concerning the NR_AIML_air draft CR for Release 19; 3GPP TSG RAN WG1 Meeting #121; R1-25xxxxx; May 19-23, 2025; 6 pages.

(Continued)

*Primary Examiner* — Phuongchau Ba Nguyen
(74) *Attorney, Agent, or Firm* — Skaar Ulbrich Macari, P.A.

(57) ABSTRACT

A method of a User Equipment (UE) comprises being configured with a first Channel State Information (CSI)-ReportConfig associated with prediction and a second CSI-ReportConfig associated with performance monitoring, generating one prediction report, associated with the first CSI-ReportConfig, providing prediction results associated with a first number of time instances for prediction, performing measurement on at least one time instance of a third Reference Signal (RS) set, determining one performance metric based on at least whether a first time instance for prediction is within a window referenced to the at least one time instance of the third RS set and whether one or more Top-1 beams, Top-K beams, or RSs from the at least one time instance of the third RS set is associated with or maps to one or more predicted Top-1 beams, Top-K beams, or RSs, and transmitting a monitoring report to a network node.

20 Claims, 20 Drawing Sheets

(51) Int. Cl.
*H04B 17/318* (2015.01)
*H04W 24/10* (2009.01)

(58) Field of Classification Search
CPC ... H04W 72/04; H04W 72/042; H04W 88/08; H04W 28/08; H04W 28/084; H04W 36/22; H04W 72/12; H04L 5/0007
See application file for complete search history.

(56) References Cited

OTHER PUBLICATIONS

RAN2 Chair (InterDigital); Agenda; 3GPP TSG-RAN WG2 Meeting #130; R2-250xxxx; May 19-23, 2025; 86 pages.

Ericsson; Remaining RRC open issues in feature AIML PHY; 3GPP RAN WG2 Meeting #131; R2-25xxxxx; Aug. 25-29, 2025; 45 pages.

Introduction of AI/ML for NR Air interface feature in TS38.300; Change Request 38.300 CR, Current version: 18.6.0; 3GPP TSG-RAN WG2 Meeting #131; R2-25xxxxx; Aug. 25-29, 2025; 34 pages.

Introduction of AI/ML for NR Air interface feature in TS38.300; Change Request 38.300 CR, Current version: 18.4.0; 3GPP TSG-RAN WG2 Meeting #129bis; R2-25xxxx; Apr. 7-11, 2025; 35 pages.

* cited by examiner

| R | Serving Cell ID | | | | | BWP ID | | Oct 1 |
|---|---|---|---|---|---|---|---|---|
| R | R | R | L or R | $S_3$ | $S_2$ | $S_1$ | $S_0$ | Oct 2 |

FIG. 6 (PRIOR ART)

| | | Monitoring Report IDx (comprises IDy) | | |
|---|---|---|---|---|
| | | AP | SP | P |
| Inference Report IDy | AP | Same ID is allowed | How to do, if AP is not triggered or being too far away (or outdated) | How to do, if multiple monitoring report is associated with one time instance for inference report |
| | SP | How to do, if Inference report is not activated | Seems to be simultaneous activation or deactivation, if supported | How to do, if there is no inference report |
| | P | Ok | Ok | ok |

Figure 22:
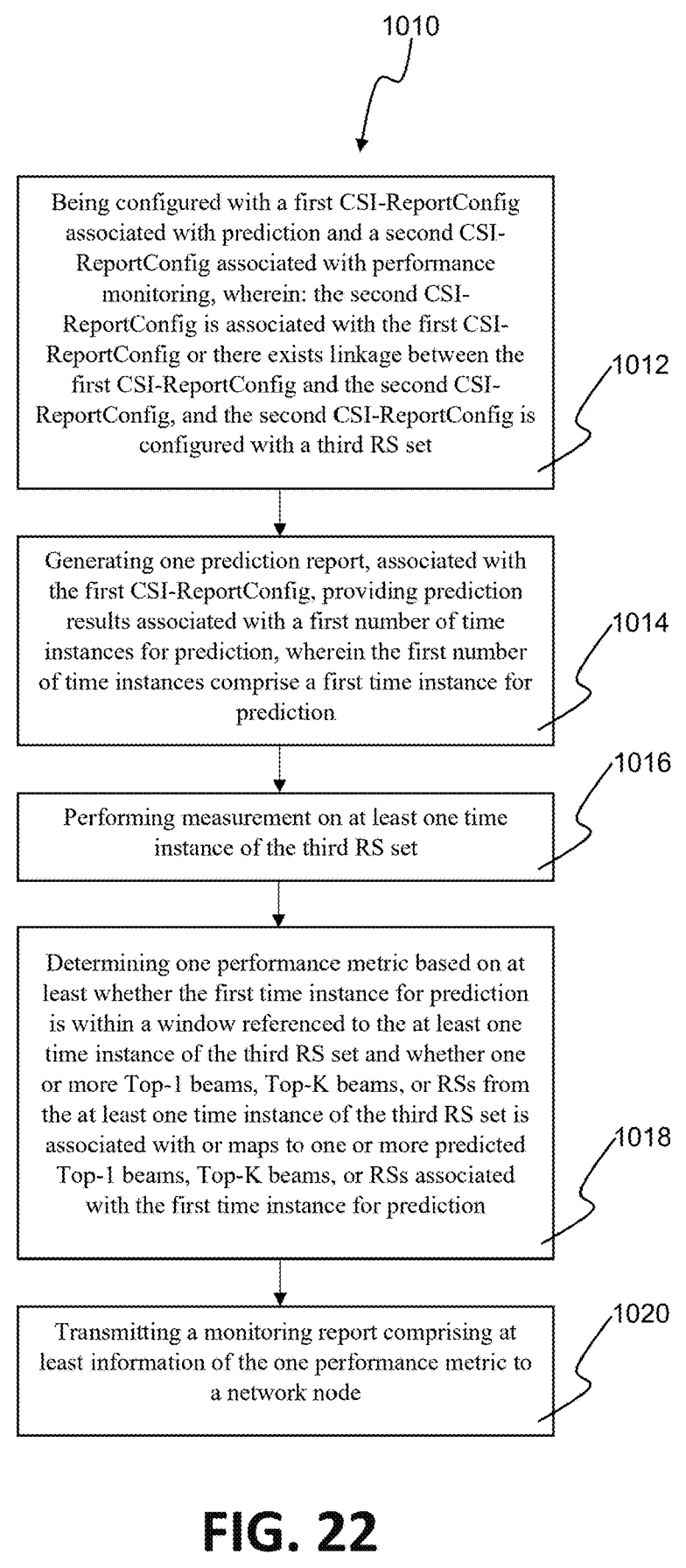

Being configured with a first CSI-ReportConfig associated with prediction and a second CSI-ReportConfig associated with performance monitoring, wherein: the second CSI-ReportConfig is associated with the first CSI-ReportConfig or there exists linkage between the first CSI-ReportConfig and the second CSI-ReportConfig, and the second CSI-ReportConfig is configured with a third RS set

1012

Generating one prediction report, associated with the first CSI-ReportConfig, providing prediction results associated with a first number of time instances for prediction, wherein the first number of time instances comprise a first time instance for prediction

1014

Performing measurement on at least one time instance of the third RS set

1016

Determining one performance metric based on at least whether the first time instance for prediction is within a window referenced to the at least one time instance of the third RS set and whether one or more Top-1 beams, Top-K beams, or RSs from the at least one time instance of the third RS set is associated with or maps to one or more predicted Top-1 beams, Top-K beams, or RSs associated with the first time instance for prediction

1018

Transmitting a monitoring report comprising at least information of the one performance metric to a network node

METHOD AND APPARATUS FOR PERFORMANCE MONITORING IN A WIRELESS COMMUNICATION SYSTEM

CROSS-REFERENCE TO RELATED APPLICATIONS

The present Application claims priority to and the benefit of U.S. Provisional Patent Application Ser. No. 63/740,292, filed Dec. 30, 2024, and U.S. Provisional Patent Application Ser. No. 63/748,408, filed Jan. 22, 2025; with each of the referenced and identified applications and disclosures fully incorporated herein by reference.

FIELD

This disclosure generally relates to wireless communication networks and, more particularly, to a method and apparatus for performance monitoring in a wireless communication system.

BACKGROUND

With the rapid rise in demand for communication of large amounts of data to and from mobile communication devices, traditional mobile voice communication networks are evolving into networks that communicate with Internet Protocol (IP) data packets. Such IP data packet communication can provide users of mobile communication devices with voice over IP, multimedia, multicast and on-demand communication services.

An exemplary network structure is an Evolved Universal Terrestrial Radio Access Network (E-UTRAN). The E-UTRAN system can provide high data throughput in order to realize the above-noted voice over IP and multimedia services. A new radio technology for the next generation (e.g., 5G) is currently being discussed by the 3GPP standards organization. Accordingly, changes to the current body of 3GPP standard are currently being submitted and considered to evolve and finalize the 3GPP standard.

SUMMARY

Methods, systems, and apparatuses are provided for performance monitoring in a wireless communication system. In various embodiments, a method for a User Equipment (UE) in a wireless communication system comprises being configured with a first Channel State Information (CSI)-ReportConfig associated with prediction and a second CSI-ReportConfig associated with performance monitoring, generating one prediction report, associated with the first CSI-ReportConfig, providing prediction results associated with a first number of time instances for prediction comprising a first time instance for prediction, performing measurement on at least one time instance of a third Reference Signal (RS) set, determining one performance metric based on at least whether the first time instance for prediction is within a window referenced to the at least one time instance of the third RS set and whether one or more Top-1 beams, Top-K beams, or RSs from the at least one time instance of the third RS set is associated with or maps to one or more predicted Top-1 beams, Top-K beams, or RSs associated with the first time instance for prediction, and transmitting a monitoring report comprising at least information of the one performance metric to a network node.

BRIEF DESCRIPTION OF THE DRAWINGS

FIG. 6 is a reproduction of FIG. 6.1.3.16-1: SP CSI reporting on PUCCH Activation/Deactivation MAC CE, from 3GPP TS 38.321 V18.3.0.

FIG. 16 is an example diagram showing that since each CSI-ReportConfig could be configured with each report type, some combination of the monitoring report and inference report may need further handling, in accordance with embodiments of the present invention.

FIG. 22 is a flow diagram of a method of a UE in a wireless communication system comprising being configured with a first CSI-ReportConfig associated with prediction and a second CSI-ReportConfig associated with performance monitoring, generating one prediction report, associated with the first CSI-ReportConfig, providing prediction results associated with a first number of time instances for prediction comprising a first time instance for prediction, performing measurement on at least one time instance of the third RS set, determining one performance metric based on at least whether the first time instance for prediction is within a window referenced to the at least one time instance of the third RS set and whether one or more Top-1 beams, Top-K beams, or RSs from the at least one time instance of the third RS set is associated with or maps to one or more predicted Top-1 beams, Top-K beams, or RSs associated with the first time instance for prediction, and transmitting a monitoring report comprising at least information of the one performance metric to a network node, in accordance with embodiments of the present invention.

DETAILED DESCRIPTION

The invention described herein can be applied to or implemented in exemplary wireless communication systems and devices described below. In addition, the invention is described mainly in the context of the 3GPP architecture reference model. However, it is understood that with the disclosed information, one skilled in the art could easily adapt for use and implement aspects of the invention in a 3GPP2 network architecture as well as in other network architectures.

The exemplary wireless communication systems and devices described below employ a wireless communication system, supporting a broadcast service. Wireless communication systems are widely deployed to provide various types of communication such as voice, data, and so on. These systems may be based on code division multiple access (CDMA), time division multiple access (TDMA), orthogonal frequency division multiple access (OFDMA), 3GPP LTE (Long Term Evolution) wireless access, 3GPP LTE-A (Long Term Evolution Advanced) wireless access, 3GPP2 UMB (Ultra Mobile Broadband), WIMAX®, 3GPP NR (New Radio), or some other modulation techniques.

In particular, the exemplary wireless communication systems and devices described below may be designed to support one or more standards such as the standard offered by a consortium named “3rd Generation Partnership Project” referred to herein as 3GPP, including: [1] TR 38.843, v18.0.0; [2] 3GPP TS 38.331 V18.1.0 (2024 March) 3rd Generation Partnership Project; Technical Specification Group Radio Access Network; NR; Radio Resource Control (RRC) protocol specification (Release 18); [3] 3GPP TS 38.214 V18.2.0 (2024 March) 3rd Generation Partnership Project; Technical Specification Group Radio Access Network; NR; Physical layer procedures for data (Release 18); [4] 3GPP TS 38.321 V18.3.0 (2024 September) 3rd Generation Partnership Project; Technical Specification Group Radio Access Network; NR; Medium Access Control (MAC) protocol specification (Release 18); [5] 3GPP TS 38.212 V18.2.0 (2024 March) 3rd Generation Partnership Project; Technical Specification Group Radio Access Network; NR; Multiplexing and channel coding (Release 18); [6] Chair notes RAN1 #116 eom0; [7] Chair’s notes RAN1 #116bis eom0; [8] Chair notes RAN1 #117 eom0; [9] Chair notes RAN1 #118 eom0; [10] Chair’s notes RAN1 #118bis eom0; and [11] Chair notes RAN1 #119 eom0. The standards and documents listed above are hereby expressly and fully incorporated herein by reference in their entirety.

Figure 1:
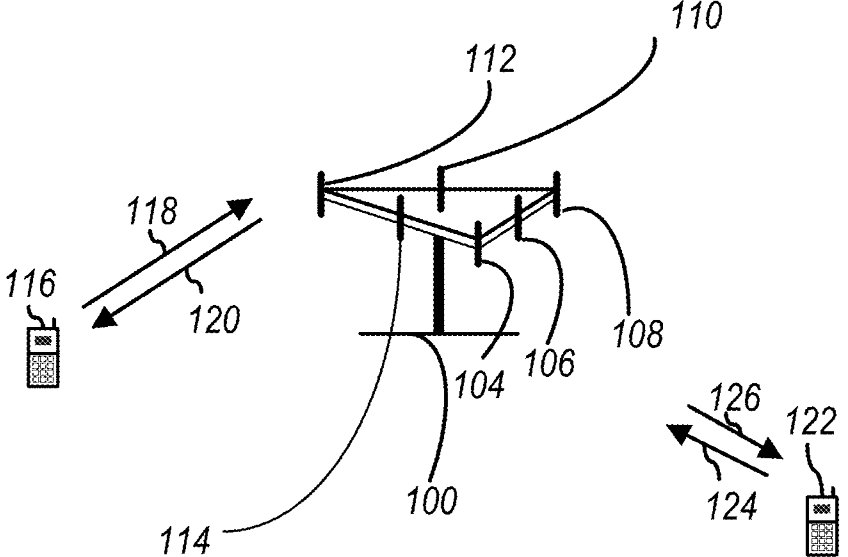
FIG. 1 shows a diagram of a wireless communication system, in accordance with embodiments of the present invention.

FIG. 1 shows a multiple access wireless communication system according to one embodiment of the invention. An access network 100 (AN) includes multiple antenna groups, one including 104 and 106, another including 108 and 110, and an additional including 112 and 114. In FIG. 1, only two antennas are shown for each antenna group, however, more or fewer antennas may be utilized for each antenna group. Access terminal (AT) 116 is in communication with antennas 112 and 114, where antennas 112 and 114 transmit information to access terminal 116 over forward link 120 and receive information from AT 116 over reverse link 118. AT 122 is in communication with antennas 106 and 108, where antennas 106 and 108 transmit information to AT 122 over forward link 126 and receive information from AT 122 over reverse link 124. In a FDD system, communication links 118, 120, 124 and 126 may use different frequency for communication. For example, forward link 120 may use a different frequency than that used by reverse link 118.

Each group of antennas and/or the area in which they are designed to communicate is often referred to as a sector of the access network. In the embodiment, antenna groups each are designed to communicate to access terminals in a sector of the areas covered by access network 100.

In communication over forward links 120 and 126, the transmitting antennas of access network 100 may utilize beamforming in order to improve the signal-to-noise ratio of forward links for the different access terminals 116 and 122. Also, an access network using beamforming to transmit to access terminals scattered randomly through its coverage normally causes less interference to access terminals in neighboring cells than an access network transmitting through a single antenna to all its access terminals.

The AN may be a fixed station or base station used for communicating with the terminals and may also be referred to as an access point, a Node B, a base station, an enhanced base station, an eNodeB, or some other terminology. The AT may also be called User Equipment (UE), a wireless communication device, terminal, access terminal or some other terminology.

Figure 2:
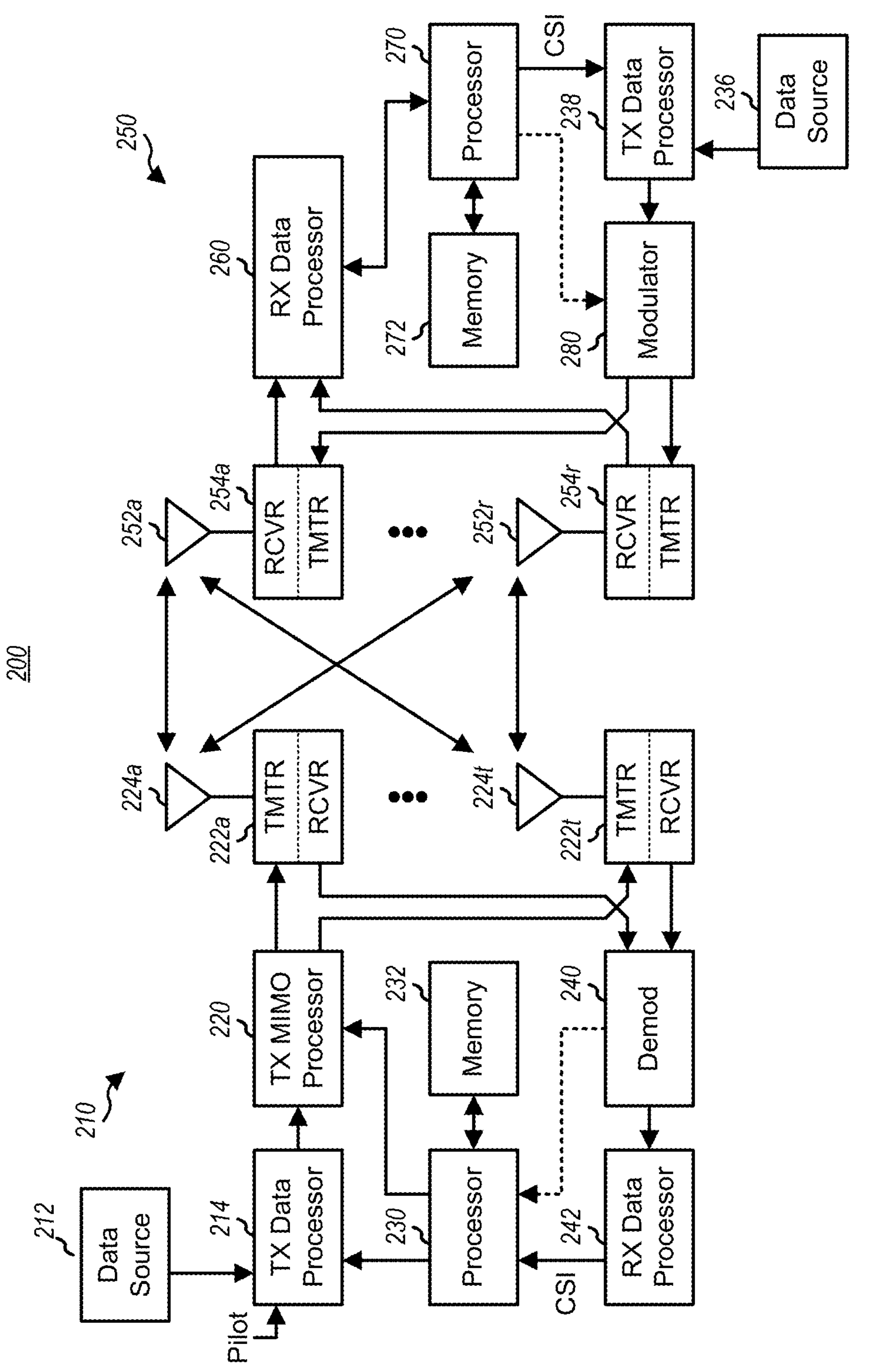
FIG. 2 is a block diagram of a transmitter system (also known as access network) and a receiver system (also known as user equipment or UE), in accordance with embodiments of the present invention.

FIG. 2 is a simplified block diagram of an embodiment of a transmitter system 210 (also known as the access network) and a receiver system 250 (also known as access terminal (AT) or user equipment (UE)) in a MIMO system 200. At the transmitter system 210, traffic data for a number of data streams is provided from a data source 212 to a transmit (TX) data processor 214.

In one embodiment, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (e.g., symbol mapped) based on a particular modulation scheme (e.g., BPSK, QPSK, M-PSK, or M-QAM) selected for that data stream to provide modulation symbols. The data rate, coding, and modulation for each data stream may be determined by instructions performed by processor 230. A memory 232 is coupled to processor 230.

The modulation symbols for all data streams are then provided to a TX MIMO processor 220, which may further process the modulation symbols (e.g., for OFDM). TX MIMO processor 220 then provides NT modulation symbol streams to $N_T$ transmitters (TMTR) 222*a* through 222*t*. In certain embodiments, TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 222*a* through 222*t* are then transmitted from $N_T$ antennas 224*a* through 224*t*, respectively.

At receiver system 250, the transmitted modulated signals are received by $N_R$ antennas 252*a* through 252*r* and the received signal from each antenna 252 is provided to a respective receiver (RCVR) 254*a* through 254*r*. Each receiver 254 conditions (e.g., filters, amplifies, and downconverts) a respective received signal, digitizes the conditioned signal to provide samples, and further processes the samples to provide a corresponding "received" symbol stream.

An RX data processor 260 then receives and processes the $N_R$ received symbol streams from $N_R$ receivers 254 based on a particular receiver processing technique to provide $N_T$ "detected" symbol streams. The RX data processor 260 then demodulates, deinterleaves, and decodes each detected symbol stream to recover the traffic data for the data stream. The processing by RX data processor 260 is complementary to that performed by TX MIMO processor 220 and TX data processor 214 at transmitter system 210.

A processor 270 periodically determines which pre-coding matrix to use (discussed below). Processor 270 formulates a reverse link message comprising a matrix index portion and a rank value portion. The reverse link message may comprise various types of information regarding the communication link and/or the received data stream. The reverse link message is then processed by a TX data processor 238, which also receives traffic data for a number of data streams from a data source 236, modulated by a modulator 280, conditioned by transmitters 254*a* through 254*r*, and transmitted back to transmitter system 210.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250. Processor 230 then determines which pre-coding matrix to use for determining the beamforming weights then processes the extracted message.

Memory 232 may be used to temporarily store some buffered/computational data from 240 or 242 through Processor 230, store some buffed data from 212, or store some specific program codes. And Memory 272 may be used to temporarily store some buffered/computational data from 260 through Processor 270, store some buffed data from 236, or store some specific program codes.

Figure 3:
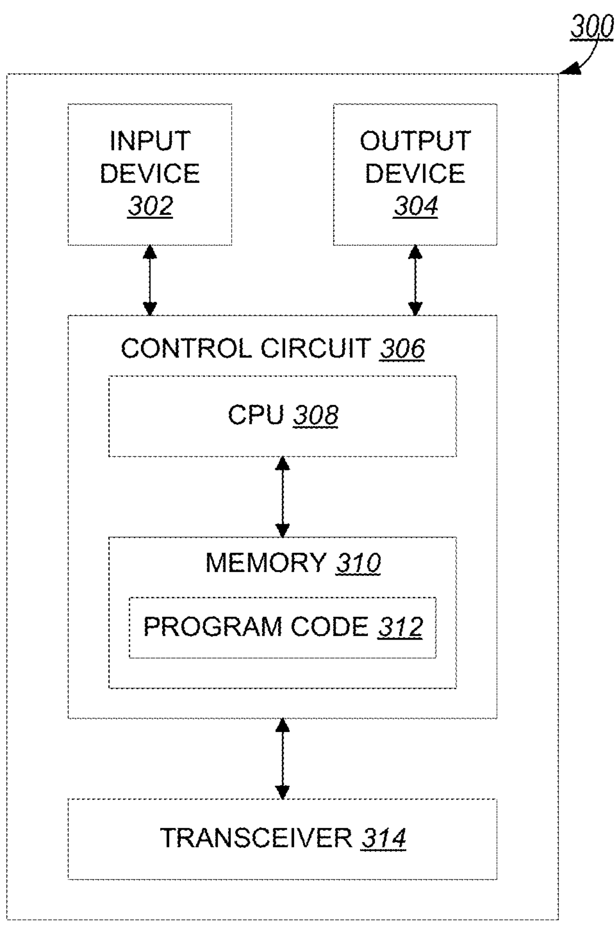
FIG. 3 is a functional block diagram of a communication system, in accordance with embodiments of the present invention.
Figure 4:
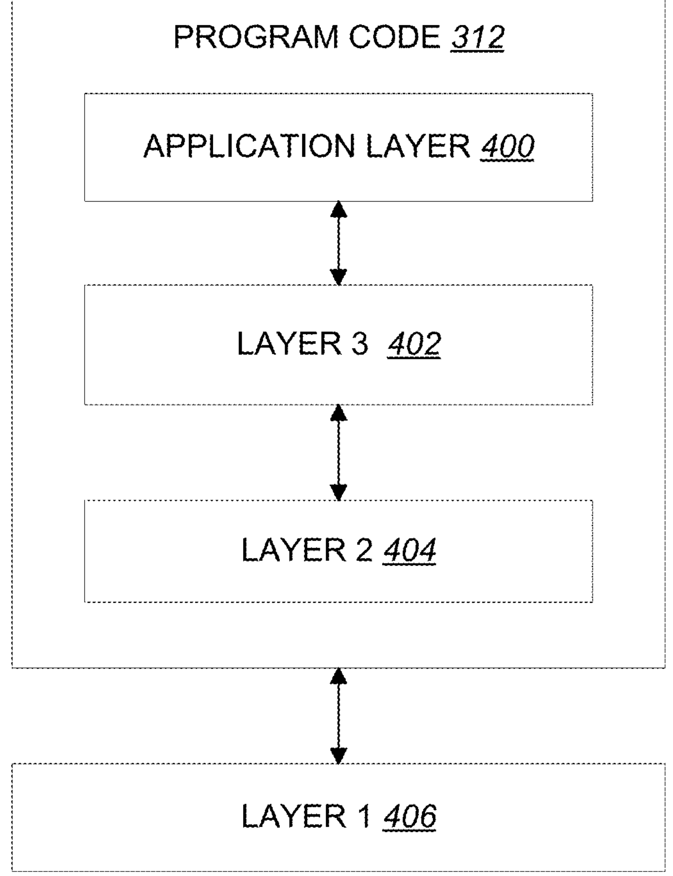
FIG. 4 is a functional block diagram of the program code of FIG. 3, in accordance with embodiments of the present invention.

Turning to FIG. 3, this figure shows an alternative simplified functional block diagram of a communication device according to one embodiment of the invention. As shown in FIG. 3, the communication device 300 in a wireless communication system can be utilized for realizing the UEs (or ATs) 116 and 122 in FIG. 1, and the wireless communications system is preferably the NR system. The communication device 300 may include an input device 302, an output device 304, a control circuit 306, a central processing unit (CPU) 308, a memory 310, a program code 312, and a transceiver 314. The control circuit 306 executes the program code 312 in the memory 310 through the CPU 308, thereby controlling an operation of the communications device 300. The communications device 300 can receive signals input by a user through the input device 302, such as a keyboard or keypad, and can output images and sounds through the output device 304, such as a monitor or speakers. The transceiver 314 is used to receive and transmit wireless signals, delivering received signals to the control circuit 306, and outputting signals generated by the control circuit 306 wirelessly. FIG. 4 is a simplified block diagram of the program code 312 shown in FIG. 3 in accordance with an embodiment of the invention. In this embodiment, the program code 312 includes an application layer 400, a Layer 3 portion 402, and a Layer 2 portion 404, and is coupled to a Layer 1 portion 406. The Layer 3 portion 402 generally performs radio resource control. The Layer 2 portion 404 generally performs link control. The Layer 1 portion 406 generally performs physical connections.

For LTE, LTE-A, or NR systems, the Layer 2 portion 404 may include a Radio Link Control (RLC) layer and a Medium Access Control (MAC) layer. The Layer 3 portion 402 may include a Radio Resource Control (RRC) layer.

Any two or more than two of the following paragraphs, (sub-) bullets, points, actions, or claims described in each invention paragraph or section may be combined logically, reasonably, and properly to form a specific method.

Any sentence, paragraph, (sub-) bullet, point, action, or claim described in each of the following invention paragraphs or sections may be implemented independently and separately to form a specific method or apparatus. Dependency, e.g., "based on", "more specifically", "example", etc., in the following invention disclosure is just one possible embodiment which would not restrict the specific method or apparatus.

In [1] TR 38.843, v18.0.01, the following is provided:

4.2 Life Cycle Management

In this clause, the life cycle management (LCM) of AI/ML model (e.g., model training, model deployment, model inference, model monitoring, model updating) and AI/ML functionality are characterized.

The following aspects, including the definition of components (if needed) and necessity, are studied in LCM:

Data collection

Note: This also includes associated assistance information, if applicable.

Model training

Functionality/model identification

Model delivery/transfer

Model inference operation

Functionality/model selection, activation, deactivation, switching, and fallback operation.

Including: Decision by the network (either network initiated or UE-initiated and requested to the network), decision by the UE (event-triggered as configured by the network, UE's decision reported to the network, or UE-autonomous either with UE's decision reported to the network or without it)

Functionality/model monitoring

Model update

UE capability 4.2.1 LCM Flavours

The LCM procedure is studied for the case that an AI/ML model has a model ID with associated information and/or for the case that a given functionality is provided by some AI/ML operations. Note: Applicability of functionality-based LCM and model-ID-based LCM is a separate discussion.

From RAN1 perspective, an AI/ML model identified by a model ID may be logical, and how it maps to physical AI/ML model(s) may be up to implementation. When distinction is necessary for discussion purposes, companies may use the term a logical AI/ML model to refer to a model that is identified and assigned a model ID, and physical AI/ML model(s) to refer to an actual implementation of such a model.

For UE-side models and UE-part of two-sided models:

For AI/ML functionality identification

Legacy 3GPP framework of feature is taken as a starting point.

UE indicates supported functionalities/functionality for a given sub-use-case.

UE capability reporting is taken as starting point.

For AI/ML model identification

Models are identified by model ID at the Network. UE indicates supported AI/ML models.

In functionality-based LCM, network indicates activation/deactivation/fallback/switching of AI/ML functionality via 3GPP signalling (e.g., RRC, MAC-CE, DCI). Models may not be identified at the Network, and UE may perform model-level LCM. Whether and how much awareness/interaction NW should have about model-level LCM requires further study. For functionality identification, there may be either one or more than one Functionalities defined within an AI/ML-enabled feature, whereby AI/ML-enabled Feature refers to a Feature where AI/ML may be used. Note: UE may have one AI/ML model for the functionality, or UE may have multiple AI/ML models for the functionality.

For AI/ML functionality identification and functionality-based LCM of UE-side models and/or UE-part of two-sided models, functionality refers to an AI/ML-enabled Feature/FG enabled by configuration(s), where configuration(s) is(are) supported based on conditions indicated by UE capability. Correspondingly, functionality-based LCM operates based on, at least, one configuration of AI/ML-enabled Feature/FG or specific configurations of an AI/ML-enabled Feature/FG.

After functionality identification, necessity, mechanisms, for UE to report updates on applicable functionality(es) among functionality(es) are studied, where the applicable functionalities may be a subset of all functionalities. Applicable functionalities can be reported by the UE.

In model-ID-based LCM, models are identified at the Network, and Network/UE may activate/deactivate/select/switch individual AI/ML models via model ID.

For AI/ML model identification and model-ID-based LCM of UE-side models and/or UE-part of two-sided models, model-ID-based LCM operates based on identified models, where a model may be associated with specific configurations/conditions associated with UE capability of an AI/ML-enabled Feature/FG and additional conditions (e.g., scenarios, sites, and datasets) as determined/identified between UE-side and NW-side.

After model identification, necessity, mechanisms, for UE to report updates on applicable UE part/UE-side model(s), are studied, where the applicable models may be a subset of all identified models. Applicable models can be reported by the UE.

How to handle the impact of UE's internal conditions such as memory, battery, and other hardware limitations on functionality/model operations and AI/ML-enabled Feature is to be studied. Note: it does not preclude any existing solutions.

For functionality/model-ID based LCM, once functionalities/models are identified, the same or similar procedures may be used for their activation, deactivation, switching, fallback, and monitoring.

Model ID, if needed, can be used in a Functionality (defined in functionality-based LCM) for LCM operations.

4.4 Functional Framework Details

This section introduces the functional framework for AI/ML for NR air interface illustrated in FIGS. 4.4-1. The aim of this framework is to cover a general functional architecture addressing both model-ID-based LCM and functionality-based LCM, introduced in clause 4.2. Therefore, some of the functions or data/information/instruction flows (i.e., the arrows) shown in the FIGS. 4.4-1 might not always be relevant for a given LCM approach. As an illustrative example, consider a scenario where the network performs functionality-based LCM and where models are not identified in the network, while the UE concurrently performs model-level management (e.g., model selection/switching/(de) activation, etc . . . ). In this hypothetical case, the "Model Training" or "Model Storage" functions with their respective procedures, may be regarded as irrelevant from the network's perspective.

In clause 7, the functions and data/information/instruction flows (i.e., the arrows) depicted in FIGS. 4.4-1 are analysed for any standardization impact and its implications.

Figure 5:
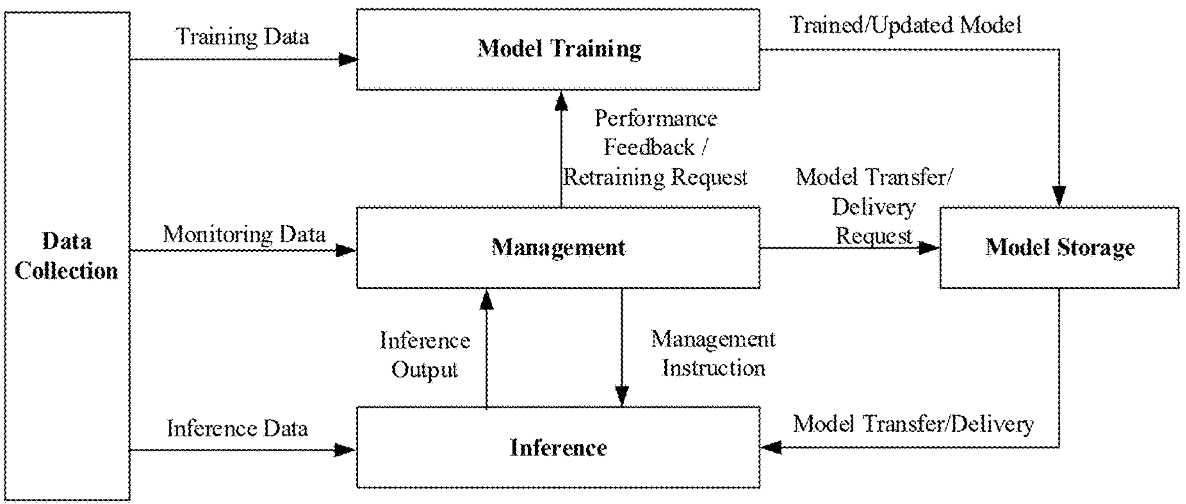
FIG. 5 is a reproduction of FIGS. 4.4-1: Functional framework for AI/ML for NR Air Interface, from TR 38.843, v18.0.01.

FIG. 5 is a reproduction of FIGS. 4.4-1: Functional framework for AI/ML for NR Air Interface, from TR 38.843, v18.0.01.

As seen in FIGS. 4.4-1, the general framework consists of the following:

Data Collection is a function that provides input data to the Model Training, Management, and Inference functions.

Training Data: Data needed as input for the AI/ML Model Training function.

Monitoring Data: Data needed as input for the Management of AI/ML models or AI/ML functionalities.

Inference Data: Data needed as input for the AI/ML Inference function.

Model Training is a function that performs AI/ML model training, validation, and testing which may generate model performance metrics which can be used as part of the model testing procedure. The Model Training function is also responsible for data preparation (e.g., data pre-processing and cleaning, formatting, and transformation) based on Training Data delivered by a Data Collection function, if required.

Trained/Updated Model: In case of having a Model Storage function, this is used to deliver trained, validated, and tested AI/ML models to the Model Storage function, or to deliver an updated version of a model to the Model Storage function.

Management is a function that oversees the operation (e.g., selection/(de) activation/switching/fallback) and monitoring (e.g., performance) of AI/ML models or AI/ML functionalities. This function is also responsible for making decisions to ensure the proper inference operation based on data received from the Data Collection function and the Inference function.

Management Instruction: Information needed as input to manage the Inference function. Concerning information may include selection/(de) activation/switching of AI/ML models or AI/ML-based functionalities, fallback to non-AI/ML operation (i.e., not relying on inference process), etc., Model Transfer/Delivery Request: Used to request model(s) to the Model Storage function.

Performance Feedback/Retraining Request: Information needed as input for the Model Training function, e.g., for model (re) training or updating purposes.

Inference is a function that provides outputs from the process of applying AI/ML models or AI/ML functionalities, using the data that is provided by the Data Collection function (i.e., Inference Data) as an input. The Inference function is also responsible for data preparation (e.g., data pre-processing and cleaning, formatting, and transformation) based on Inference Data delivered by a Data Collection function, if required.

Inference Output: Data used by the Management function to monitor the performance of AI/ML models or AI/ML functionalities.

Model Storage is a function responsible for storing trained/updated models that can be used to perform the Inference function.

Note: The Model Storage function in FIGS. 4.4-1 is only intended as a reference point (if any) when applicable for protocol terminations, model transfer/delivery, and related processes. It should be stressed that its purpose does not encompass restricting the actual storage locations of models. Therefore, the specification impact of all data/information/instruction flows (i.e., the arrows in FIGS. 4.4-1) to/from this function should be studied case by case.

Model Transfer/Delivery: Used to deliver an AI/ML model to the Inference function.

5 Use Cases

Initial set of use cases includes:

CSI feedback enhancement, e.g., overhead reduction, improved accuracy, prediction [RAN1]

Beam management, e.g., beam prediction in time, and/or spatial domain for overhead and latency reduction, beam selection accuracy improvement [RAN1]

Positioning accuracy enhancements for different scenarios including, e.g., those with heavy NLOS conditions [RAN1]

The AI/ML approaches for the selected sub use cases need to be diverse enough to support various requirements on the gNB-UE collaboration levels

. . .

5.2 Beam Management

Finalization of Representative Sub-Use Cases:

The following are selected as representative sub-use cases:

BM-Case1: Spatial-domain Downlink beam prediction for Set A of beams based on measurement results of Set B of beams Consider: Alt. 1): AI/ML model training and inference at NW side. Alt. 2): AI/ML model training and inference at UE side.

Consider: Alt. i): Set A and Set B are different (Set B is NOT a subset of Set A). Alt. ii): Set B is a subset of Set A. Note: Set A is for DL beam prediction. The codebook construction of Set A and Set B can be clarified by companies.

AI/ML model input consider: Alt 1): Only L1-RSRP measurement based on Set B; Alt.2): L1-RSRP measurement based on Set B and assistance information; Alt. 3): CIR based on Set B; Alt. 4): L1-RSRP measurement based on Set B and the corresponding DL Tx and/or Rx beam ID.

BM-Case2: Temporal Downlink beam prediction for Set A of beams based on the historic measurement results of Set B of beams Consider: Alt. 1): AI/ML model training and inference at NW side. Alt. 2): AI/ML model training and inference at UE side.

Consider: Alt. i): Set A and Set B are different (Set B is NOT a subset of Set A). Alt. ii): Set B is a subset of Set A (Set A and Set B are not the same). Alt. iii): Set A and Set B are the same.

AI/ML model input consider: measurement results of K (K≥1) latest measurement instances with the following alternatives: Alt. 1): Only L1-RSRP measurement based on Set B; Alt 2): L1-RSRP measurement based on Set B and assistance information; Alt. 3): L1-RSRP measurement based on Set B and the corresponding DL Tx and/or Rx beam ID.

F predictions for F future time instances can be obtained based on the output of AI/ML model, where each prediction is for each time instance. At least F=1.

Set B is a set of beams whose measurements are taken as inputs of the AI/ML model.

Note: Beams in Set A and Set B can be in the same Frequency Range.

For both sub-use cases, the following alternatives are studied for the predicted beams:

Alt.1: DL Tx beam prediction

Alt.2: DL Rx beam prediction (deprioritized)

Alt.3: Beam pair prediction (a beam pair consists of a DL Tx beam and a corresponding DL Rx beam)

Note: DL Rx beam prediction may or may not have spec impact.

The following alternatives according to AI/ML model output are considered:

Alt.1: Tx and/or Rx Beam ID(s) and/or the predicted L1-RSRP of the N predicted DL Tx and/or Rx beams
e.g., N predicted beams can be the Top-N predicted beams
Alt.2: Tx and/or Rx Beam ID(s) of the N predicted DL Tx and/or Rx beams and other information
e.g., N predicted beams can be the Top-N predicted beams
Alt.3: Tx and/or Rx Beam angle(s) and/or the predicted L1-RSRP of the N predicted DL Tx and/or Rx beams
e.g., N predicted beams can be the Top-N predicted beams For BM-Case1 and BM-Case2 with a UE-side AI/ML model, the necessity and potential BM-specific conditions/additional conditions for functionality(ies) and/or model(s) are considered at least from the following aspects:

information regarding model inference
Set A/Set B configuration
performance monitoring
data collection
assistance information For beam management use cases:
For model training, training data can be generated by UE/gNB.
For NW-side model inference, input data can be generated by UE and terminated at gNB.
For UE-side model inference, input data is internally available at UE.
For performance monitoring at the NW side, calculated performance metrics (if needed) or data needed for performance metric calculation (if needed) can be generated by UE and terminated at gNB.

7.1.3 Beam Management

Items Considered for Studying the Necessity, Feasibility, Potential Specification Impact:

Performance Monitoring:

For the performance monitoring of BM-Case1 and BM-Case2:

Performance metric(s) with the following alternatives:
Alt.1: Beam prediction accuracy related KPIs, e.g., Top-K/1 beam prediction accuracy
Alt.2: Link quality related KPIs, e.g., throughput, L1-RSRP, L1-SINR, hypothetical BLER
Alt.3: Performance metric based on input/output data distribution of AI/ML
Alt.4: The L1-RSRP difference evaluated by comparing measured RSRP and predicted RSRP Benchmark/reference for the performance comparison, including:
Alt.1: The best beam(s) obtained by measuring beams of a set indicated by gNB (e.g., Beams from Set A)
Alt.4: Measurements of the predicted best beam(s) corresponding to model output (e.g., Comparison between actual L1-RSRP and predicted RSRP of predicted Top-1/K Beams)

Signalling/configuration/measurement/report for model monitoring, e.g., signalling aspects related to assistance information (if supported), Reference signals For BM-Case1 and BM-Case2 with a UE-side AI/ML model:

Type 1 performance monitoring:
Configuration/Signalling from gNB to UE for measurement and/or reporting
UE may have different operations
Option 1 (NW-side performance monitoring): UE sends reporting to NW (e.g., for the calculation of performance metric at NW)
Option 2 (UE-assisted performance monitoring): UE calculates performance metric(s), either reports it to NW or reports an event to NW based on the performance metric(s)
Indication from NW for UE to do LCM operations
Note: At least the performance and reporting overhead of model monitoring mechanism should be considered

. . .

Mechanism that facilitates the UE to detect whether the functionality/model is suitable or no longer suitable In [2] 3GPP TS 38.331 V18.1.0, the related information element is quoted below:

—CSI-Aperiodic TriggerStateList

The CSI-AperiodicTriggerStateList IE is used to configure the UE with a list of aperiodic trigger states. Each codepoint of the DCI field "CSI request" is associated with one trigger state (see TS 38.321 [3], clause 6.1.3.13). Upon reception of the value associated with a trigger state, the UE will perform measurement of CSI-RS, CSI-IM and/or SSB (reference signals) and aperiodic reporting on L1 according to all entries in the associatedReportConfigInfoList for that trigger state.

CSI-AperiodicTriggerStateList Information Element

```
-- ASN1START
-- TAG-CSI-APERIODICTRIGGERSTATELIST-START
CSI-AperiodicTriggerStateList : := SEQUENCE (SIZE (1 . . .
maxNrOfCSI-AperiodicTriggers) ) OF CSI-AperiodicTriggerState
CSI-AperiodicTriggerState : := SEQUENCE {
  associatedReportConfigInfoList     SEQUENCE (SIZE (1 . . . maxNrof-
ReportConfigPerAperiodicTrigger) ) OF CSI-AssociatedReportConfigInfo,
   . . .,
  [ [
  ap-CSI-MultiplexingMode-r17        ENUMERATED { enabled }
OPTIONAL -- Need R
  ] ],
  [ [
  ltm-AssociatedReportConfigInfo-r18    LTM-CSI-ReportConfigId-r18
OPTIONAL -- Need R
  ] ]
}
CSI-AssociatedReportConfigInfo : := SEQUENCE {
  reportConfigId                      CSI-ReportConfigId,
  resources ForChannel                CHOICE {
```

-continued

```
      nzp-CSI-RS                          SEQUENCE {
         resourceSet                         INTEGER (1 . . . maxNrofNZP-CSI-
RS-ResourceSetsPerConfig),
         qcl-info                            SEQUENCE (SIZE (1 . . . maxNro-
fAP-
CSI-RS-ResourcesPerSet ) ) OF TCI-StateId
OPTIONAL -- Cond Aperiodic
      },
      csi-SSB-ResourceSet                INTEGER (1 . . . maxNrofCSI-SSB-
ResourceSetsPerConfig)
   },
   . . .
   ] ]
}
-- TAG-CSI-APERIODICTRIGGERSTATELIST-STOP
-- ASN1STOP
```

| CSI-AssociatedReportConfigInfo field descriptions |
|---|
| . . .<br>csi-SSB-ResourceSet, csi-SSB-ResourceSet2<br>CSI-SSB-ResourceSet for channel measurements. Entry number in csi-SSB-ResourceSetList in the CSI-ResourceConfig indicated by resourcesForChannelMeasurement in the CSI-ReportConfig indicated by reportConfigId above (value 1 corresponds to the first entry, value 2 to the second entry, and so on).<br>reportConfigId<br>The reportConfigId of one of the CSI-ReportConfigToAddMod configured in CSI-MeasConfig<br>resourceSet<br>NZP-CSI-RS-ResourceSet for channel measurements. Entry number in nzp-CSI-RS-ResourceSetList in the CSI-ResourceConfig indicated by resourcesForChannelMeasurement in the CSI-ReportConfig indicated by reportConfigId above (value 1 corresponds to the first entry, value 2 to the second entry, and so on). |

—CSI-MeasConfig

The IE CSI-MeasConfig is used to configure CSI-RS (reference signals) belonging to the serving cell in which CSI-MeasConfig is included, channel state information reports to be transmitted on PUCCH on the serving cell in which CSI-MeasConfig is included and channel state information reports on PUSCH triggered by DCI received on the serving cell in which CSI-MeasConfig is included. See also TS 38.214 [19], clause 5.2.

CSI-MeasConfig Information Element

```
-- ASN1START
-- TAG-CSI-MEASCONFIG-START
CSI-MeasConfig ::=                        SEQUENCE {
   nzp-CSI-RS-ResourceToAddModList           SEQUENCE (SIZE (1..maxNrofNZP-CSI-RS-Resources)) OF NZP-CSI-
RS-Resource   OPTIONAL, -- Need N
   nzp-CSI-RS-ResourceToReleaseList          SEQUENCE (SIZE (1..maxNrofNZP-CSI-RS-Resources)) OF NZP-CSI-
RS-ResourceId OPTIONAL, -- Need N
   nzp-CSI-RS-ResourceSetToAddModList        SEQUENCE (SIZE (1..maxNrofNZP-CSI-RS-ResourceSets)) OF NZP-
CSI-RS-ResourceSet
OPTIONAL, -- Need N
   nzp-CSI-RS-ResourceSetToReleaseList       SEQUENCE (SIZE (1..maxNrofNZP-CSI-RS-ResourceSets)) OF NZP-
CSI-RS-ResourceSetId
OPTIONAL, -- Need N
...
   csi-SSB-ResourceSetToAddModList           SEQUENCE (SIZE (1..maxNrofCSI-SSB-ResourceSets)) OF CSI-SSB-
ResourceSet   OPTIONAL, -- Need N
   csi-SSB-ResourceSetToReleaseList          SEQUENCE (SIZE (1..maxNrofCSI-SSB-ResourceSets)) OF CSI-SSB-
ResourceSetId OPTIONAL, -- Need N
   csi-ResourceConfigToAddModList            SEQUENCE (SIZE (1..maxNrofCSI-ResourceConfigurations)) OF
CSI-ResourceConfig
OPTIONAL, -- Need N
   csi-ResourceConfigToReleaseList           SEQUENCE (SIZE (1..maxNrofCSI-ResourceConfigurations)) OF
CSI-ResourceConfigId
OPTIONAL, -- Need N
   csi-ReportConfigToAddModList              SEQUENCE (SIZE (1..maxNrofCSI-ReportConfigurations)) OF CSI-
ReportConfig  OPTIONAL, -- Need N
   csi-ReportConfigToReleaseList             SEQUENCE (SIZE (1..maxNrofCSI-ReportConfigurations)) OF CSI-
ReportConfigId
OPTIONAL, -- Need N
   reportTriggerSize                         INTEGER (0..6)
OPTIONAL, -- Need M
   aperiodicTriggerStateList                 SetupRelease { CSI-AperiodicTriggerStateList }
OPTIONAL, -- Need M
   semiPersistentOnPUSCH-TriggerStateList       SetupRelease { CSI-SemiPersistentOnPUSCH-
TriggerStateList }                        OPTIONAL, -- Need M
   ...,
   [[
```

-continued

```
   ]]
}
-- TAG-CSI-MEASCONFIG-STOP
-- ASN1STOP
```

| CSI-MeasConfig field descriptions |
|---|
| aperiodic TriggerStateList<br>Contains trigger states for dynamically selecting one or more aperiodic and semi-persistent reporting configurations and/or triggering one or more aperiodic CSI-RS resource sets for channel and/or interference measurement (see TS 38.214 [19], clause 5.2.1).<br>csi-ReportConfigToAddModList<br>Configured CSI report settings as specified in TS 38.214 [19] clause 5.2.1.1.<br>csi-ResourceConfigToAddModList<br>Configured CSI resource settings as specified in TS 38.214 [19] clause 5.2.1.2.<br>csi-SSB-ResourceSetToAddModList<br>Pool of CSI-SSB-ResourceSet which can be referred to from CSI-ResourceConfig.<br>nzp-CSI-RS-ResourceSetToAddModList<br>Pool of NZP-CSI-RS-ResourceSet which can be referred to from CSI-ResourceConfig or from MAC CEs.<br>nzp-CSI-RS-ResourceToAddModList<br>Pool of NZP-CSI-RS-Resource which can be referred to from NZP-CSI-RS-ResourceSet. |

—CSI-ResourceConfig

The IE CSI-ResourceConfig defines a group of one or more NZP-CSI-RS-ResourceSet, CSI-IM-ResourceSet and/or CSI-SSB-ResourceSet.

CSI-ResourceConfig Information Element

```
-- ASN1START
-- TAG-CSI-RESOURCECONFIG-START
CSI-ResourceConfig ::=                SEQUENCE {
   csi-ResourceConfigId                  CSI-ResourceConfigId,
   csi-RS-ResourceSetList                CHOICE {
      nzp-CSI-RS-SSB                        SEQUENCE {
         nzp-CSI-RS-ResourceSetList            SEQUENCE (SIZE (1..maxNrofNZP-CSI-RS-ResourceSetsPerConfig))
OF NZP-CSI-RS-ResourceSetId
OPTIONAL, -- Need R
         csi-SSB-ResourceSetList               SEQUENCE (SIZE (1..maxNrofCSI-SSB-ResourceSetsPerConfig)) OF
CSI-SSB-ResourceSetId OPTIONAL -- Need R
      },
      csi-IM-ResourceSetList                SEQUENCE (SIZE (1..maxNrofCSI-IM-ResourceSetsPerConfig)) OF CSI-
IM-ResourceSetId
   },
   bwp-Id                                BWP-Id,
   resourceType                          ENUMERATED { aperiodic, semiPersistent, periodic },
   ...,
   [[
   csi-SSB-ResourceSetListExt-r17           CSI-SSB-ResourceSetId
OPTIONAL -- Need R
   ]]
}
-- TAG-CSI-RESOURCECONFIG-STOP
-- ASN1STOP
```

| CSI-ResourceConfig field descriptions |
|---|
| bwp-Id<br>The DL BWP which the CSI-RS associated with this CSI-ResourceConfig are located in (see TS 38.214 [19], clause 5.2.1.2.<br>csi-IM-ResourceSetList<br>List of references to CSI-IM resources used for CSI measurement and reporting in a CSI-RS resource set. Contains up to maxNrofCSI-IM-ResourceSetsPerConfig resource sets if resource Type is 'aperiodic' and 1 otherwise (see TS 38.214 [19], clause 5.2.1.2).<br>csi-ResourceConfigId |

-continued

| CSI-ResourceConfig field descriptions |
|---|
| Used in CSI-ReportConfig to refer to an instance of CSI-ResourceConfig.<br>csi-SSB-ResourceSetList, csi-SSB-ResourceSetListExt<br>List of references to SSB resources used for CSI measurement and reporting in a CSI-RS resource set (see TS 38.214 [19], clause 5.2.1.2) ....<br>nzp-CSI-RS-ResourceSetList<br>List of references to NZP CSI-RS resources used for beam measurement and reporting in a CSI-RS resource set. If resource Type is set to 'aperiodic', the network configures up to maxNrofNZP-CSI-RS-ResourceSetsPerConfig resource sets. If resource Type is is set to 'periodic' or 'semiPersistent' and groupBasedBeamReporting-v1710 is not configured in IE CSI-ReportConfig, the network configures 1 resource set. If resource Type is set to 'periodic' or 'semiPersistent' and groupBasedBeamReporting-v1710 is configured, the network configures 2 resource sets, which may be two NZP CSI-RS resource sets, two CSI SSB resource sets or one NZP CSI-RS resource set and one CSI-SSB resource set (see TS 38.214 [19], clause 5.2.1.2 and 5.2.1.4.2). In this case, in TS 38.212 [17] Table 6.3.1.1.2-8B, the following applies:<br>- if the list has one NZP CSI-RS resource set, this resource set is indicated by a resource set indicator set to 0;<br>- if the list has two NZP CSI-RS resource sets, the first resource set is indicated by a resource set indicator set to 0 and the second resource set by a resource set indicator set to 1.<br>resourceType<br>Time domain behavior of resource configuration (see TS 38.214 [19], clause 5.2.1.2). It does not apply to resources provided in the csi-SSB-ResourceSetList. |

—CSI-ReportConfig

The IE CSI-ReportConfig is used to configure a periodic or semi-persistent report sent on PUCCH on the cell in which the CSI-ReportConfig is included, or to configure a semi-persistent or aperiodic report sent on PUSCH triggered by DCI received on the cell in which the CSI-ReportConfig is included (in this case, the cell on which the report is sent is determined by the received DCI). See TS 38.214 [19], clause 5.2.1.

CSI-ReportConfig Information Element

```
-- ASN1START
-- TAG-CSI-REPORTCONFIG-START
CSI-ReportConfig ::=              SEQUENCE {
    reportConfigId                        CSI-ReportConfigId,     OPTIONAL, -- Need S
    carrier                               ServCellIndex
    resourcesForChannelMeasurement        CSI-ResourceConfigId,
    csi-IM-ResourcesForInterference       CSI-ResourceConfigId   OPTIONAL, -- Need R
    nzp-CSI-RS-ResoucesForInterference    CSI-ResourceConfigId   OPTIONAL, -- Need R
    reportConfigType                      CHOICE {
        periodic                            SEQUENCE {
            reportSlotConfig                  CSI-ReportPeriodicityAndOffset,
            pucch-CSI-ResourceList            SEQUENCE (SIZE (1..maxNrofBWPs)) OF PUCCH-CSI-
Resource
        },
        semiPersistentOnPUCCH               SEQUENCE {
            reportSlotConfig                  CSI-ReportPeriodicityAndOffset,
            pucch-CSI-ResourceList            SEQUENCE (SIZE (1..maxNrofBWPs)) OF PUCCH-CSI-
Resource
        },
        semiPersistentOnPUSCH               SEQUENCE {
            reportSlotConfig                  ENUMERATED {s15, s110, s120, s140, s180, s1160,
s1320),
            reportSlotOffsetList          SEQUENCE (SIZE (1.. maxNrofUL-Allocations) ) OF
INTEGER (0..32),
            p0alpha                           P0-PUSH-AlphaSetId
        },
        aperiodic                           SEQUENCE {
            reportSlotOffsetList              SEQUENCE (SIZE (1..maxNrofUL-Allocations) ) OF
INTEGER(0..32)
        }
    },
    reportQuantity                        CHOICE {
        none                                NULL,
        cri-RI-PMI-CQI                      NULL,
        cri-RI-il                           NULL,
        cri-RI-il-CQI                       SEQUENCE {
            pdsch-BundleSizeForCSI            ENUMERATED {n2, n4}
OPTIONAL   -- Need S
        },
        cri-RI-CQI                          NULL,
        cri-RSRP                            NULL,
        ssb-Index-RSRP                      NULL,
        cri-RI-LI-PMI-CQI                   NULL
    },
    }
```

-continued

```
OPTIONAL,    --Need R
...
     semiPersistentOnPUSCH-V1530          SEQUENCE {
          reportSlotConfig-v1530               ENUMERATED {s14, s18, s116}
     }
OPTIONAL    -- Need R
     ]],
     [[,
     ...
}
CSI-Report PeriodicityAndOffset : :=      CHOICE {
     slots4                                    INTEGER (0..3),
     slots5                                    INTEGER (0..4),
     slots8                                    INTEGER (0..7),
     slots10                                   INTEGER (0..9),
     slots16                                   INTEGER (0..15),
     slots20                                   INTEGER (0..19),
     slots40                                   INTEGER (0..39),
     slots80                                   INTEGER (0..79),
     slots160                                  INTEGER (0..159),
     slots320                                  INTEGER (0..319)
}
PUCCH-CSI-Resource ::=                     SEQUENCE {
     uplinkBandwidthPartId                     BWP-Id,
                                               PUCCH-ResourceId
}
-- TAG-CSI-REPORTCONFIG-STOP
-- ASN1STOP
```

| CSI-ReportConfig field descriptions |
| --- |
| carrier<br>Indicates in which serving cell the CSI-ResourceConfig indicated below are to be found. If the field is absent, the resources are on the same serving cell as this report configuration. |
| nrofReportedRS<br>The number (N) of measured RS resources to be reported per report setting in a non-group-based report. N <= N_max, where N_max is either 2 or 4 depending on UE capability.<br>(see TS 38.214 [19], clause 5.2.1.4) When the field is absent the UE applies the value 1. |
| pucch-CSI-ResourceList<br>Indicates which PUCCH resource to use for reporting on PUCCH. |
| reportConfigType<br>Time domain behavior of reporting configuration. |
| reportFreqConfiguration<br>Reporting configuration in the frequency domain. (see TS 38.214 [19], clause 5.2.1.4). |
| reportQuantity<br>The CSI related quantities to report. see TS 38.214 [19], clause 5.2.1. If the field reportQuantity-r16 or reportQuantity-r17 is present, UE shall ignore reportQuantity (without suffix). Network does not configure reportQuantity-r17 together with reportQuantity-r16. |
| reportSlotConfig<br>Periodicity and slot offset (see TS 38.214 [19], clause 5.2.1.4). If the field reportSlotConfig-v1530 is present, the UE shall ignore the value provided in reportSlotConfig (without suffix). |
| resourcesForChannelMeasurement<br>Resources for channel measurement. csi-ResourceConfigId of a CSI-ResourceConfig included in the configuration of the serving cell indicated with the field "carrier" above. The CSI-ResourceConfig indicated here contains only NZP-CSI-RS resources and/or SSB resources. This CSI-ReportConfig is associated with the DL BWP indicated by bwp-Id in that CSI-ResourceConfig. |

| PUCCH-CSI-Resource field descriptions |
| --- |
| pucch-Resource<br>PUCCH resource for the associated uplink BWP. Only PUCCH-Resource of format 2, 3 and 4 is supported. The actual PUCCH-Resource is configured in PUCCH-Config and referred to by its ID. When two PUCCH-Config are configured within PUCCH-ConfigurationList, PUCCH-ResourceId in a PUCCH-CSI-Resource refers to a PUCCH-Resource in the PUCCH-Config used for HARQ-ACK with low priority. |

—CSI-ReportConfigId

The IE CSI-ReportConfigId is used to identify one CSI-ReportConfig.

CSI-ReportConfigId Information Element

```
-- ASN1START
-- TAG-CSI-REPORTCONFIGID-START
CSI-ReportConfigId :: =          INTEGER (0..maxNrofCSI-)
                                 ReportConfigurations−1
-- TAG-CSI-REPORTCONFIGID-STOP
-- ASN1STOP
```

—NZP-CSI-RS-Resource

The IE NZP-CSI-RS-Resource is used to configure Non-Zero-Power (NZP) CSI-RS transmitted in the cell where the IE is included, which the UE may be configured to measure on (see TS 38.214 [19], clause 5.2.2.3.1). A change of configuration between periodic, semi-persistent or aperiodic for an NZP-CSI-RS-Resource is not supported without a release and add.

NZP-CSI-RS-Resource Information Element

```
-- ASN1START
-- TAG-NZP-CSI-RS-RESOURCE-START
NZP-CSI-RS-Resource ::=    SEQUENCE {
   nzp-CSI-RS-ResourceId       NZP-CSI-RS-ResourceId,
   resourceMapping             CSI-RS-ResourceMapping,
   powerControlOffset          INTEGER (−8..15),
   powerControlOffsetSS        ENUMERATED{db−3, db0, db3, db6}   OPTIONAL,  -
- Need R
   scramblingID                ScramblingId,
   periodicityAndOffset        CSI-ResourcePeriodicityAndOffset        OPTIONAL,  -
- Cond PeriodicOrSemiPersistent
   qcl-InfoPeriodicCSI-RS      TCI-StateId                       OPTIONAL,  -
- Cond Periodic
   ...
}
-- TAG-NZP-CSI-RS-RESOURCE-STOP
-- ASN1STOP
```

| NZP-CSI-RS-Resource field descriptions |
|---|
| periodicityAndOffset<br>Periodicity and slot offset s/1 corresponds to a periodicity of 1 slot, s/2 to a periodicity of two slots, and so on. The corresponding offset is also given in number of slots (see TS 38.214 [19], clause 5.2.2.3.1). Network always configures the UE with a value for this field for periodic and semi-persistent NZP-CSI-RS-Resource (as indicated in CSI-ResourceConfig). |
| qcl-InfoPeriodicCSI-RS<br>For a target periodic CSI-RS, contains a reference to one TCI-State in TCI-States for providing the QCL source and QCL type. For periodic CSI-RS, the source can be SSB or another periodic-CSI-RS. Refers to the TCI-State or dl-OrJoint-TCI-State which has this value for tci-Stateld and is defined in tci-States ToAddModList or in dl-OrJointTCI-State ToAddModList in the PDSCH-Config included in the BWP-Downlink corresponding to the serving cell and to the DL BWP to which the resource belongs to (see TS 38.214 [19], clause 5.2.2.3.1). |
| resourceMapping<br>OFDM symbol location(s) in a slot and subcarrier occupancy in a PRB of the CSI-RS resource. |

—NZP-CSI-RS-ResourceSet

The IE NZP-CSI-RS-ResourceSet is a set of Non-Zero-Power (NZP) CSI-RS resources (their IDs) and set-specific parameters.

NZP-CSI-RS-ResourceSet Information Element

```
-- ASN1START
-- TAG-NZP-CSI-RS-RESOURCESET-START
NZP-CSI-RS-ResourceSet : :=    SEQUENCE {
   nzp-CSI-ResourceSetId         NZP-CSI-RS-ResourceSetId,
   nzp-CSI-RS-Resources          SEQUENCE (SIZE (1. . maxNrofNZP-
CSI-RS-ResourcesPerSet ) ) OF NZP-CSI-RS-ResourceId,
   [ [
   . . .
   ] ]
}
. . .
TAG-NZP-CSI-RS-RESOURCESET-STOP
-- ASN1STOP
```

| NZP-CSI-RS-ResourceSet field descriptions |
|---|
| nzp-CSI-RS-Resources<br>NZP-CSI-RS-Resources associated with this NZP-CSI-RS resource set (see TS 38.214 [19], clause 5.2). For CSI, there are at most 8 NZP CSI RS resources per resource set. |

—ServingCellConfig

The IE ServingCellConfig is used to configure (add or modify) the UE with a serving cell, which may be the SpCell or an SCell of an MCG or SCG. The parameters herein are mostly UE specific but partly also cell specific (e.g. in additionally configured bandwidth parts). Reconfiguration between a PUCCH and PUCCHless SCell is only supported using an SCell release and add.

ServingCellConfig Information Element

```
-- ASN1START
-- TAG-SERVINGCELLCONFIG-START
ServingCellConfig : :=     SEQUENCE {
. . .
    csi-MeasConfig                    SetupRelease { CSI-MeasConfig }
OPTIONAL,      -- Need M
```

In [3] 3GPP TS 38.214 V18.2.0, the following is provided:

5.2 UE Procedure for Reporting Channel State Information (CSI)

5.2.1 Channel State Information Framework

The procedures on aperiodic CSI reporting described in this clause assume that the CSI reporting is triggered by DCI format 0_1, but they equally apply to CSI reporting triggered by DCI format 0_2, by applying the higher layer parameter reportTriggerSizeDCI-0-2 instead of reportTriggerSize. The procedures on aperiodic CSI reporting described in this clause assume that the CSI reporting is triggered by DCI format 0_1, but they equally apply to CSI reporting triggered by DCI format 0_3.

The time and frequency resources that can be used by the UE to report CSI are controlled by the gNB. CSI may consist of Channel Quality Indicator (CQI), precoding matrix indicator (PMI), CSI-RS resource indicator (CRI), SS/PBCH Block Resource indicator (SSBRI), layer indicator (LI), rank indicator (RI), L1-RSRP, L1-SINR, CapabilityIndex or time-domain channel properties (TDCP).

For CQI, PMI, CRI, SSBRI, LI, RI, L1-RSRP, L1-SINR, CapabilityIndex, TDCP a UE is configured by higher layers with N≥1 CSI-ReportConfig Reporting Settings and/or [X≥1 LTM-CSI-ReportConfig Reporting Settings], M≥1 CSI-ResourceConfig Resource Settings and/or [Y≥1 LTM-CSI-ResourceConfig Resource Settings], and one or two list(s) of trigger states (given by the higher layer parameters CSI-AperiodicTriggerStateList and CSI-SemiPersistentOnPUSCH-TriggerStateList). Each trigger state in CSI-AperiodicTriggerStateList contains a list of associated CSI-ReportConfigs or LTM-CSI-ReportConfigs indicating the Resource Set IDs for channel and optionally for interference where a Resource Set for interference can only be present for a Report Setting given by a CSI-ReportConfig and a trigger state additionally contains one or more [csi-ReportSubConfigID] if the associated CSI-ReportConfig configured with a list of sub-configurations, as described in Clause 5.2.1.1. Each trigger state in CSI-SemiPersistentOnPUSCH-TriggerStateList contains one associated CSI-ReportConfig [or LTM-CSI-ReportConfig], and a trigger state additionally contain one or more [csi-ReportSubConfigID] if the associated CSI-ReportConfig is configured with a list of sub-configurations, as described in Clause 5.2.1.1.

5.2.1.1 Reporting Settings

Each Reporting Setting CSI-ReportConfig is associated with a single downlink BWP (indicated by higher layer parameter BWP-Id) given in the associated CSI-ResourceConfig for channel measurement and contains the parameter(s) for one CSI reporting band: codebook configuration including codebook subset restriction, time-domain behavior, frequency granularity for CQI and PMI, measurement restriction configurations, and the CSI-related quantities to be reported by the UE such as the layer indicator (LI), L1-RSRP, L1-SINR, CRI, SSBRI (SSB Resource Indicator), Capability Index and TDCP.

The time domain behavior of the CSI-ReportConfig is indicated by the higher layer parameter reportConfigType and can be set to 'aperiodic', 'semiPersistentOnPUCCH', 'semiPersistentOnPUSCH', or 'periodic'. For 'periodic' and 'semiPersistentOnPUCCH'/'semiPersistentOnPUSCH' CSI reporting, the configured periodicity and slot offset applies in the numerology of the UL BWP in which the CSI report is configured to be transmitted on. The higher layer parameter reportQuantity indicates the CSI-related, L1-RSRP-related, L1-SINR-related, Capability Index-related or TDCP-related quantities to report.

5.2.1.2 Resource Settings

Each CSI Resource Setting CSI-ResourceConfig contains a configuration of a list of S≥1 CSI Resource Sets (given by higher layer parameter csi-RS-ResourceSetList), where the list is comprised of references to either or both of NZP CSI-RS resource set(s) and SS/PBCH block set(s) or the list is comprised of references to CSI-IM resource set(s). Each CSI Resource Setting is located in the DL BWP identified by the higher layer parameter BWP-id, and all CSI Resource Settings linked to a CSI Report Setting have the same DL BWP.

The time domain behavior of the CSI-RS resources within a CSI Resource Setting are indicated by the higher layer parameter resourceType and can be set to aperiodic, periodic, or semi-persistent.

The following are configured via higher layer signaling for one or more CSI Resource Settings for channel and interference measurement:

- CSI-IM resource for interference measurement as described in Clause 5.2.2.4.
- NZP CSI-RS resource for interference measurement as described in Clause 5.2.2.3.1.
- NZP CSI-RS resource for channel measurement as described in Clause 5.2.2.3.1.

. . .

5.2.1.4 Reporting Configurations

The UE shall calculate CSI parameters (if reported) assuming the following dependencies between CSI parameters (if reported)

- LI shall be calculated conditioned on the reported CQI, PMI, RI and CRI

CQI shall be calculated conditioned on the reported PMI, RI and CRI

PMI shall be calculated conditioned on the reported RI and CRI

RI shall be calculated conditioned on the reported CRI.

The Reporting configuration for CSI can be aperiodic (using PUSCH), periodic (using PUCCH) or semi-persistent (using PUCCH, and DCI activated PUSCH). The CSI-RS Resources can be periodic, semi-persistent, or aperiodic. Table 5.2.1.4-1 shows the supported combinations of CSI Reporting configurations and CSI-RS Resource configurations and how the CSI Reporting is triggered for each CSI-RS Resource configuration. Periodic CSI-RS is configured by higher layers. Semi-persistent CSI-RS is activated and deactivated as described in Clause 5.2.1.5.2. Aperiodic CSI-RS is configured and triggered/activated as described in Clause 5.2.1.5.1.

TABLE 5.2.1.4-1

Triggering/Activation of CSI Reporting for the possible CSI-RS Configurations.

| CSI-RS Configuration | Periodic CSI Reporting | Semi-Persistent CSI Reporting | Aperiodic CSI Reporting |
|---|---|---|---|
| Periodic CSI-RS | No dynamic triggering/activation | For reporting on PUCCH, the UE receives an activation command, as described in clause 6.1.3.16 of [10, TS 38.321]; for reporting on PUSCH, the UE receives triggering on DCI | Triggered by DCI; additionally, subselection indication as described in clause 6.1.3.13 of [10, TS 38.321] possible as defined in Clause 5.2.1.5.1. |
| Semi-Persistent CSI-RS | Not Supported | For reporting on PUCCH, the UE receives an activation command, as described in clause 6.1.3.16 of [10, TS 38.321]; for reporting on PUSCH, the UE receives triggering on DCI | Triggered by DCI; additionally, subselection indication as described in clause 6.1.3.13 of [10, TS 38.321] possible as defined in Clause 5.2.1.5.1. |
| Aperiodic CSI-RS | Not Supported | Not Supported | Triggered by DCI; additionally, subselection indication as described in clause 6.1.3.13 of [10, TS 38.321] possible as defined in Clause 5.2.1.5.1. |

For a periodic or semi-persistent CSI report on PUCCH, the periodicity $T_{CSI}$ (measured in slots) and the slot offset $T_{offset}$ are configured by the higher layer parameter reportSlotConfig. Unless specified otherwise, the UE shall transmit the CSI report in frames with SFN $n_f$ and slot number within the frame $$n^{\mu}_{s,f}$$

satisfying $$\left(N^{frame,\mu}_{slot} n_f + n^{\mu}_{s,f} - T_{offset}\right) \bmod T_{CSI} = 0$$

where μ is the SCS configuration of the UL BWP the CSI report is transmitted on.

5.2.1.5.1 Aperiodic CSI Reporting/Aperiodic CSI-RS when the Triggering PDCCH and the CSI-RS have the Same Numerology For CSI-RS resource sets associated with Resource Settings configured with the higher layer parameter resourceType set to 'aperiodic', 'periodic', or 'semi-persistent', trigger states for Reporting Setting(s) (configured with the higher layer parameter reportConfigType set to 'aperiodic') and/or Resource Setting for channel and/or interference measurement on one or more component carriers are configured using the higher layer parameter CSI-AperiodicTriggerStateList. For a reporting setting for which the CSI-ReportConfig contains a list of sub-configurations provided by the higher layer parameter csi-ReportSubConfigToAddModList, one or more trigger states can be configured with each indicating one or more of the sub-configurations.

A trigger state is initiated using the CSI request field in DCI.

When all the bits of CSI request field in DCI are set to zero, no CSI is requested.

When the number of CSI triggering states in CSI-Aperiodic TriggerState List is less than or equal to 2-Ts-1, the CSI request field in DCI directly indicates the triggering state.

For each aperiodic CSI-RS resource in a CSI-RS resource set associated with each CSI triggering state, the UE is indicated the quasi co-location configuration of quasi co-location RS source(s) and quasi co-location type(s), as described in clause 5.1.5, through higher layer signaling of qcl-info which contains a list of references to TCI-State's for the aperiodic CSI-RS resources associated with the CSI triggering state. If a State referred to in the list is configured with a reference to an RS configured with qcl-Type set to 'typeD', that RS may be an SS/PBCH block located in the same or different CC/DL BWP or a CSI-RS resource configured as periodic or semi-persistent located in the same or different CC/DL BWP.

. . .

If dl-OrJointTCI-StateList-r17 is provided, the UE may assume that a CSI-RS resource in an aperiodic CSI-RS resource set configured without trs-Info is quasi co-located with the RS(s) in the indicated TCI state.

A non-zero codepoint of the CSI request field in the DCI is mapped to a CSI triggering state according to the order of the associated positions of the up to $2^{N_{TS}}-1$ trigger states in CSI-AperiodicTriggerStateList with codepoint '1' mapped to the triggering state in the first position.

For a UE configured with the higher layer parameter CSI-AperiodicTriggerStateList, if a Resource Setting linked to a CSI-ReportConfig has multiple aperiodic resource sets, only one of the aperiodic CSI-RS resource sets from the Resource Setting is associated with the trigger state, and the UE is higher layer configured per trigger state per Resource Setting to select the one CSI-IM/NZP CSI-RS resource set from the Resource Setting.

5.2.3 CSI Reporting Using PUSCH

A UE shall perform aperiodic CSI reporting using PUSCH on serving cell c upon successful decoding of a DCI format 0_1 or DCI format 0_2 which triggers an aperiodic CSI trigger state.

When a DCI format 0_1 schedules two PUSCH allocations, the aperiodic CSI report is carried on the second scheduled PUSCH. When a DCI format 0_1 schedules more than two PUSCH allocations, the aperiodic CSI report is carried on the penultimate scheduled PUSCH.

. . .

When the higher layer parameter reportQuantity is configured with one of the values 'cri-RSRP', 'ssb-Index-RSRP', 'cri-SINR' or 'ssb-Index-SINR', or 'cri-RSRP-Index', 'ssb-Index-RSRP-Index', 'cri-SINR-Index', 'ssb-Index-SINR-Index', 'tdcp', the CSI feedback consists of a single part.

In [4] 3GPP TS 38.321 V18.3.0, the following is provided:

6.1.3.16 SP CSI Reporting on PUCCH Activation/Deactivation MAC CE

The SP CSI reporting on PUCCH Activation/Deactivation MAC CE is identified by a MAC subheader with LCID as specified in Table 6.2.1-1. It has a fixed size of 16 bits with following fields:

Serving Cell ID: This field indicates the identity of the Serving Cell for which the MAC CE applies. The length of the field is 5 bits;

BWP ID: This field indicates a UL BWP for which the MAC CE applies as the codepoint of the DCI bandwidth part indicator field as specified in TS 38.212 [9]. The length of the BWP ID field is 2 bits;

L: This field indicates whether the MAC CE applies to SP CSI reporting on PUCCH Activation/Deactivation for LTM or not. If ltm-CSI-ReportConfigToAddModList is not configured, R field is present instead (i.e. set to 0);

$S_i$: This field indicates the activation/deactivation status of the Semi-Persistent CSI report configuration within ltm-CSI-ReportConfigToAddModList if L field is set to 1, or csi-ReportConfigToAddModList if L field is set to 0, as specified in TS 38.331 [5]. So refers to the report configuration which includes PUCCH resources for SP CSI reporting in the indicated BWP and has the lowest CSI-ReportConfigId or LTM-CSI-ReportConfigId within the list with type set to semiPersistentOnPUCCH, Si to the report configuration which includes PUCCH resources for SP CSI reporting in the indicated BWP and has the second lowest CSI-ReportConfigId or LTM-CSI-ReportConfigId and so on. If the number of report configurations within the list with type set to semiPersistentOnPUCCH in the indicated BWP is less than i+1, MAC entity shall ignore the Si field. The Si field is set to 1 to indicate that the corresponding Semi-Persistent CSI report configuration shall be activated. The Si field is set to 0 to indicate that the corresponding Semi-Persistent CSI report configuration i shall be deactivated. If the Semi-Persistent CSI report configuration i is configured with csi-ReportSubConfigToAddModList, the Si field is set to 0 to additionally indicate that all sub-configurations within csi-ReportSubConfigToAddModList shall be deactivated;

R: Reserved bit, set to 0.

NOTE: If a Semi-Persistent CSI report configuration i is configured with csi-ReportSubConfigToAddModList, the corresponding Si field is not set to 1.

Figure 6:
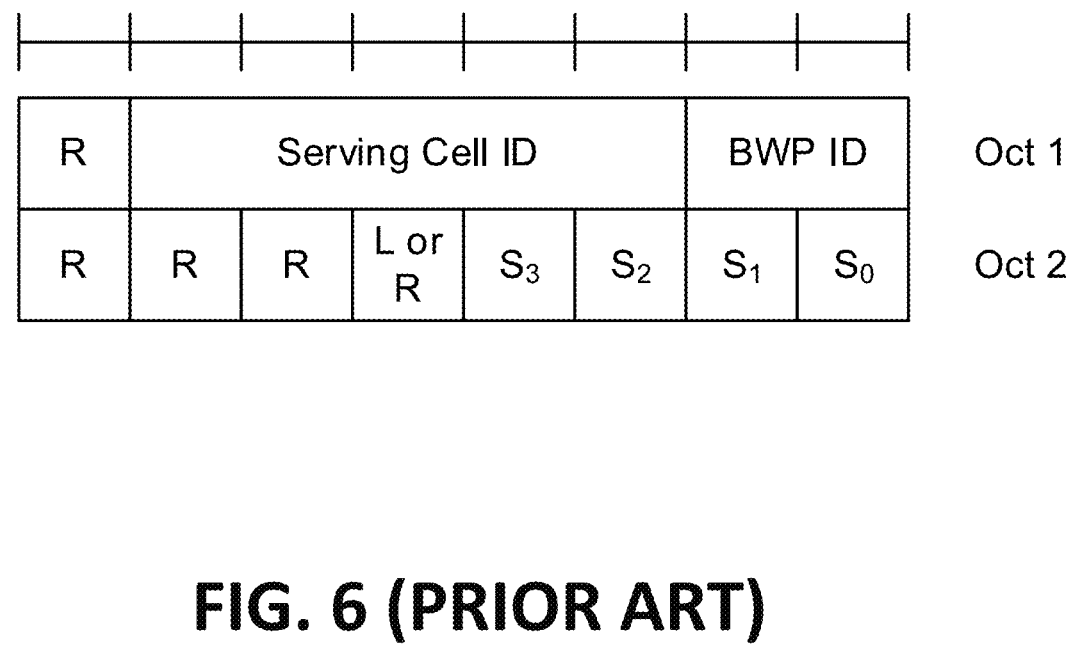

FIG. 6 is a reproduction of FIG. 6.1.3.16-1: SP CSI reporting on PUCCH Activation/Deactivation MAC CE, from 3GPP TS 38.321 V18.3.0.

In [5] 3GPP TS 38.212 V18.2.0, the following is provided:

7.3.1 DCI Formats

The DCI formats defined in table 7.3.1-1 are supported.

TABLE 7.3.1-1

| DCI formats | |
|---|---|
| DCI format | Usage |
| 0_0 | Scheduling of PUSCH in one cell |
| 0_1 | Scheduling of one or multiple PUSCH in one cell, or indicating downlink feedback information for configured grant PUSCH (CG-DFI) |
| 1 0 | Scheduling of PDSCH in one cell |
| 1_1 | Scheduling of one or multiple PDSCH in one cell, and/or triggering one shot HARQ-ACK codebook feedback |

. . .

7.3.1.1.2 Format 0_1

DCI format 0_1 is used for the scheduling of one or multiple PUSCH in one cell, or indicating CG downlink feedback information (CG-DFI) to a UE.

The following information is transmitted by means of the DCI format 0_1 with CRC scrambled by C-RNTI or CS-RNTI or SP-CSI-RNTI or MCS-C-RNTI:

Identifier for DCI formats-1 bit

The value of this bit field is always set to 0, indicating an UL DCI format

Carrier indicator-0 or 3 bits, as defined in Clause 10.1 of [5, TS38.213]. This field is reserved when this format is carried by PDCCH on the primary cell and the UE is configured for scheduling on the primary cell from an SCell, with the same number of bits as that in this format carried by PDCCH on the SCell for scheduling on the primary cell.

. . .

Bandwidth part indicator—0, 1 or 2 bits as determined by the number of UL BWPS $n_{BWP,RRC}$ configured by higher layers, excluding the initial UL bandwidth part. The bitwidth for this field is determined as $\lceil \log_2(n_{BWP}) \rceil$ bits, where

. . .

Frequency domain resource assignment-number of bits determined by the following, where $$N_{RB}^{UL,BWP}$$

is the size of the active UL bandwidth part:

. . .

CSI request—0, 1, 2, 3, 4, 5, or 6 bits determined by higher layer parameter reportTriggerSize.

. . .

7.3.1.2.2 Format 1_1

DCI format 1_1 is used for the scheduling of one or multiple PDSCH in one cell.

The following information is transmitted by means of the DCI format 1_1 with CRC scrambled by C-RNTI or CS-RNTI or MCS-C-RNTI:

Identifier for DCI formats—1 bits

The value of this bit field is always set to 1, indicating a DL DCI format

Carrier indicator—0 or 3 bits as defined in Clause 10.1 of [5, TS 38.213]. This field is reserved when this format is carried by PDCCH on the primary cell and the UE is configured for scheduling on the primary cell from an SCell, with the same number of bits as that in this format carried by PDCCH on the SCell for scheduling on the primary cell.

Bandwidth part indicator—0, 1 or 2 bits as determined by the number of DL BWPS $n_{BWP,RRC}$ configured by higher layers, excluding the initial DL bandwidth part. The bitwidth for this field is determined as $\lceil \log_2(n_{BWP}) \rceil$ bits, where

. . .

Frequency domain resource assignment-number of bits determined by the following, where $$N_{RB}^{DL,BWP}$$

is the size of the active DL bandwidth part:

. . .

Time domain resource assignment—0, 1, 2, 3, 4, 5 or 6 bits

. . .

Transmission configuration indication—0 bit if higher layer parameter tci-PresentInDCI is not enabled; otherwise 3 bits as defined in Clause 5.1.5 of [6, TS38.214].

In [6] Chair notes RAN1 #116 com0, [7] Chair's notes RAN1 #116bis eom0, [8] Chair notes RAN1 #117 eom0, [9] Chair notes RAN1 #118 eom0, [10] Chair's notes RAN1 #118bis eom0, and [11] Chair notes RAN1 #119 eom0, past RAN1 agreements related to AI/ML for beam management are quoted below:

Agreement

For UE-sided model, at least for BM-Case1, for content in the report of inference results, support Opt 1: Beam information on predicted Top K beam(s) among a set of beams Opt 2: Beam information on predicted Top K beam(s) among a set of beams and RSRP of predicted Top K beam(s) among a set of beams At least K=1 and more, FFS on max value where the set of beams is Set A, i.e., the beams for UE prediction.

. . .

Agreement

For UE-side AI/ML model inference, for BM-Case2, support to report inference results of N (N>=1, FFS on N) future time instance(s) in one report wherein information of inference results of one time instance is as in one report for BM-Case 1

Agreement

For report content of inference results for UE-sided model for BM-Case 1, for the RSRP of predicted Top K beam(s) in the report of inference results, when applicable, further study the following options:

Option A: Predicted RSRP.

Option B: Predicted RSRP, if the beam is not configured for corresponding measurement, and measured L1-RSRP if the beam is configured for corresponding measurement Where the predicted RSRP is based on AI/ML output Note: Support both Option A and Option B is not precluded.

Working Assumption

For report content of inference results for UE-sided model for BM-Case 2, the RSRP of predicted beam(s) in the report of inference results, is the predicted RSRP, where the predicted RSRP is based on AI/ML output

. . .

Agreement

For BM-Case1 and BM-Case2 with a UE-side AI/ML model:

Support Type 1 performance monitoring, including the following two options:

Option 1 (NW-side performance monitoring):

UE sends a report to NW (for the calculation of performance metric at NW)

Measurement results from resource set for monitoring, e.g., L1-RSRP and/or RS index is supported as the content of the report FFS on other contents.

The report is at least configured/triggered by NW

Note: this may or may not have additional spec impact

Option 2 (UE-assisted performance monitoring):

UE calculates performance metric(s)

FFS how to report and what to report

FFS whether to trigger the report based on event(s) for Option 1 and/or Option 2

Agreement

Following Working Assumption is confirmed.

Working Assumption

For report content of inference results for UE-sided model for BM-Case 2, the RSRP of predicted beam(s) in the report of inference results, is the predicted RSRP, where the predicted RSRP is based on AI/ML output.

. . .

Agreement

For UE sided model in beam management, support associated ID

[Working Assumption]

The associated ID at least can be configured within CSI framework

FFS on details

FFS on whether/how to configure/indicate the associated ID via other signal(s) and/or in other procedure(s)/framework(s)

UE may assume the similar properties of a DL Tx beam or beam set/list associated with the same associated ID FFS: whether/how to define similar properties of a DL Tx beam or beam set/list Agreement For UE-sided model, for the quantization of a RSRP value at least for the report of inference results, support Support differential RSRP reporting with legacy quantization step and range for L1-RSRP reporting For BM-Case 1, support differential RSRP report among multiple beams For BM-Case 2, support differential RSRP report among multiple beams over multiple time instances FFS details.

Agreement

For UE-sided model at least for BM Case-1, for inference results report.

Two resource sets can be configured for Set A and Set B separately in the CSI report configuration for the report FFS whether support only resource set for Set B is configured UE performs measurement on the resource set for Set B for inference, and UE is not expected to measure resource set for Set A for inference, The beam information in the inference report refers to the resource set for Set A Agreement For UE-sided model for BM-Case 2, for inference results report, support to configure UE with N future time instance(s) for inference by NW when applicable Agreement For BM-Case1 and BM-Case2 with a UE-sided AI/ML model, for Option 2 (UE-assisted performance monitoring), At least support Alt 1: Top 1 or Top K beam prediction accuracy (with or without margin) by comparing the prediction results and the Top 1 or Top K beam based on the measurements from a resource set/resources for monitoring Agreement For BM-Case 2 of UE-side model, for the reference time of the earliest time instance for the predicted results, consider at least the following alternatives for potential down-selection:

Option 1: Based on the uplink slot for the report

Option 2: Based on the CSI reference resource corresponding to the report

Option 3: Based on the latest transmission occasion of the CSI-RS/SSB resource in Set B for measurement for the report, wherein the transmission occasion is no later than the CSI reference resource Agreement For UE-side AI/ML model, for BM-Case1, at least for inference, at least for Set B, support the following CSI-RS resource types for CMR:

Periodic (P) CSI-RS

Semi-persistent (SP) CSI-RS

Aperiodic (AP) CSI-RS

For UE-side AI/ML model, for BM-Case 2, at least for inference, at least for Set B, support the following CSI-RS resource types for CMR:

Periodic (P) CSI-RS

Semi-persistent (SP) CSI-RS

FFS: Aperiodic (AP) CSI-RS

Note: above CSI-RS resource refers to that used for beam management.

Agreement

For UE-side model, for beam management, for inference report, support periodic CSI report, aperiodic CSI report, and semi-persistent CSI report.

Agreement

Incorporating Below Text into the General Part of the LS

In RAN1's discussion of RAN 2 terminologies on beam management,

The concept/terminology "functionality" of Supported functionalities may refer to UE-capability information/parameters i.e., Rel-19 AI/ML-specific FGs The concept/terminology "functionality" of Applicable functionalities may refer to CSI-ReportConfig for inference configuration or a set of inference related parameters or information/parameters indicated by UE.

The Activated functionalities may be enabled based on CSI framework.

Therefore, the meaning and the granularity of "functionality" for Applicable functionalities, Activated functionalities and Supported functionalities may or may not be the same, depends on certain option in RAN1, and the discussion is still ongoing

. . .

Agreement

For UE-sided model, at least for BM-Case 1, the beam information in inference result report is CRI/SSBRI of resource in Set A.

Agreement

For both BM-Case 1 and BM-Case 2, for UE-sided model for inference, when Set A and Set B are configured within CSI report configuration, Two CSI-ResourceConfigId s are configured for Set A and Set B separately Agreement In Step 3, following configurations are provided from NW to UE:

UE is allowed to do UAI reporting via OtherConfig,

The applicability report is based on A) and/or B)

It is up to RAN 2 to design the container

A) one or more of CSI-ReportConfig for inference configuration (wherein the associated ID may be configured in CSI framework as working assumption applied)

Note: CSI report configuration for UE-side model inference can't be activated immediately upon receiving Step 3

B) One set or multiple sets of inference related parameters for applicability report only (not for inference).

It is up to RAN2 to design the container.

The set of inference related parameters selected from the IEs in/or the IEs referred by CSI-ReportConfig as a starting point, e.g., the associated ID Note: this doesn't imply the associated ID is mandatory Set A related information Set B related information Report content related information For BM-Case 2, Time instances related information for measurements Time instances related information for prediction.

In Step 4, UE reports applicability for all the above A) one or more CSI-ReportConfig and/or B) set(s) of inference related parameters FFS on whether/what other information along with the applicability is needed If A) is configured in Step 3, Applicable aperiodic CSI Report and semi-persistent CSI report can be activated/triggered by NW after the applicability reported.

Applicable periodic CSI Report is considered as activated only if the applicability of the corresponding CSI-ReportConfig is reported in RRCReconfigurationComplete.

In Step 5, NW can optionally configure CSI-ReportConfig for inference configuration in RRCReconfiguration, where the associated ID may be configured in CSI framework as working assumption applied.

Note: Step 5 may be optional if UE has already been configured with CSI-ReportConfig in Step 3

Agreement

At least for the monitoring Type 1 Option 2 of UE-side model monitoring (when applicable), support to reuse CSI framework for the configuration for monitoring result report in L1 signaling:

Dedicated resource set(s) for monitoring and report configuration for monitoring are configured in a dedicated CSI report configuration used for monitoring The ID of an inference report configuration is configured in the configuration for monitoring to link the inference report configuration and monitoring report configuration FFS how to identify the connection between RSs in the resource set(s) for monitoring and Set A beams FFS on whether to support all the combination on time domain behavior of the reportConfigType for inference report and the reportConfigType for monitoring report FFS on the timing related issues UE measures the dedicated resource set(s) for monitoring.

CONCLUSION

For the CSI-ReportConfig for inference configuration provided in Step 5, aperiodic CSI Report and semi-persistent CSI report can be activated/triggered by NW after RRCReconfigurationComplete.

periodic CSI Report is considered as activated after RRCReconfigurationComplete.

Note: UE is not expected to be configured with a CSI-ReportConfig for inference configuration for a non-applicable set of inference parameters or a non-applicable CSI-ReportConfig Any specification impact is a separate discussion In New Radio (NR) Rel-19, introducing Artificial Intelligence/Machine Learning (AI/ML) functionality in 3GPP standard has been agreed on. During the study item phase, technical report TR 38.843 has listed a plurality of use cases of AI/ML functionality. For example, three typical cases listed in the technical report corresponds to AI/ML for beam management, positioning, and Channel State Information (CSI) prediction. More specifically, sub-use cases for beam management could be Beam Management (BM)-case 1 corresponding to Spatial-domain Downlink beam prediction for Set A of beams based on measurement results of Set B of beams and BM-case2 corresponding to Temporal Downlink beam prediction for Set A of beams based on the historic measurement results of Set B of beams. Besides, RAN1 has agreed to use CSI framework for set A and set B. A User Equipment (UE) could be configured with periodic, semi-persistent, aperiodic CSI Reference Signal (RS) resource as set B which is used for input of an AI/ML inference model. Preferably in certain embodiments, resources in set A correspond to a (candidate/nominal) output AI/ML inference model. The UE may transmit information related to AI/ML capability to a network node. Typically, during the study item phase, UE-side AI/ML inference and network node-side AI/ML inference are both considered and studied. In order to have an aligned UE and network side condition for training and inference, network node would indicate or signal an association Identity (ID) to the UE. Based on the association ID, the UE will determine which AI/ML training model satisfying condition or use case for inference. The UE may perform measurement for AI/ML model training. The UE may receive a signal from the network node for associating one AI/ML mode for inference (e.g., AI/ML inference model). The UE may report the AI/ML inference result. Typically, the AI/ML inference result comprises information associated with a Top-K beam. The AI/ML inference result comprises ID/index related information associated with a resource, in the set A, associated with the Top-K beam. The AI/ML inference result comprises a quantity associated with the Top-K beam. For BM-case2, the AI/ML inference result may comprise information associated with a timing. No matter the BM use cases, when a network node receives an AI/ML inference result comprising information associated with the Top-K beam, the network node may need to know the detailed measured result. Otherwise, once the AI/ML inference result causes an inference error, performance may degrade more than the UE without being configured with applying/using AI/ML functionality. Especially for BM-case2, even the AI/ML inference result for future time instances could be in a coherence time of channel and there may be prediction risk for AI/ML inference results for farther or more distant future timing. Thus, it seems beneficial to design reporting AI/ML inference result before a network node actually indicates the UE to apply (at least) one of the AI/ML inference results. A dedicated resource set and report configuration for monitoring are introduced for performance monitoring for AI/ML inference results.

For BM-case2, one benefit is to reduce measurement signaling overhead. A measurement window and a prediction window could be considered to achieve this purpose. However, based on the current CSI framework, CSI-RS for measurement could be configured with periodicity and a CSI Report could be configured with Physical Uplink Control Channel (PUCCH)/Physical Uplink Shared Channel (PUSCH) with periodicity for transmitting the CSI report, it is not clear how to define the measurement window and the prediction window. Thus, it is desired to design some solutions to solve this issue.

One summary for determining a measurement window:

Implicitly based on inference report's periodicity, or set B's periodicity.

Explicitly based on a configured measurement window.

Configuration alignment between a measurement window and an inference report's periodicity or periodicity of a measurement window is configured to be shorter than or equal to the inference report's periodicity (excluding the case of too many time instances of sets B).

One-to-one mapping between a measurement window and one time instance of a report (associated with inference).

Size of the measurement window should be configured to be equal to an interval between any two consecutive time instances of a report (or a number of time instances of set B (corresponding to a measurement window) should be configured to be equal to a number of time instances of set B between any two consecutive time instances of a report).

Size of the measurement window should be configured to be smaller than or equal to an interval between any two consecutive time instances of a report (or a number of time instances of set B (corresponding to a measurement window) should be configured to be smaller than or equal to a number of time instances of set B between any two consecutive time instances of a report).

Orphan time instance(s) of set B could be handled below.

Allow the measurement window to be configured shorter or longer than periodicity of the inference report (and the UE's measured behavior is determined based on one or more time instances, which is configured by the Next Generation Node B (gNB) and is also during a configured measurement window).

If/when the measurement window is shorter than the inference report's periodicity=>a need to handle orphan one or more time instances of set B, which is not within the measurement window.

Opt1: the UE will skip the one or more orphan time instance(s) of set B (and network node 1 will not transmit on the one or more time instance(s)).

Opt2: the UE still performs reception regardless of overlapping with the measurement window or not.

Which UE behavior is performed could be controlled by the gNB and be indicated/configured by a Radio Resource Control (RRC)/Medium Access Control (MAC) Control Element (CE), and the measurement window can be dynamically adjusted.

Orphan time instance(s) of set B corresponds to time instances of a set which is not overlapped with the measurement window, and the UE will skip the one or more orphan time instance(s) of set B (and the network node will not transmit on the one or more time instance(s)).

If the measurement window is longer than the inference report's periodicity=>a first set of time instances needs to be buffered than a threshold, while a second set of time instances does not need to be buffered with that longer time.

Set B's receiving/monitoring behavior: based on set B's time instance and measurement window.

Only time instances within the measurement window need to be monitored.

Time instances of set B within a prediction window could be skipped.

Availability of the inference result for a corresponding time instance of set A may be taken into account.

A processing time with respect to the inference report (prediction is too close to the timing of the inference report).

The gNB ensures that [t1-delta1, t1+delta2] without overlapping with time instance of set B or overlapping with time instance of set A, wherein t1 corresponds to timing of an inference report.

The gNB configures which starting time instance of set A in a prediction window (e.g., processing time 10 ms after the inference report).

The gNB indicates (by lower layer signal) which starting time instance of set A in the prediction window (e.g., processing time 10 ms after inference report).

The UE selects by itself and report content may indicate this information of which starting time instance of set A in the prediction window.

Set A and set B (Periodicity correspondence).

Periodicity should be configured as the same value for set A and set B, wherein set A and set B are configured associated with the same CSI-ReportConfig.

Periodicity could be configured as the same or a different value for set A and set B, wherein set A and set B are configured associated with the same CSI-ReportConfig.

One summary for determining a prediction window:

Implicitly based on an inference report's periodicity.

Explicitly based on a configured prediction window.

Configuration alignment between the prediction window and the inference report's periodicity or periodicity of the prediction window is configured to be shorter than or equal to the inference report's periodicity (excluding the case of too many prediction set A time instances).

Allow the prediction window to be configured shorter or longer than periodicity of the inference report (and the UE's predicted behavior is determined based on one or more time instances, which is configured by the gNB and also during the configured prediction window).

If the prediction window is shorter than the inference report's periodicity=>a need to handle orphan one or more time instances of set A.

the UE will skip the one or more orphan time instance(s) of set B (and the network node will not transmit on the one or more time instance(s)).

Which UE behavior is performed could be controlled by the gNB and be indicated/configured by RRC/MAC CE, and the measurement window can be dynamically adjusted.

If the prediction window is longer than the inference report's periodicity=>gNB's choice to have fine tuning according to updating the prediction result.

Meaning of the window:

Saving time instances for one or more purposes.

Construct input/output of an AI/ML model.

Association between the measurement window and the prediction window could be semi-static or based on a lower layer signal to update.

A UE can skip monitoring or receiving a time instance of set B when the time instance of set B is not within a measurement window. Based on a configuration, the UE could be configured with a periodic RS burst as a plurality of time instances of set B. The UE could be configured with a first subset of time instances of set B for reception based on the measurement window configuration. Preferably in certain embodiments, time instances of set B could be separated into a first subset and a second subset. Preferably in certain embodiments, the first subset of time instances of set B is within a measurement window. Preferably in certain embodiments, the second subset of time instances of set B is not within a measurement window. Preferably in certain embodiments, the measurement window configuration could be replaced by an explicit signal illustrated in the second concept2. Preferably in certain embodiments, the measurement window configuration could be a number of time instances of set B with a periodicity. Preferably in certain embodiments, in each periodicity of a measurement window, the measurement window may (be time domain overlapping with) comprise one or more time instances of set B. Preferably in certain embodiments, the UE could (only) monitor or receive the one or more time instances of set B. Alternatively in certain embodiments, the measurement window configuration could be a number of time instances of set B.

Preferably in certain embodiments, based on the number of time instances of set B (according to the measurement window configuration) and report periodicity, the UE could determine a measurement window for each time instance of the inference report. In one example, t, t+P, t+2P corresponds to time instance for the inference report associated with one CSI-ReportConfig, wherein P corresponds to a periodicity of the inference report, and the measurement window for the inference report in time instance t+P comprises a number of time instance of set B during t to t+P. Preferably in certain embodiments, the measurement window for the inference report in time instance t+P is with respect to the time instance t+P. Preferably in certain embodiments, the number of time instance of set B corresponds to all time instances of set B during t to t+P. Alternatively in certain embodiments, the number of time instance of set B corresponds to the latest time instances of set B with respect to time instance t+P. Alternatively in certain embodiments, the measurement window for the inference report in time instance t+P comprises a second number of time instances of set B, wherein the second number of time instances of set B may be larger than a first number of time instances of set B during t to t+P. The UE buffers or stores a measurement result in the latest third number of time instances of set B. Preferably in certain embodiments, the third number of time instances of set B is determined based on the difference between the second number and the first number. Preferably in certain embodiments, once the UE transmits an inference report in time instance of t+P, the UE buffers and stores the third latest number of time instances of set B and clears or releases or drops the measurement result of other earlier first number of time instances of set B. In one example, in FIG. 7, Xi corresponds to the time instance of set B associated with one CSI-ReportConfig. Assuming the measurement window for the inference report in time instance t+P corresponds to X2~X7 (e.g., the second number (measurement window size) is 6 and the first number (inference report periodicity) is 4), when the UE transmits the inference report in time instance t+P, the UE may keep storing a measurement result in X6 and X7 (e.g., the third number is 6−4=2) and/or the UE may clear the measurement result of X2~X5. Preferably in certain embodiments, the UE clears the measurement result in X6 and X7 after the UE transmits the inference report in t+2P.

Preferably in certain embodiments, the above example is under one CSI-ReportConfig, which means the present invention concerns a same set B according to one CSI-ReportConfig.

Preferably in certain embodiments, set B could be replaced by set A.

Preferably and/or alternatively in certain embodiments, the third concept could be further considering a prediction window. The UE can skip monitoring or receiving a time instance of set B when the time instance of set B is not within a measurement window and the time instance of set B is within a prediction window. Preferably in certain embodiments, for a periodic inference report (e.g., CSI-ReportConfig with reportConfigType as periodic), the UE does not perform monitoring or receiving a time instance of set B when the time instance of set B is not within a measurement window and the time instance of set B is within a prediction window.

Figures 7, 8:
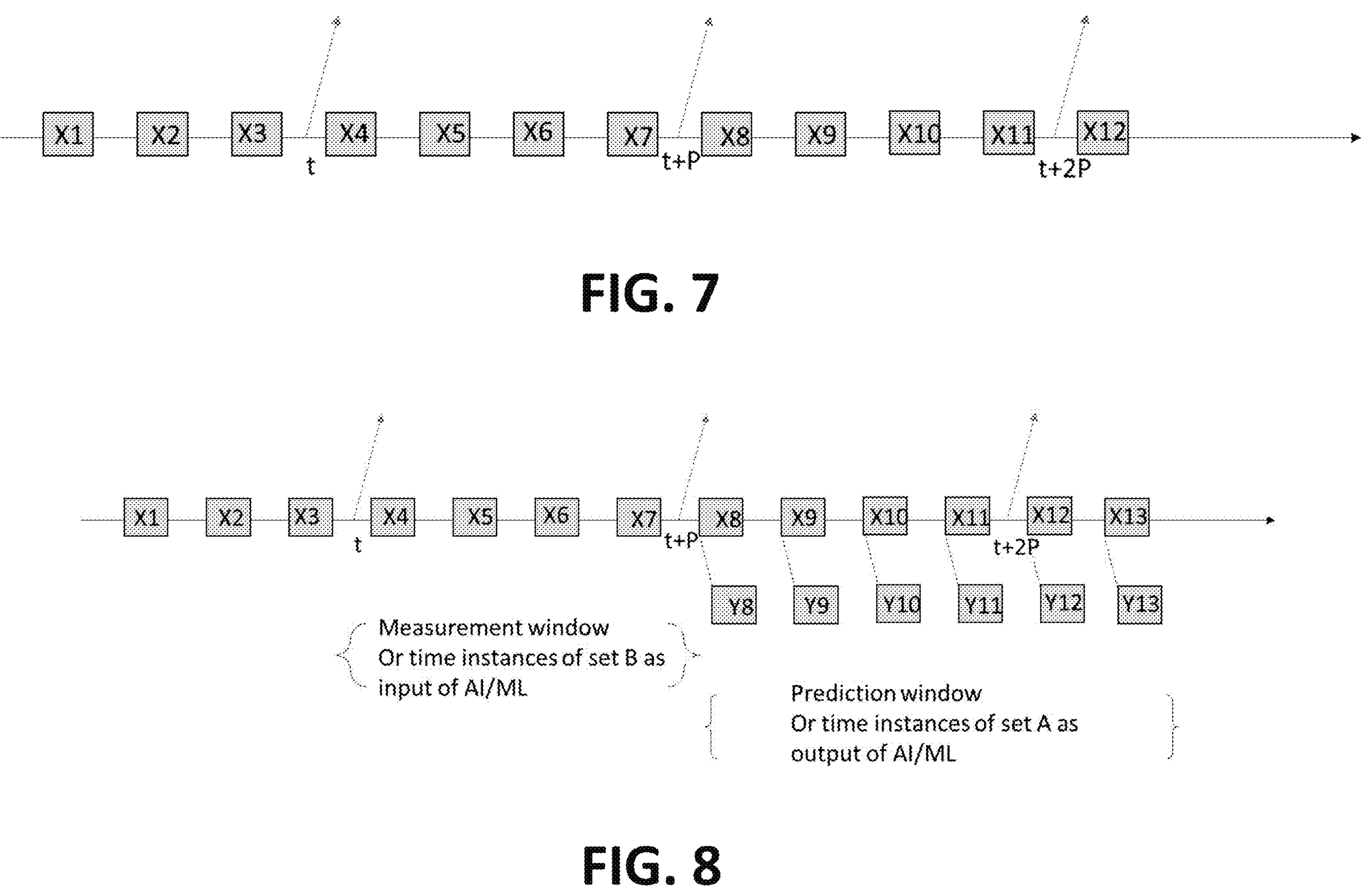
FIG. 7 is an example diagram showing Xi corresponds to the time instance of set B associated with one CSI-Report-Config, in accordance with embodiments of the present invention.
FIG. 8 is an example diagram showing Xi corresponds to a time instance of a periodic set B, and t, t+P, t+2P corresponds to timing of the inference report associated with the set B, Yi corresponds to a time instance of set A, in accordance with embodiments of the present invention.

In one example, in FIG. 8 (for the periodic inference report), Xi corresponds to a time instance of a periodic set B, and t, t+P, t+2P correspond to timing of the inference report associated with the set B, Yi corresponds to a time instance of set A (i.e., any two consecutive Y is associated with one inference report should be associated with one periodicity, e.g., periodicity of set A). There may be a time offset between a starting timing of Xi and Yi (with same index i). The time interval for Xi and the time interval for Yi could be the same or different. Assuming a measurement window corresponds to 4 time instances of set B and a prediction window corresponds to 6 time instances of set A. For the inference report transmitted in t+P, a measurement window corresponds to X4, X5, X6, X7 and a prediction window corresponds to Y8~Y13. In this example, X8~X13 of set B could be skipped for reception or partially skipped (e.g., X8~X11 or X12~X13 skipped based on whether the inference report on the next transmission opportunity/timing is sent/generated/reported or not or based on a configuration indicating skipping information like timings or numbers for those Xi timings corresponding to Yi timings). In response that X8~X13 is within a prediction window or in response that a latest time instance of set A having an inference result (being reported) or in response that a corresponding time instance of set A having an inference result (being reported), the UE skips receiving or monitoring set B in those time instance(s) of set B.

Preferably in certain embodiments, for an aperiodic inference report (e.g., CSI-ReportConfig with reportConfig Type as aperiodic), the UE does not perform monitoring or receiving a time instance of set B when the time instance of set B is within a prediction window. Preferably in certain embodiments, the prediction window is in response to an aperiodic inference report. Preferably in certain embodiments, after the prediction window which is in respect to the aperiodic inference report, the UE monitors one or more time instances of set B according to a configuration (e.g., set B associated with the CSI-ReportConfig with reportConfigType as aperiodic).

Figures 9, 10:
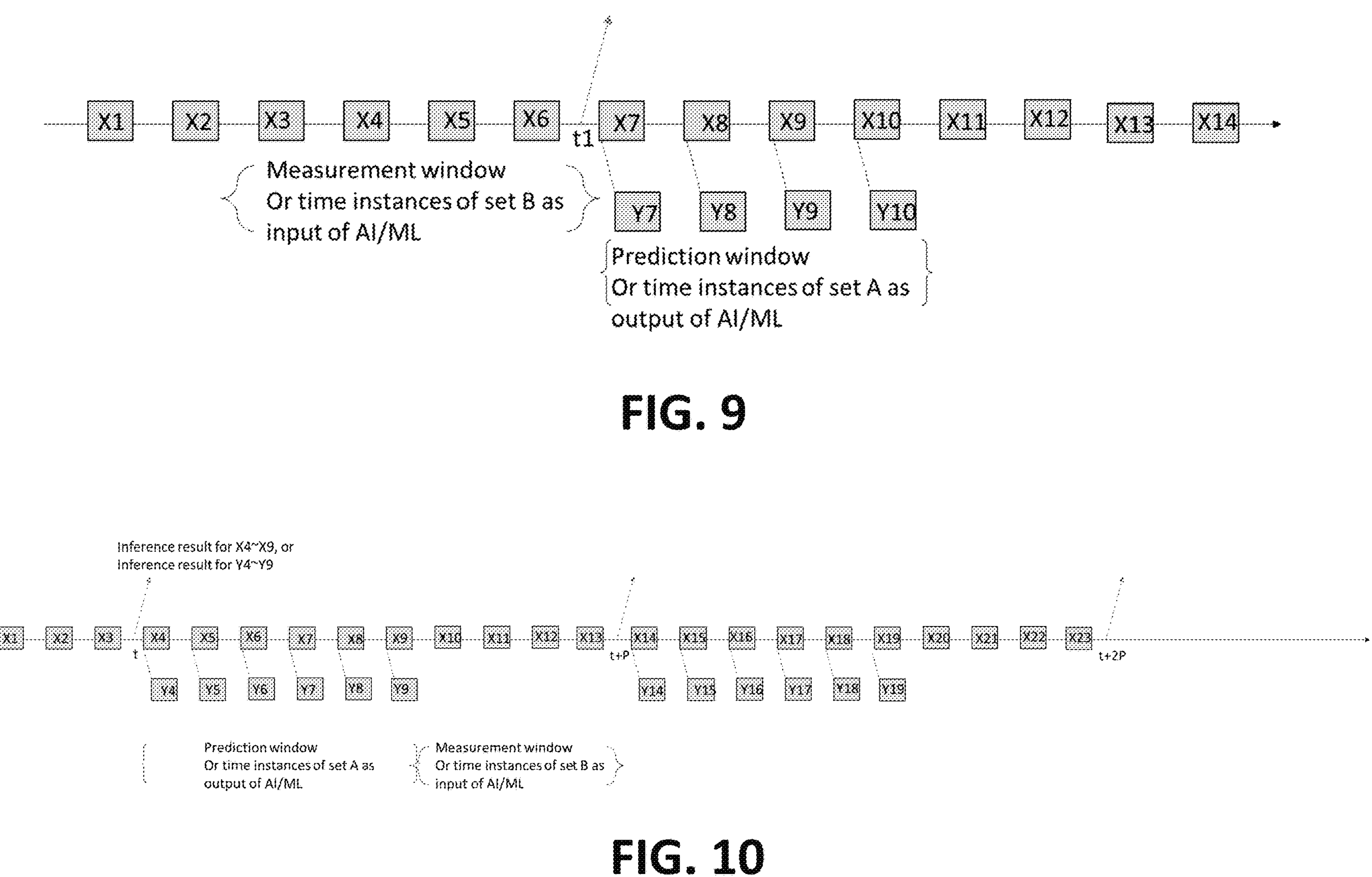
FIG. 9 is an example diagram showing Xi corresponds to a time instance of periodic set B, and t1 correspond to timing of the inference report associated with the set B, Yi corresponds to a time instance of set A, in accordance with embodiments of the present invention.
FIG. 10 is an example diagram showing Xi corresponds to the time instance of set B and Yi corresponds to the time instance of set A, and t, t+P, t+2P corresponds to the periodic inference report, in accordance with embodiments of the present invention.

In one example, in FIG. 9 (for aperiodic inference report), Xi corresponds to a time instance of periodic set B, and t1 correspond to timing of the inference report associated with the set B, Yi corresponds to a time instance of set A (i.e., any two consecutive Y is associated with one inference report should be associated with one periodicity, e.g., periodicity of set A). There may be a time offset between a starting timing of Xi and Yi (with same index i). The time interval for Xi and the time interval for Yi could be the same or different. Assuming a measurement window corresponds to 4 time instances of set B and a prediction window corresponds to 4 time instances of set A. For the inference report transmitted in t1, a measurement window corresponds to X3, X4, X5, X6 and a prediction window corresponds to Y7~Y10. In this example, X7~X10 of set B could be (all) skipped or partially skipped for reception (e.g., as described above). In response that X7~X10 is within a prediction window or in response that a latest time instance of set A having an inference result (being reported) or in response that a corresponding time instance of set A having an inference result (being reported), the UE skips receiving or monitoring set B in those time instance(s) of set B. For X11~X14, since there is no prediction result (or inference result) or they are not skipped, the UE receives or monitors set B in those time instance(s).

Preferably in certain embodiments, a UE is configured with a CSI-ReportConfig associated with AI/ML inference. Preferably in certain embodiments, when the CSI-ReportConfig is configured with periodic, the UE expects that during any two consecutive of inference reports (associated with the CSI-ReportConfig) the same CSI-ReportConfig or another configuration comprises or indicates a first number of time instances of set A for prediction and a second number of time instances of set B for measurement. These two numbers may be explicitly configured or implicitly derived from each other or by another information indicating a specific timing/number/length between two (consecutive) inference reporting opportunities. There is at least one-to-one mapping between each time instance of set A and set B. Preferably in certain embodiments, it may based on the latest time domain time instance relationship to associate with one instance of set A and one time instance of set B. Once the UE has transmitted a report comprising a prediction result associated with a time instance of set A, the UE could skip to receive or monitor corresponding time instance of set B. The UE does not monitor or receive the first number of time instances of set B, which corresponding time instances of set A is with the prediction result reported by the UE. If the UE does not transmit the inference report, or the inference report does not provide prediction result of a time instance of set A, the UE monitors set B on the time instance.

The UE expects that measurement window and prediction window associated with a CSI-ReportConfig will not overlap in time domain. The UE does not expect that the measurement window and prediction window associated with a CSI-ReportConfig will overlap in time domain. The UE expects that each periodicity of the inference report should comprise only one measurement window and only one prediction window associated with one CSI-ReportConfig. The UE expects that each periodicity of the inference report should comprise at least one measurement window and one prediction window associated with one CSI-ReportConfig. If a time instance of set B is associated with both the measurement window and prediction window (for one CSI-ReportConfig), the UE receives or monitors set B on the time instance regardless of whether the UE has reported the inference result for the time instance of set B or the UE has reported the inference result for a corresponding time instance of set A associated with the time instance of set B.

From a network node perspective, the network node will determine whether to transmit set B on one time instance based on a previous inference report. The network node could skip transmitting set B on one time instance if a corresponding time instance of set A has an available inference result reported in a previous inference report.

In one example, in FIG. 10, Xi corresponds to the time instance of set B and Yi corresponds to the time instance of set A, and t, t+P, t+2P corresponds to the periodic inference report. Each periodicity P may comprise a first number of time instances of set A (Y4~Y9) and a second number of time instance for set B (e.g., X10~X13 or X11~X13). If an inference report transmitted by the UE in timing t provides an available inference result for Y4~Y9 (or X4~X9), the UE can skip receiving set B on X4~X9. The UE still needs to receive or monitor set B on time instances X10~X13 or X11~X13.

Preferably in certain embodiments, the available inference result means the possibility is larger than a threshold.

Preferably in certain embodiments, the available inference result means the UE does not use a specific code-point or specific information.

Preferably in certain embodiments, for a given timing of the inference report, the UE needs to have enough processing time to generate the inference report. Preferably in certain embodiments, a CSI reference timing or CSI reference resource is introduced which ensures there is enough processing time. Preferably in certain embodiments, the UE applies or determines an inference result based on a measurement result which is before the CSI reference timing or CSI reference resource. Based on a fixed or configured offset between a measurement window and a prediction window, the prediction window may start before the timing of transmitting the inference report or at least one time instance of set B which the UE performs a measurement and reports a prediction result for a corresponding time instance of set A.

Figure 11:
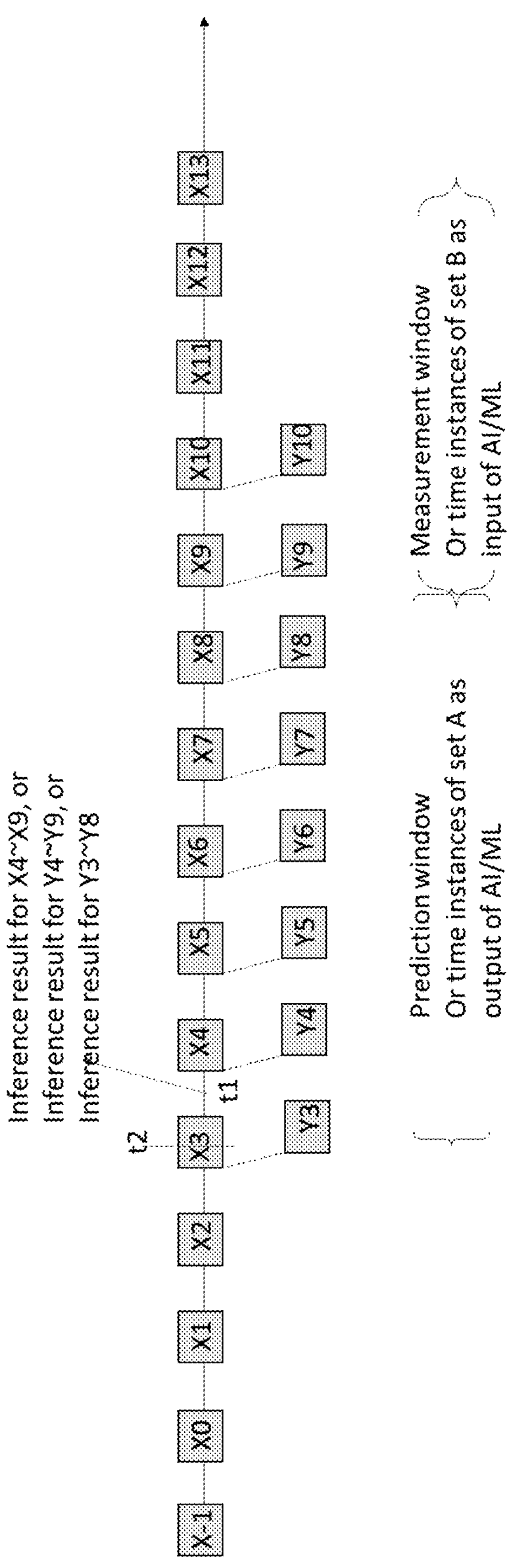
FIG. 11 is an example diagram showing the inference report to be transmitted in t1 and a corresponding CSI reference timing is t2, and four time instances of set B correspond to a measurement window and six time instances of set A correspond to a prediction window, in accordance with embodiments of the present invention.

In one example, in FIG. 11, the inference report to be transmitted in t1 and a corresponding CSI reference timing is t2, and four time instances of set B correspond to a measurement window and six time instances of set A correspond to a prediction window. The fixed or configured offset between a measurement window and a prediction window corresponds to Xi and Y(i+1). When the UE determines the inference report, the inference report is determined based on a measurement result of X(−1) to X2. The inference report comprises a prediction result for time instance Y3~Y8. For X3, the UE still performs receiving set B (even if the UE has a predicted result for the corresponding time instance of set A, e.g., Y3). Alternatively in certain embodiments, based on the network node's indication or configuration, the UE will determine N time instances of set A as Y4~Y9 (or Y5~Y10). Alternatively in certain embodiments, based on the UE's selection or determination, the UE will determine N time instances of set A as Y4~Y9 (or Y5~Y10). Preferably in certain embodiments, the starting time instance of set A (associated with an inference report) is not earlier than the timing of the the inference report. Preferably in certain embodiments, the starting time instance of set A (associated with an inference report) is not within an offset with respect to the timing of the inference report. In FIG. 11, for the inference report in t1, the inference report does not comprise the inference result associated with Y3. Preferably in certain embodiments, the inference report does not comprise the inference result associated with Y4. (No matter the timing relationship between the time instance of set A and the timing of the inference report), the UE maintains the time instance of set B and the time instance of set A for the measurement window and the prediction window. In this example, the relationship between the last time instance of set B in a measurement window and the starting time instance of set A in a prediction window is maintained. Preferably in certain embodiments, the UE could be configured with a specific offset to determine the relationship between the last time instance of set B in a measurement window and/or the starting time instance of set A in a prediction window. In FIG. 11, the inference report in t1 may comprise the inference result associated with Y3 and the inference result associated with Y4. Alternatively in certain embodiments, in FIG. 11, the inference report in t1 does not comprise the inference result associated with Y3 and does not comprise the inference result associated with Y4. Based on whether a prediction window comprising Y3 or not, the UE determines whether an inference report (in t1) comprises the inference result associated with Y3. Based on whether a prediction window comprising Y4 or not, the UE determines whether an inference report (in t1) comprises the inference result associated with Y4. Alternatively in certain embodiments, no matter whether the prediction window comprises Y3 or not, the inference report (in t1) does not comprise the inference result associated with Y3. Preferably in certain embodiments, no matter whether the prediction window comprises Y4 or not, the inference report (in t1) does not comprise the inference result associated with Y4. Alternatively in certain embodiments, the UE would determine or generate an inference report (in t1) comprising the inference result associated with Y3. Preferably in certain embodiments, the UE may determine a specific information for the inference result associated with Y3. Preferably in certain embodiments, the UE may determine a second specific information for the inference result associated with Y4. Preferably in certain embodiments, the specific information (and/or the second specific information) is used to indicate that the UE cannot derive or determine the inference result. Preferably in certain embodiments, a prediction window (associated with an inference report in t1) may comprise Y3. Preferably in certain embodiments, a prediction window (associated with an inference report in t1) is determined to not comprise Y3. Preferably in certain embodiments, a prediction window (associated with an inference report in t1) may comprise Y4. Preferably in certain embodiments, a prediction window (associated with an inference report in t1) is determined to not comprise Y4.

A network node should ensure that there is no time instance of set B overlapping with a first timing which is determined from timing of an inference report with an (earlier) first offset. A network node should ensure that there is no time instance of set A overlapping with a second timing which is determined from timing of an inference report with a (later) second offset. Set B, Set A, and/or the inference report are associated with one CSI-ReportConfig. The first offset is used to determine processing time for the inference report. The second offset is used to determine an available time instance of set A for prediction with respect to the timing of the inference report. In an example, in FIG. 11, the gNB should ensure that there is no time instance of set B during [t1−first offset, t1] and/or there is no time instance of set A during [t1, t1+second offset]. Preferably in certain embodiments, when the network node configures an Uplink (UL) resource or indicates UL resources for the inference report, the network node is not allowed to configure the UL resource such that at least one time instance of set B within the processing time associated with the timing of the inference report. Preferably in certain embodiments, when the network node configures the UL resource or indicates the UL resources for the inference report, the network node is not allowed to configure the UL resource such that at least one time instance of set A within a second processing time associated with the timing of the inference report. Preferably in certain embodiments, one rationale is to avoid a time instance of set A (or a time instance of prediction) is too close to the timing of the inference report. Preferably in certain embodiments, based on this restriction, the network node can have enough time to obtain the inference result and apply for the time instance of set A (based on the inference result).

A network node can configure which time instance of set A in a prediction window corresponds to a starting time instance. Preferably in certain embodiments, the network node could configure a third offset. Preferably in certain embodiments, based on the timing of the inference report and the third offset, a UE could determine the starting time instance of set A in a prediction window. Preferably in certain embodiments, starting time instance of set A in a prediction window could be determined based on the first time instance of set A, which is later than the timing of the inference report with the offset. Preferably in certain embodiments, the third offset is referred to as the timing of the inference report. Alternatively in certain embodiments, based on the timing of the last time instance in a measurement window and the third offset, a UE could determine the starting time instance of set A in a prediction window. Preferably in certain embodiments, the third offset comprise a first offset and a second offset. Preferably in certain embodiments, the first offset provides a processing time for determining an inference report. Preferably in certain embodiments, the second offset provides a processing time for applying the inference result according to the inference report. Preferably in certain embodiments, based on the determined starting time instance of set A, the UE could determine a future N time instance of set A (including the starting time instance of set A). Preferably in certain embodiments, the UE would determine an inference report comprising the inference result associated with the starting time instance of set A. Preferably in certain embodiments, the inference report does not comprise the inference result associated with time instance of set A, which is earlier than the starting time instance of set A (for one inference report to be transmitted in one time).

In one example, in FIG. 8, assuming a measurement window comprises four time instances of set B and a prediction window comprises six time instances of set A and the UE is configured with N=4 time instances for a future prediction. When the UE determines the inference report in t+P, the UE could be configured by a higher layer signal that the starting time instance of set A in the prediction window corresponds to Y8, Y9 or Y10. Based on the indicated starting time instance of set A, the UE would determine the inference report in t+P comprising the inference result associated with N time instances of set A, which starts from the starting time instance of set A. In one example, based on the indication, the N time instances of set A could be determined as {Y8, Y9, Y10, Y11}, {Y9, Y10, Y11, Y12}, or {Y10, Y11, Y12, Y13}. In one example, 2 bits could be included to indicate one of starting time instances of set A as Y8, Y9, Y10. In another example, 3 bits could be included to indicate one of starting time instances of set A as Y8, Y9, Y10, Y11, Y12, Y13. Alternatively in certain embodiments, the information corresponds to a fifth offset. Preferably in certain embodiments, the fifth offset is with respect to the last time instance of set B in a measurement window (e.g., X7). Alternatively in certain embodiments, the fifth offset is with respect to the timing of the inference report (e.g., t+P). Preferably in certain embodiments, the starting time instance of set A is indicated as the first time instance of set A after the fifth offset with respect to the last time instance of set B in a measurement window (e.g., X7) or with respect to the timing of the inference report (e.g., t+P).

A network node can indicate which time instance of set A in a prediction window corresponds to a starting time instance. Preferably in certain embodiments, the network node could indicate a fourth offset. Preferably in certain embodiments, the fourth offset is configured via CSI-ReportConfig for inference. Preferably in certain embodiments, the fourth offset is configured via a trigger state (which could be indicated by Downlink Control Information (DCI)). Preferably in certain embodiments, based on timing of the inference report and the fourth offset, a UE could determine a starting time instance of set A in a prediction window. Preferably in certain embodiments, the starting time instance of set A in a prediction window could be determined based on the first time instance of set A which is later than the timing of the inference report with the offset. Preferably in certain embodiments, the fourth offset is referred to as the timing of the inference report. Alternatively in certain embodiments, based on the timing of the last time instance in a measurement window and the fourth offset, a UE could determine the starting time instance of set A in a prediction window. Preferably in certain embodiments, the fourth offset comprises a first offset and a second offset. Preferably in certain embodiments, the first offset provides a processing time for determining an inference report. Preferably in certain embodiments, the second offset provides a processing time for applying an inference result according to the inference report. Preferably in certain embodiments, based on the determined starting time instance of set A, the UE could determine future N time instances of set A (including the starting time instance of set A). Preferably in certain embodiments, the UE would determine an inference report comprising an inference result associated with the starting time instance of set A. Preferably in certain embodiments, the inference report does not comprise the inference result associated with the time instance of set A, which is earlier than the starting time instance of set A (for one inference report to be transmitted in one time). Preferably in certain embodiments, the network node could indicate the n-th time instance of set A in a prediction window as a starting time instance. Preferably in certain embodiments, the starting time instance of set A is to be used to determine N time instances of set A.

In one example, in FIG. 8, assuming a measurement window comprises four time instances of set B and a prediction window comprises six time instances of set A and the UE is configured with N=4 time instances for future prediction. When the UE determines the inference report in t+P, the UE could be indicated by a lower layer signal that the starting time instance of set A in the prediction window corresponds to Y8, Y9 or Y10. Based on the indicated starting time instance of set A, the UE would determine the inference report in t+P comprises an inference result associated with N time instances of set A which starts from the starting time instance of set A. In one example, based on the indication, the N time instances of set A could be determined as {Y8, Y9, Y10, Y11}, {Y9, Y10, Y11, Y12}, or {Y10, Y11, Y12, Y13}. In one example, 2 bits could be included to indicate one of a starting time instance of set A as Y8, Y9, Y10. In another example, 3 bits could be included to indicate one of a starting time instance of set A as Y8, Y9, Y10, Y11, Y12, Y13. Alternatively in certain embodiments, the information corresponds to a fifth offset. Preferably in certain embodiments, the fifth offset is with respect to the last time instance of set B in a measurement window (e.g., X7). Alternatively in certain embodiments, the fifth offset is with respect to the timing of the inference report (e.g., t+P). Preferably in certain embodiments, the starting time instance of set A is indicated as the first time instance of set A after the fifth offset with respect to the last time instance of set B in a measurement window (e.g., X7) or with respect to the timing of the inference report (e.g., t+P).

A UE could determine or select a starting time instance of set A in a prediction window. Preferably in certain embodiments, based on the determined starting time instance of set A, the UE could determine future N time instances of set A (including the starting time instance of set A). Preferably in certain embodiments, the UE would determine an inference report comprises an inference result associated with a starting time instance of set A. Preferably in certain embodiments, the inference report does not comprise an inference result associated with a time instance of set A which is earlier than the starting time instance of set A (for one inference report to be transmitted in one time). Preferably in certain embodiments, the inference report may or may not provide information associated with the starting time instance of set A in a prediction window. Preferably in certain embodiments, the information associated with the starting time instance of set A in a prediction window indicates the n-th time instance of set A in a prediction window. Preferably in certain embodiments, the UE could determine up to N time instances of set A in a prediction window. Preferably in certain embodiments, the UE could determine only N time instances of set A in a prediction window. Preferably in certain embodiments, the N time instances of set A should be within the prediction window. Preferably in certain embodiments, not all the time instances of set A are eligible as starting time instances of set A in a prediction window. Preferably in certain embodiments, a value of N is configured by a network node or determined by a UE (e.g., no reliable/valid/available inference result for/after a specific timing instance).

In one example, in FIG. 8, assuming a measurement window comprises four time instances of set B and a prediction window comprises six time instances of set A and the UE is configured with N=4 time instances for future prediction. When the UE determines inference report in t+P, the UE could determine (by itself) about the starting time instance of set A in the prediction window corresponds to Y8, Y9 or Y10. The UE would set or determine the inference report in t+P such that the inference report comprises information associated with a starting time instance of set A. In one example, 2 bits could be included to indicate one of Y8, Y9, Y10. In another example, 3 bits could be included to indicate one of Y8, Y9, Y10, Y11, Y12, Y13. Alternatively in certain embodiments, the information corresponds to a fifth offset. Preferably in certain embodiments, the fifth offset is with respect to the last time instance of set B in a measurement window (e.g., X7). Alternatively, the fifth offset is with respect to the timing of the inference report (e.g., t+P). Preferably in certain embodiments, the starting time instance of set A is indicated as the first time instance of set A after the fifth offset with respect to the last time instance of set B in a measurement window (e.g., X7) or with respect to the timing of the inference report (e.g., t+P).

Preferably in certain embodiments, the time instance of set A could be a down-sample of the time instance of set B. Alternatively in certain embodiments, the time instance of set A could be the up-sample of time instance of set B.

Preferably in certain embodiments, the time instance of set A could be the same position with a subset of the time instance of set B.

Alternatively in certain embodiments, the time instance of set B could be the same position with a subset of the time instance of set A.

Figure 12:
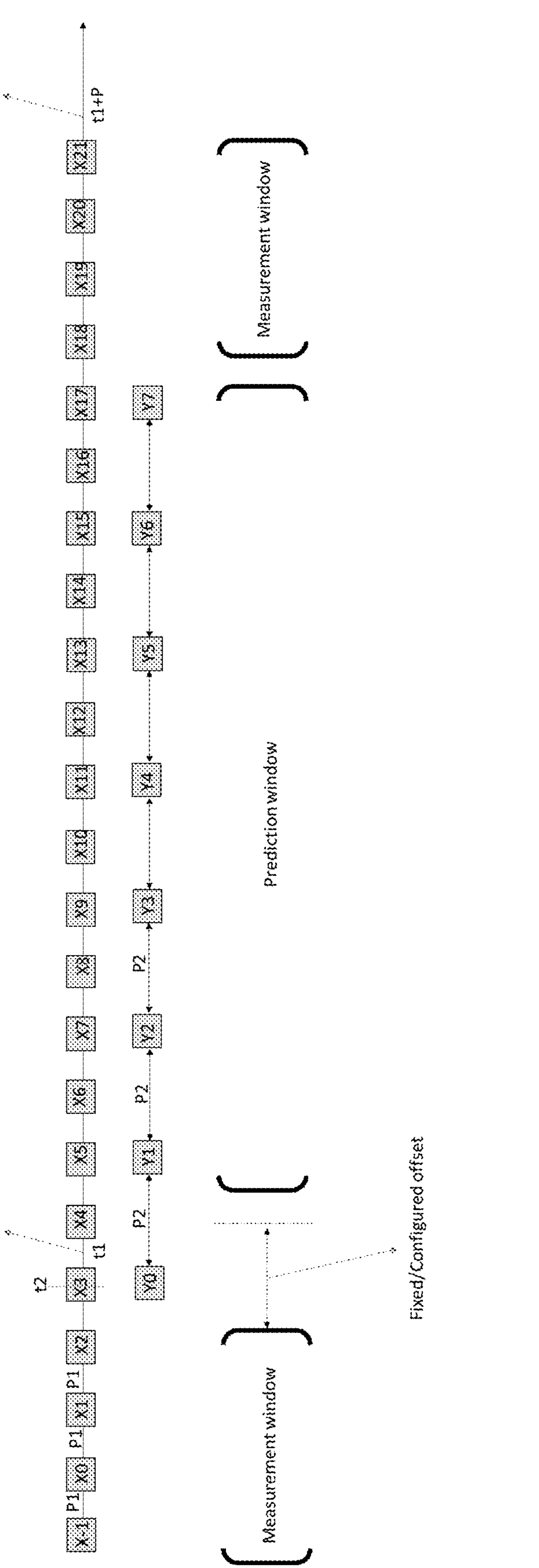
FIG. 12 is an example diagram showing the time instance of set A could be aligned with a subset of the time instance of set B, in accordance with embodiments of the present invention.
Figure 13:
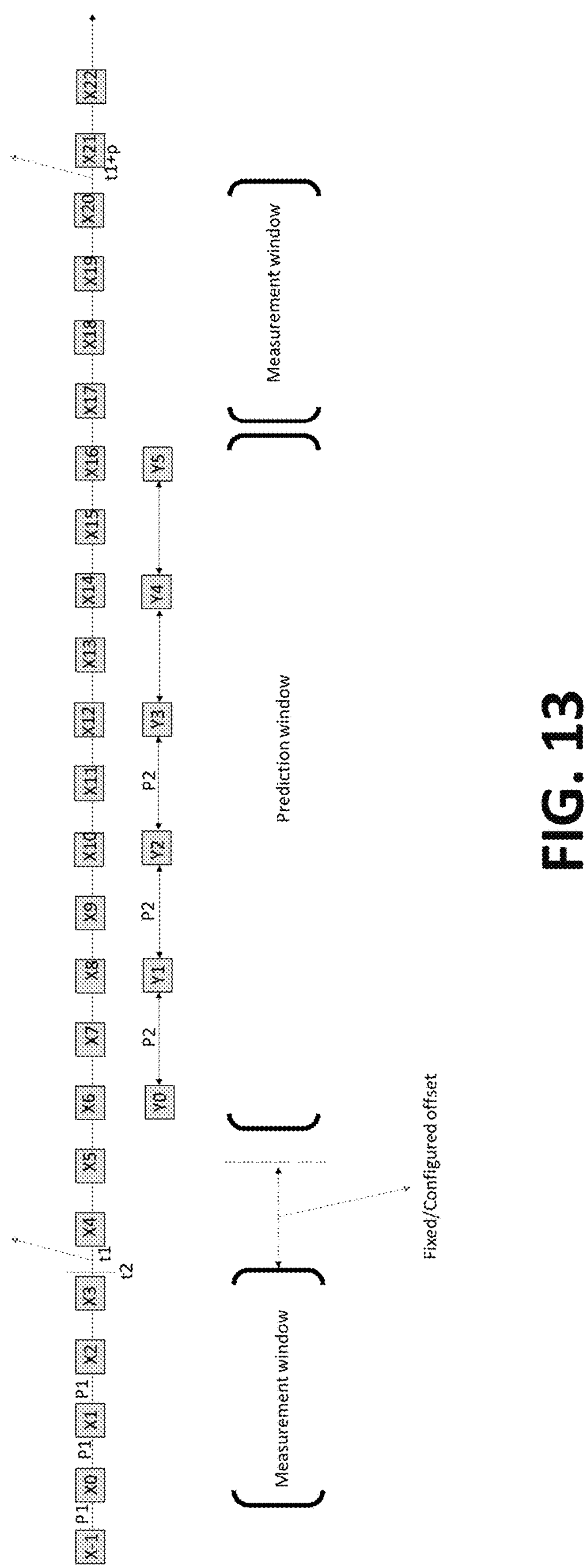
FIG. 13 is an example diagram showing Xi corresponds to a plurality of time instances of set B determined by a configuration, and X0~X3 and X17~X20 correspond to a burst like structure for determining a (periodic) inference report, in accordance with embodiments of the present invention.

Preferably in certain embodiments, the time instance of set A could be aligned with a subset of the time instance of set B (one example could be shown in FIG. 12 or FIG. 13).

Alternatively in certain embodiments, the time instance of set B could be the same position with a subset of the time instance of set A.

Figure 14:
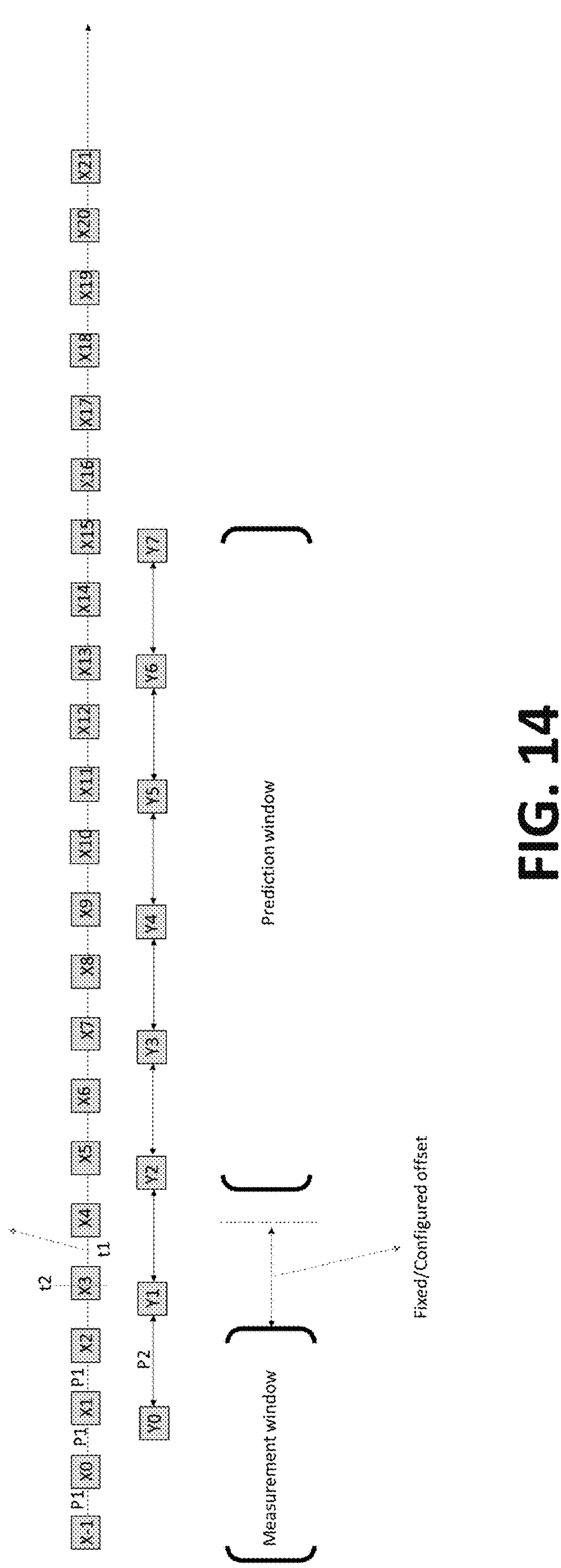
FIG. 14 is an example diagram showing that for time instances of X5~X15, the UE could skip monitoring or receiving set B, in accordance with embodiments of the present invention.

Preferably in certain embodiments, each or one time instances of set B could have an offset to the down-sampled time instance of set A (one example could be shown in FIG. 14).

Alternatively in certain embodiments, each or one time instances of set B could have an offset to the up-sampled time instance of set A.

Preferably in certain embodiments, the (value of the) time interval between any two consecutive time instances of set A could be configured as the same or different than (the value of) the time interval between any two consecutive time instances of set B. Preferably in certain embodiments, multiple time instances of set B will be associated with one time instance of set A. Preferably in certain embodiments, one time instance of set B will be associated with multiple time instances of set A. Preferably in certain embodiments, the UE is configured with a periodic UL resource for the inference report (e.g., t1, t1+P in FIG. 12). Preferably in certain embodiments, the inference report is associated with one CSI-ReportConfig, and set A and set B are both configured associated with the one CSI-ReportConfig. Preferably in certain embodiments, the UE expects that periodicity of set A is multiple integers of periodicity of set B. Preferably in certain embodiments, the UE could be configured with a specific offset or based on its capability to determine a specific offset. Preferably in certain embodiments, the specific offset is to determine the time interval between the last time instance of set B and the starting time instance of set A. Preferably in certain embodiments, the specific offset is to assist the network node to have enough time for apply the inference result. Preferably and/or additionally in certain embodiments, the specific offset is to assist the UE to have enough time for determining an inference report. Preferably in certain embodiments, the specific offset is configured via CSI-ReportConfig or via a trigger state. Preferably in certain embodiments, the specific offset is associated with an associatedID. Preferably in certain embodiments, the specific offset is associated with an AI/ML model. Preferably in certain embodiments, based on the specific offset, the UE could determine the starting time instance of set A. Preferably in certain embodiments, based on the specific offset, the UE could determine the starting position of a prediction window (associated with an inference report).

For example, in FIG. 12, Xi corresponds to a time instance of set B (with periodicity of set B as P1), Yi corresponds to a time instance of set A (with periodicity of set A as P2), and t1, t1+P corresponds to a timing for providing a periodic inference report. Preferably in certain embodiments, the UE is configured with a number of time instances for inference results (e.g., N=6). Preferably in certain embodiments, t2 corresponds to a CSI reference timing or CSI reference resource. Preferably in certain embodiments, based on the timing of t1, the UE could determine a measurement window comprises a time instance of set B corresponding to X−1~X2. Preferably in certain embodiments, due to the fact that the time instance of set B corresponding to X3 does not end before the timing of t2, the UE determines a measurement window not comprising X3. Preferably in certain embodiments, in this example, periodicity between set A and set B is different. Preferably in certain embodiments, based on a fixed/configured specific offset or the UE indicated specific offset (e.g., as UE capability or UE assistance information), the UE could determine a starting time instance of set A. Preferably in certain embodiments, based on a configured number of time instances for inference results (e.g., N=6), the UE could determine a prediction window comprising Y1~Y7, wherein Y1 corresponds to the starting time instance of set A. Preferably in certain embodiments, Y1 is determined as the very first time instance of set A after the specific offset with respect to the last time instance of set B (e.g., X2). Preferably in certain embodiments, based on the determined prediction window, the UE could skip monitoring or receiving RS in a time instance of set B. In this example, the UE could skip monitoring or receiving RS in X5~X17 which is a time instance of set B and being within the prediction window (e.g., Y1~Y7). Preferably in certain embodiments, X5~X17 may not correspond to another measurement window. In this example, the prediction window and measurement window are configured to be non-overlapped in time domain. Preferably in certain embodiments, the prediction window and the measurement window are both associated with the same CSI-ReportConfig.

Preferably in certain embodiments, the UE does not expect that measurement window and prediction window will be configured as being overlapping in time domain, wherein the measurement window and prediction window are associated with the same CSI-ReportConfig. Preferably in certain embodiments, when the UE is configured with a CSI-ReportConfig for (periodic) inference report, the UE does not perform receiving or monitoring set B which is not within the measurement window. Alternatively in certain embodiments, (if the prediction window and measurement are not overlapped in time domain), the UE could skip monitoring or receiving set B which is within the prediction window. Preferably and/or additionally in certain embodiments, if a time instance of set B which is not belonging to a measurement window and prediction window, the UE could skip monitoring or receiving set B on that time instance. Alternatively in certain embodiments, if a time instance of set B which is not belonging to a measurement window and prediction window, the UE performs receiving or monitoring set B on that time instance. Alternatively in certain embodiments, a time instance of set B is determined based on a configuration of set B and a measurement window. Preferably in certain embodiments, one or more time instances of set B is defined as a burst like structure, and one or more time instances will be used for determining a (periodic) inference report. Preferably in certain embodiments, the measurement window may depend on timing of the inference report. Preferably in certain embodiments, the UE could merely monitor or receive one or more time instances of set B. Preferably in certain embodiments, the configuration of set B may correspond to a plurality of time instances of set B. Preferably in certain embodiments, the measurement window could be a mask like signal for determining one or more time instances of set B to be as a burst liked structure.

For example, in FIG. 13, Xi corresponds to a plurality of time instances of set B determined by a configuration, and X0~X3 and X17~X20 correspond to a burst like structure for determining a (periodic) inference report (e.g., t1, t1+p). Preferably in certain embodiments, X−1, X4~X16, X21, X22 are masked by the information or configuration associated with the measurement window.

For another example, in FIG. 13, when the UE is configured with a periodic inference report (e.g., CSI-ReportConfig for inference associated with a report type as periodic), the UE does not expect to be configured such that there is a time instance of set B (associated with same CSI-ReportConfig) is during t2 to t1 (or t2+P to t1+P, . . . ). The UE's monitoring/receiving behavior could be that the UE monitors set B within a measurement window. In this example, the UE will monitor or receive set B in time instances of X0~X3, X17~X20. For time instances of set B in the prediction window, the UE does not perform receiving or monitoring set B in time instances (e.g., X6~X16). Preferably in certain embodiments, the UE does not perform receiving or monitoring set B in time instances (e.g., X4, X5) which is neither in the measurement window nor the prediction window. Alternatively in certain embodiments, the UE could perform receiving or monitoring set B in time instances (e.g., X4, X5) which is neither in the measurement window nor the prediction window. Preferably in certain embodiments, the UE could skip receiving or monitoring set B during a specific time interval from a timing of the inference report (and if the inference report is transmitted). Preferably in certain embodiments, the length of the specific time interval could be configured or specified or based on the UE's capability. Preferably in certain embodiments, the length of the specific time interval could be configured via CSI-ReportConfig for inference, or a trigger state.

Preferably in certain embodiments, when the UE receives a DCI indicating a trigger state associated with a CSI-ReportConfig for inference, the UE determines or generates an aperiodic inference report. Preferably in certain embodiments, the CSI-ReportConfig for inference may correspond to a report quantity as aperiodic. Preferably in certain embodiments, set B associated with the CSI-ReportConfig could be configured as periodic. Preferably in certain embodiments, the UE's monitoring behavior for set B may depend on whether a time instance of set B is within a prediction window or not. Preferably in certain embodiments, if the time instance is within a prediction window, the UE skips monitoring or receiving set B in the time instance.

In one example, in FIG. 14, for time instances of X5~X15, the UE could skip monitoring or receiving set B (in response to an aperiodic inference report is transmitted). Preferably in certain embodiments, the inference report transmitted in t1 could provide an inference result associated with Y2~Y7. Preferably in certain embodiments, the UE's measurement effort during the prediction window could be relieved. Preferably in certain embodiments, the UE's monitoring/receiving behavior in the prediction window could be reduced. Preferably in certain embodiments, when a time instance of set B is overlapped with a time instance of set A (which the UE has transmitted or generated an inference report comprising inference result(s) associated with the time instance of set A), the UE could skip monitoring or receiving the time instance of set B. Preferably in certain embodiments, when a second time instance of set B is not overlapped with any or a number of time instances of set A which the UE has transmitted or generated an inference report comprising inference result(s) associated with the number of time instances of set A, the UE performs monitoring or receives set B (on the second time instance of set B). Preferably and/or additionally in certain embodiments, whether an inference result associated with a time instance of set A is available may cause impact on the UE behavior of monitoring/receiving set B. Preferably in certain embodiments, if an inference result associated with a time instance of set A is not available or if an inference result associated with a time instance of set A is lower than a threshold, the UE will receive or monitor set B on time instance of set B which is even if overlapping with the time instance of set A. Preferably in certain embodiments, in this case, the UE will not consider the time instance of set A is available for skipping monitoring/receiving set B. Alternatively and/or preferably in certain embodiments, the UE could be configured with or indicated by a monitoring pattern within a prediction window (associated with an inference report). Preferably in certain embodiments, the monitoring pattern could be a bit-map indicating which time instance of set B in the prediction window should be monitored or received or not. In one example, a first value in one bit in the bit-map indicates monitoring while a second value in the one bit in the bit-map indicates not monitoring (or skipping monitoring). Preferably in certain embodiments, the monitoring pattern is applied or used only when the UE transmitted an inference report (e.g., the inference report, set A, set B, monitoring pattern are associated with same CSI-ReportConfig). Preferably in certain embodiments, if the UE does not transmit an inference report or if the UE does not generate an inference report, the UE does not apply the monitoring pattern. Preferably in certain embodiments, whether the UE applies a monitoring pattern is based on whether the UE transmits or generates an inference report or not.

Figure 15:
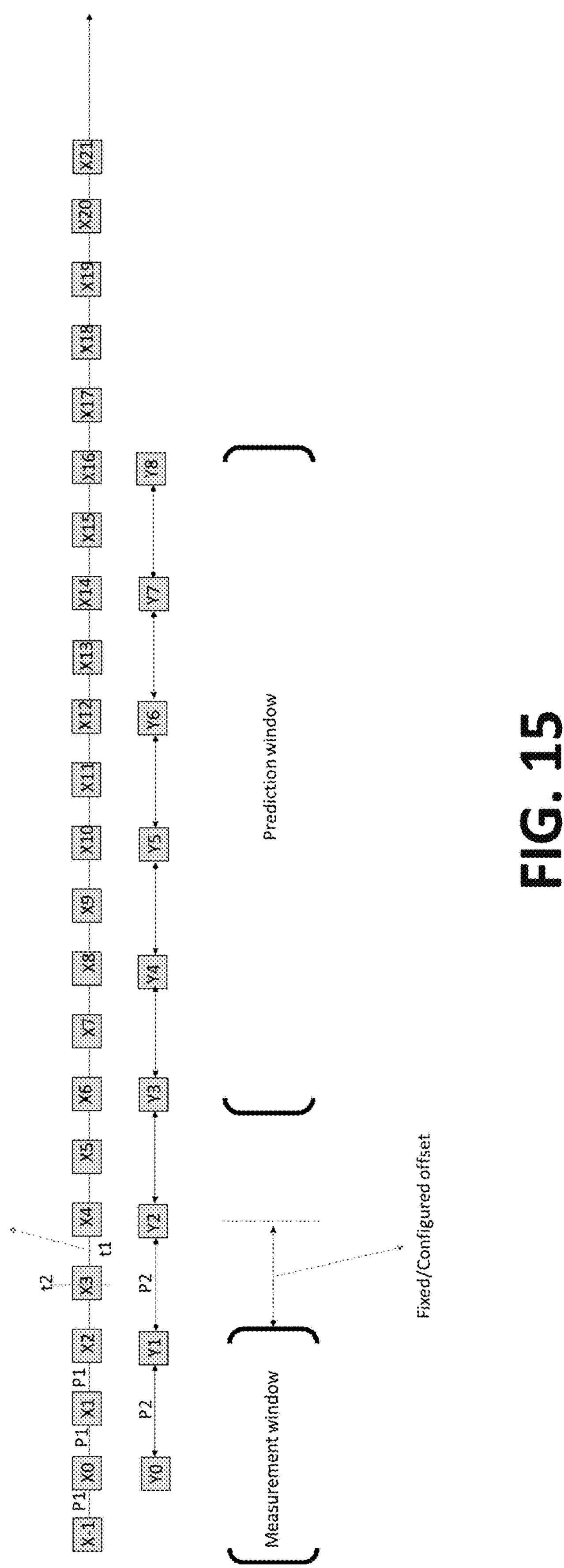
FIG. 15 is an example diagram showing P2=2P1 which means time instance of set A will be more sparse than the time instance of set B, in accordance with embodiments of the present invention.

In one example, in FIG. 15, P2=2P1 which means time instance of set A will be more sparse than the time instance of set B. Once the UE provides an inference report in t1 comprising inference result(s) associated with a number of time instances of set A (e.g., Y3~Y8), the UE could skip monitoring or receiving on the time instance of set B which is overlapping with the number of time instances of set A. Preferably in certain embodiments, the UE does not monitor or receive set B on time instances X6, X8, X10, X12, X14, X16. Preferably in certain embodiments, the UE receives or monitors set B (even in the prediction window) on time instances X7, X9, X11, X13, X15.

In another example, in FIG. 15, when the UE is configured with or indicated a monitoring pattern, after the UE transmits an inference report comprising inference result(s) associated with Y3~Y8. The corresponding time instances of set B (e.g., X6~X16) or (e.g., X6~X17) could be indicated by the monitoring pattern that whether the UE is to monitor/receive or not. Preferably in certain embodiments, based on a configured number of time instances of set A (e.g., N=6), the size of the monitoring pattern could be based on the configured number of time instances of set A. Preferably in certain embodiments, size of the monitoring pattern could be N, 2N, or 2N−1. Preferably in certain embodiments, each bit in the monitoring pattern indicates one time instance of set B. Alternatively in certain embodiments, each bit in the monitoring pattern indicates one time instance of set A, and the UE based on periodicity association between set B and set A could determine or derive one or more associated time instances of set B.

Alternatively and/or preferably in certain embodiments, based on periodicity association between set B and set A, time instance of set A Yi is associated with time instances of set B $$\left(X\left(\frac{P2}{P1}i\right), X\left(\frac{P2}{P1}i+1\right), \ldots , X\left(\frac{P2}{P1}(i+1)-1\right)\right).$$

Preferably in certain embodiments, if an inference report comprises an inference result associated with a time instance of set A, the UE could skip monitoring or receiving the associated time instance of set B.

Preferably in certain embodiments, if a time instance of set B is determined not to be monitored or received by a UE, the corresponding network node behavior could be that the network node does not transmit set B on the time instance. Alternatively in certain embodiments, the network node could transmit set B on the time instance.

A characteristic associated with a prediction window is determined based on at least a characteristic associated with set A. Set A corresponds to a resource set as an output for AI/ML inference. A characteristic associated with a prediction window comprises at least one of a starting timing, length, periodicity, and/or Subcarrier Spacing (SCS). A characteristic associated with set B comprises at least one of periodicity (or RS burst of set A), starting offset, and/or SCS. One or more time instances of set A are based on a configuration of set A. In one example, periodicity of a prediction window is determined based on an integer number of periodicity of set A (e.g., every (consecutive) X time instances of set A corresponds to the prediction window). In this example, X time instances with periodicity of set A corresponds to the prediction window. Preferably in certain embodiments, set A could be replaced by set B.

Alternatively in certain embodiments, a characteristic associated with a prediction window is determined based on at least a characteristic associated with a report. Preferably in certain embodiments, the report corresponds to an inference report. A characteristic associated with a prediction window comprises at least one of starting timing, length, and/or SCS. A characteristic associated with the report comprises at least one of periodicity (or RS burst of set A), starting offset, and/or SCS. One or more time instances of the report are based on a configuration of the report. In one example, periodicity of a prediction window is determined based on an integer number of periodicity of a report (e.g., every (consecutive) X time instances of a report corresponds to the prediction window). In this example, X time instances with periodicity of set A corresponds to the prediction window. Preferably in certain embodiments, the value of X could be an integer (e.g., 1, 2, 3, . . . ).

In order to manage an AI/ML model, performance monitoring is necessary. As such, 3GPP has agreed to reuse CSI framework for configuration for a performance monitoring result report, and also agrees that a dedicated report and RS set will be used for performance monitoring. Thus, we call set C as a measurement RS for performance monitoring which is associated with a CSI-ReportConfig for monitoring. One difference for CSI-ReportConfig for monitoring may be report content is different which means the CSI-ReportConfig for monitoring may be configured with a different quantity than Reference Signal Received Power (RSRP) or Channel Quality Indicator (CQI), Precoding Matrix Indicator (PMI), Rank Indicator (RI) (the report quantity could correspond to a performance metric). Preferably in certain embodiments, the report quantity corresponding to the performance metric could be a Top 1 or Top K beam prediction accuracy (with or without margin) by comparing the prediction results and the Top 1 or Top K beam based on the measurements from set C. Preferably in certain embodiments, the report quantity corresponding to performance metric could be L1-RSRP difference based on the actual measurement of the L1-RSRP of one or more of Top K predicted beams, and L1-RSRP measurements from a resource set/resources for monitoring. The UE may compare the prediction results and the Top1 or Top K beam based on the measurements from set C. In order to determine this set C is measured and compared to which predicted result, CSI-ReportConfig for monitoring and CSI-ReportConfig for inference may need to have some association. Typically, CSI-ReportConfig for monitoring should comprise CSI-ReportConfigID for inference. Thus, CSI-ReportConfig comprises one CSI-ReportConfigID for monitoring and another CSI-ReportConfigID for inference.

However, there may have some issues considering the linkage or association between CSI-ReportConfig for monitoring and CSI-ReportConfig for inference. In FIG. 16, since each CSI-ReportConfig could be configured with each report type, some combination of the monitoring report and inference report may need further handling. In one example, when an aperiodic inference report is configured to link or associate to a periodic monitoring report, what should the UE report when multiple monitoring report is associated with one inference report or what should UE report when there is no aperiodic inference report or an aperiodic inference report is outdated? A similar issue has been identified for a different report type for some combination of an inference report and monitoring report in FIG. 16. It could be illustrated that a monitoring report seems to be a passive report which means presence of the monitoring report should take into account a linked/associated inference report. Preferably and/or alternatively in certain embodiments, even for the same report type, there may still be an issue such as whether/how to have joint triggering for an aperiodic inference report and aperiodic monitoring report, and/or whether/how to have simultaneous (de) activation for a semi-persistent inference report and semi-persistent monitoring report.

Preferably in certain embodiments, solutions for this issue could be applied for monitoring and inference associated with AI/ML use case(s). Preferably in certain embodiments, monitoring and inference associated with AI/ML use case(s) will be configured under a CSI framework. Preferably in certain embodiments, monitoring and inference associated with AI/ML use case(s) will be configured under the same or different report type (e.g., time domain behavior).

Opt1: RRC configuration limitation is applied. (Inference report, monitoring report)=(Periodic (P), Aperiodic (AP), (P, Semi-Periodic (SP)), (AP, AP), (SP, SP), (P, P).

- Inference report and monitoring report could be one-to-one mapping or multiple-to-one.
- For same report type of (AP, AP):
  - Opt1: If joint triggering is configured for (AP, AP), there is a limitation that only linkage of the inference report and monitoring report should be triggered jointly or for CSI-ReportConfig for monitoring and CSI-ReportConfig for inference, only linked CSI-ReportConfig could be configured in a same trigger state.
  - Opt2: It is restricted that RRC configuration has joint triggering for monitoring and inference report, or CSI-ReportConfig for monitoring and CSI-ReportConfig for inference cannot be configured in a same trigger state (separate triggering is configured, e.g., separate trigger state is configured for monitoring and inference, respectively).
- For same report type of (SP, SP):
  - Opt1: If simultaneously/jointly (de) activation is allowed, expected, applied, or configured for (SP, SP) with limitation that only the linkage of the inference report and monitoring report should be (de)activated jointly.
  - Opt1-1: Same MAC CE with some new design.
    - (Same/new extended Logical Channel ID (eLCID)) Each bit corresponds to one pair of CSI-ReportConfigs associated with the inference report and another for CSI-ReportConfig associated with the monitoring report.
      - Based on the bit which is associated with semi-persistent CSI-ReportConfig being configured with quantity as "monitoring", corresponding CSI-ReportConfig for inference is also (de) activated
      - Based on the bit which is associated with the semi-persistent CSI-ReportConfig being configured with the quantity as "inference", corresponding CSI-ReportConfig for monitoring is also (de)activated.
    - (New eLCID) With increased number of entries to indicate a number of semi-persistent CSI-ReportConfigs.
      - Simultaneous (de)activate if a first semi-persistent CSI-ReportConfig (for monitoring) and a second semi-persistent CSI-ReportConfig (for inference) is linked.

UE does not expect only one paired/linked inference CSI-ReportConfig or monitoring CSI-ReportConfig is deactivated while another is activated.

UE does not expect only one paired/linked inference CSI-ReportConfig or monitoring CSI-ReportConfig is activated while another is deactivated.

Opt1-2: More than one (e.g., Two) MAC CE to be transmitted in a same MAC PDU.

One is legacy MAC CE (with same eLCID) and another one is new MAC CE (with new eLCID).

Both are legacy MAC CE (with same eLCID).

Both are new MAC CE (with new eLCID).

Preferably in certain embodiments, one MAC CE is dedicated for CSI-ReportConfig associated with a non-monitoring report (including legacy quantity (e.g., RSRP, CQI, PMI, RI) and inference) while another MAC CE is dedicated for CSI-ReportConfig associated with the monitoring report.

Simultaneous (de)activate if a first semi-persistent CSI-ReportConfig (for monitoring) and a second semi-persistent CSI-ReportConfig (for inference) is linked Preferably in certain embodiments, one MAC CE is dedicated for CSI-ReportConfig associated with the inference report while another MAC CE is dedicated for CSI-ReportConfig associated with the monitoring report.

Simultaneous (de)activate if a first semi-persistent CSI-ReportConfig (for monitoring) and a second semi-persistent CSI-ReportConfig (for inference) is linked Above could be applied for one list of CSI-ReportConfig for both monitoring and inference or for two lists of CSI-ReportConfig with one for monitoring and another for inference.

Opt2: It is allowed to have some (de) activation misalignment between CSI-ReportConfig for monitoring and CSI-ReportConfig for inference.

Detailed solution could be based on following Opt2-x.

For same report type of (P, P):

It is allowed to have some (de) activation misalignment between CSI-ReportConfig for monitoring and CSI-ReportConfig for inference.

Detailed solution could be based on following Opt2-x.

Opt2-x series considers no or a loose limitation between CSI-ReportConfig for monitoring and CSI-ReportConfig for inference.

Opt2-1: The UE determines and/or generates and/or transmits a monitoring report only when at least one inference report is generated and/or determined and/or transmitted and at least one time instance of set C for measurement.

Opt2-2: The UE determines and/or generates and/or transmits a monitoring report only when at least CSI-ReportConfig for one inference report is (applicable and) activated and at least one set C for measurement is received.

Opt2-3: The UE determines and/or generates and/or transmits a monitoring report only when at least CSI-ReportConfig for one inference report is (applicable and) activated and CSI-ReportConfig for one monitoring report is activated.

Opt2-4: The UE determines and/or generates and/or transmits a monitoring report only when an inference result is not outdated and at least one set C for measurement is received.

Opt2-5: The UE drops monitoring report at least when:

CSI-ReportConfig for inference is not applicable,

CSI-ReportConfig for inference is not activated,

CSI-ReportConfig for monitoring is not activated,

No time instance of set B for measurement,

No time instance of set C for measurement,

No corresponding (latest) inference report/no sufficient corresponding inference report, Corresponding (latest) inference report is outdated, Time interval from corresponding (latest) inference report to (starting position or ending position of) time instance of set C is larger than a threshold, Time interval from corresponding (latest) inference report to time instance of monitoring report is larger than a threshold, and/or Time interval from corresponding (latest) inference report to a CSI reference timing (or CSI reference resource) associated with a monitoring report is larger than a threshold.

A first CSI-ReportConfig is associated with performance monitoring and a second CSI-ReportConfig is associated with prediction, or a second CSI-ReportConfig is associated with performance monitoring and a first CSI-ReportConfig is associated with prediction.

The UE may drop a monitoring report (according to the first CSI-ReportConfig) if any one or any combination of the following events happen:

After DL BWP change and/or without sufficient time instance for measurement of set C (associated with the first CSI-ReportConfig), After DL BWP change and/or without sufficient time instance for measurement of set B (associated with the second CSI-ReportConfig), After the first CSI-ReportConfig is (re) configured and/or without sufficient time instance for measurement (associated with the first CSI-ReportConfig), After the second CSI-ReportConfig is (re) configured and/or without sufficient time instance for measurement (associated with the second CSI-ReportConfig), After RRC state change (e.g., idle to connected, inactive to connected) and/or without sufficient time instance for measurement (associated with the first CSI-ReportConfig), After RRC state change (e.g., idle to connected, inactive to connected) and/or without sufficient time instance for measurement (associated with the second CSI-ReportConfig), Lower probability or low confidence for one or more inference results (e.g., "lower" means or corresponds to being lower than a threshold or not good enough), At least a number of inference results (where each inference result is associated with one time instance), which quality or metric is lower than a threshold, are larger than a number threshold, For example, assuming #N time instance for inference and #N' time instance as the number threshold (e.g., #N'<#N), the UE, based on an AI/ML model, determines a number of inference results, which quality or metric is lower than a threshold, are larger than #N', At least a number of inference results (where each inference result is associated with one time instance), which the output value is invalid or out of (a valid) range/threshold. For example, the output value may be nan (not a number), positive/negative infinite . . . , etc.,

- DRX non-active time (or DRX inactive time) such that the UE cannot receive at least one time instance of set B for measurement,
- DRX non-active time (or DRX inactive time) such that the UE cannot receive at least one time instance of set C for measurement,
- Cell DTX non-active time (or cell DTX inactive time) such that the UE cannot transmit an inference report (according to the second CSI-ReportConfig) to network node,
- A number of time instances for measurement (e.g., set B or set C) is determined NOT to perform reception (e.g., symbol direction is indicated or override by other DL/UL channel/signal), (the number of time instances could be called as issued time instance),
- A number of time instances for measurement (e.g., set B or set C) is determined to be cancelled or is indicated cancelled, (the number of time instances could be called as issued time instance),
- A number of time instances for measurement (e.g., set B or set C) is within a measurement gap (or during a time interval that the UE performs inter-frequency measurement), (the number of time instances could be called as issued time instance), and/or
- At least a subset of measurement results which measurement result or measurement information is lower than a threshold is larger than a (second) number threshold, (the subset of measurement results could be called as issued measurement results), and preferably wherein the measurement results are set B's measurement results.

After CSI report (re) configuration (for any one of the first CSI-ReportConfig or the second CSI-ReportConfig), the UE determines or generates a monitoring report (according to the first CSI-ReportConfig) (only) when/after the UE receives at least one time instance of set B (associated with the second CSI-ReportConfig) and one time instance of set C. The UE may drop a monitoring report (according to the first CSI-ReportConfig) when the UE does not receive at least one time instance of set B (associated with the second CSI-ReportConfig) and one time instance of set C.

After serving cell activation (associated with any one of the first CSI-ReportConfig or the second CSI-ReportConfig), the UE determines or generates a monitoring report (according to the first CSI-ReportConfig) (only) when/after the UE receives at least one time instance of set B (associated with the second CSI-ReportConfig) and one time instance of set C. The UE may drop a monitoring report (according to the first CSI-ReportConfig) when the UE does not receive at least one time instance of set B (associated with the second CSI-ReportConfig) and one time instance of set C.

After BWP change (e.g., DL active BWP change and/or UL active UL BWP change which is associated with any one of the first CSI-ReportConfig or the second CSI-ReportConfig), the UE determines or generates a monitoring report (according to the first CSI-ReportConfig) (only) when/after the UE receives at least one time instance of set B (associated with the second CSI-ReportConfig) and one time instance of set C. The UE may drop a monitoring report (according to the first CSI-ReportConfig) when the UE does not receive at least one time instance of set B (associated with the second CSI-ReportConfig) and one time instance of set C.

After CSI report (re) configuration (for any one of the first CSI-ReportConfig or the second CSI-ReportConfig), the UE determines or generates a monitoring report (according to the first CSI-ReportConfig) (only) when/after the UE transmits or determines or generates one inference report (associated with the second CSI-ReportConfig) and receives at least one time instance of set C. The UE may drop a monitoring report (according to the first CSI-ReportConfig) when the UE does not transmit or determine or generate one inference report (associated with the second CSI-ReportConfig) or the UE does not receive at least one time instance of set C.

After serving cell activation (associated with any one of the first CSI-ReportConfig or the second CSI-ReportConfig), the UE determines or generates a monitoring report (according to the first CSI-ReportConfig) (only) when/after the UE transmits or determines or generates one inference report (associated with the second CSI-ReportConfig) and receives at least one time instance of set C. The UE may drop a monitoring report (according to the first CSI-ReportConfig) when the UE does not transmit or determine or generate one inference report (associated with the second CSI-ReportConfig) or the UE does not receive at least one time instance of set C.

After BWP change (e.g., DL active BWP change and/or UL active UL BWP change which is associated with any one of the first CSI-ReportConfig or the second CSI-ReportConfig), the UE determines or generates a monitoring report (according to the first CSI-ReportConfig) (only) when/after the UE transmits or determines or generates one inference report (associated with the second CSI-ReportConfig) and receives at least one time instance of set C. The UE may drop a monitoring report (according to the first CSI-ReportConfig) when the UE does not transmit or determine or generate one inference report (associated with the second CSI-ReportConfig) or the UE does not receive at least one time instance of set C.

Preferably, one set B is configured in one DL BWP.

Preferably, one set C is configured in one DL BWP.

Preferably, for a serving cell operated or configured with paired spectrum (e.g., Frequency Division Duplexing (FDD) system), DL BWP and UL BWP could be applied independently.

Preferably, for a serving cell operated or configured with unpaired spectrum (e.g., Time Division Duplexing (TDD) system), active DL BWP and active UL BWP will change simultaneously.

Preferably, "at least one time instance of set X", wherein X=B or C, would be no later than a CSI reference resource (associated with a monitoring report according to the first CSI-ReportConfig).

Preferably, "an inference report according to the second CSI-ReportConfig" would be no later than a CSI reference resource (associated with a monitoring report according to the first CSI-ReportConfig).

Preferably, when the UE receives the first CSI-ReportConfig (for determining/generating a monitoring report), the UE does not expect that set B (and set A) in the linked CSI-ReportConfig (e.g., the second CSI-ReportConfig) is configured in a different DL BWP than set C in the first CSI-ReportConfig.

Preferably, when the UE receives the first CSI-ReportConfig (for determining/generating a monitoring report), the UE does not expect that set A (and set B) in the linked CSI-ReportConfig (e.g., the second CSI-ReportConfig) is configured in a different DL BWP than set C in the first CSI-ReportConfig.

Opt3: To report specific information related to "not ready for monitoring", or a root cause or report the lowest quantity/metric, "CSI-ReportConfig for inference is not applicable (for now)".

If CSI-ReportConfig for inference is not applicable, for a linked CSI-ReportConfig for monitoring:

The UE assumes (or determines) CSI-ReportConfig for monitoring is not applicable, The UE does not generate a monitoring report according to the CSI-ReportConfig for monitoring when the CSI-ReportConfig for monitoring is not applicable, The UE drops a monitoring report when the CSI-ReportConfig for monitoring is not applicable, Report quantity (associated with the CSI-ReportConfig for monitoring) falls back from performance metric to RSRP, The UE reports a measurement result without performing/determining performance metric (with respect to an inference result associated with the linked CSI-ReportConfig for inference), The UE does not expect to receive a trigger state (indicated by DCI) associated with the linked CSI-ReportConfig for monitoring, and/or The UE assumes (or determines) CSI-ReportConfig for monitoring is deactivated.

If the UE indicates that CSI-ReportConfig for inference is from not applicable to applicable (or in response to the UE indicating that CSI-ReportConfig for inference is from not applicable to applicable), for a linked CSI-ReportConfig for monitoring:

For periodic linked CSI-ReportConfig for monitoring, in response to (when) the UE receives a message (in response to the UE's indication related to applicability) from network node:

The UE assumes CSI-ReportConfig for monitoring is applicable,

The UE could generate a monitoring report according to the CSI-ReportConfig for monitoring when the CSI-ReportConfig for monitoring is applicable, Report quantity (associated with the CSI-ReportConfig for monitoring) corresponds to a performance metric, and/or The UE reports a measurement result via performing/determining a performance metric (with respect to an inference result associated with the linked CSI-ReportConfig for inference).

For semi-persistent linked CSI-ReportConfig for monitoring, in response to (when) the UE receives a message (in response to the UE's indication related to applicability) from the network node:

The UE assumes CSI-ReportConfig for monitoring is applicable,

The UE could generate a monitoring report according to the CSI-ReportConfig for monitoring when the CSI-ReportConfig for monitoring is applicable, Report quantity (associated with the CSI-ReportConfig for monitoring) corresponds to a performance metric, The UE reports a measurement result via performing/determining a performance metric (with respect to an inference result associated with the linked CSI-ReportConfig for inference), and/or The UE could receive a (de) activation signal for the CSI-ReportConfig for monitoring.

For aperiodic linked CSI-ReportConfig for monitoring, in response to (when) the UE receives a message (in response to the UE's indication related to applicability) from the network node:

The UE assumes CSI-ReportConfig for monitoring is applicable,

The UE could generate a monitoring report according to the CSI-ReportConfig for monitoring when the CSI-ReportConfig for monitoring is applicable, Report quantity (associated with the CSI-ReportConfig for monitoring) corresponds to a performance metric, and/or The UE reports measurement result via performing/determining a performance metric (with respect to an inference result associated with the linked CSI-ReportConfig for inference), and/or The UE could receive a trigger state (indicated by DCI) for the CSI-ReportConfig for monitoring.

If periodic CSI-ReportConfig for inference is released from RRC, one or more of the above general options could be reused for handling linked CSI-ReportConfig for monitoring (which could be configured with a report type as periodic, semi-persistent, aperiodic):

Simultaneously release (or de-configuration simultaneously) is expected by the UE.

The UE drops the monitoring report, or the UE does not generate or determine the monitoring report.

The UE reports specific information in the monitoring report.

If semi-persistent CSI-ReportConfig for inference is deactivated from RRC, one or more of the above general options could be reused for handling linked CSI-ReportConfig for monitoring (which could be configured with the report type as semi-persistent:

Simultaneously deactivation is expected by UE.

The UE drops the monitoring report, or the UE does not generate or determine the monitoring report.

The UE reports specific information in the monitoring report.

Preferably in certain embodiments, report type of a CSI-ReportConfig could be periodic, aperiodic, semi-persistent. Preferably in certain embodiments, limitation of configuration for CSI-ReportConfig could be applied. In one example, FIG. 16 could be used which means only the same report type between CSI-ReportConfig for monitoring and (linked) CSI-ReportConfig for inference are allowed to configure. Additionally and/or preferably in certain embodiments, the different report type between CSI-ReportConfig for monitoring and (linked) CSI-ReportConfig for inference are allowed to configure only when the (linked) CSI-ReportConfig corresponds to periodic. Preferably in certain embodiments, the UE does not expect to be configured with a CSI-ReportConfig for monitoring to be as periodic and a linked CSI-ReportConfig for inference to be as aperiodic or semi-persistent. Preferably in certain embodiments, the UE does not expect to be configured with a CSI-ReportConfig for monitoring to be as semi-persistent and linked CSI-ReportConfig for inference to be as aperiodic. Preferably in certain embodiments, the UE does not expect to be configured with a CSI-ReportConfig for monitoring to be as aperiodic and linked CSI-ReportConfig for inference to be as semi-persistent.

Alternatively and/or additionally in certain embodiments, there is not a limitation of report type between CSI-ReportConfig for monitoring to be as periodic and a linked CSI-ReportConfig for inference.

Alternatively and/or additionally in certain embodiments, the UE determines and/or generates and/or transmits a monitoring report only when at least one inference report is generated and/or determined and/or transmitted and at least one time instance of set C for measurement. Preferably in certain embodiments, the at least one inference report is according to a second CSI-ReportConfig for inference which is linked to a first CSI-ReportConfig for monitoring. Preferably in certain embodiments, the at least one inference report is transmitted before a CSI reference timing or before a CSI reference resource (associated with a monitoring report). Preferably in certain embodiments, the at least one time instance of set C is before a CSI reference timing or before a CSI reference resource (associated with a monitoring report). Preferably in certain embodiments, "before" could be replaced by "being earlier than". Preferably in certain embodiments, an ending symbol of the last RS in the time instance of set C should be earlier than a CSI reference timing or before a CSI reference resource (associated with a monitoring report). Preferably in certain embodiments, an ending symbol of the UL resource for transmitting the inference report should be earlier than a CSI reference timing or before a CSI reference resource (associated with a monitoring report).

Preferably in certain embodiments, if there is no inference report transmitted before the CSI reference timing (associated with a monitoring report) or there is no time instance of set C received before the CSI reference timing, the UE drops the monitoring report or the UE does not generate the monitoring report. Preferably in certain embodiments, the UE may not transmit the inference report (according to linked CSI-ReportConfig for inference) due to one or more reasons. Preferably in certain embodiments, the one or more reasons may comprise a power limitation, UL resource for inference report is under cell Discontinuous Reception (DRX) idle period (e.g., the network node does not receive during cell DRX idle period), Timing Advance (TA) expired, and/or collision with other higher priority UL/Downlink (DL) channel/signal, and/or slot format for UL resource for the inference report is not flexible or UL, and/or no time instance of set B, and/or CSI-ReportConfig for inference is not applicable.

Alternatively and/or preferably in certain embodiments, if there is no inference report transmitted before the CSI reference timing (associated with a monitoring report) or there is no time instance of set C received before the CSI reference timing, the UE reports some specific information (in a monitoring report) related to "not ready for monitoring", or root cause or report the lowest quantity/metric, "CSI-ReportConfig for inference is not applicable". Alternatively in certain embodiments, if there is no inference report transmitted before the CSI reference timing (associated with a monitoring report) or there is no time instance of set C received before the CSI reference timing, the UE may trigger to report some specific information in a second report. Preferably in certain embodiments, the second report is triggered based on one or more conditions of an event is satisfied.

Figure 17:
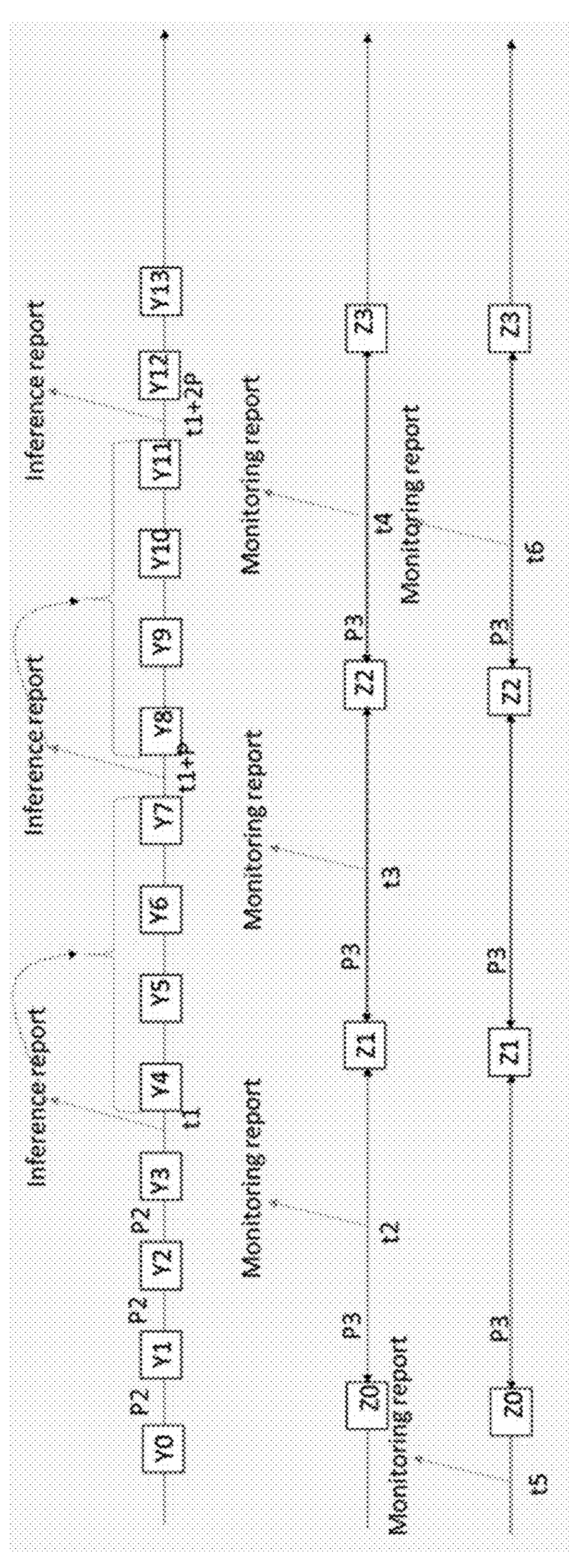
FIG. 17 is an example diagram showing that a 1-st timeline corresponds to the time instance of set A and timing of the inference report (e.g., t1, t1+P, t1+2P) and a 2-nd timeline and 3-rd timeline corresponds to two cases of time instance of set C and timing of the monitoring report, in accordance with embodiments of the present invention.

As such, for BM case 2, the UE could be configured with a number of time instances of set A (e.g., N) associated with an inference report (e.g., temporal prediction). In order to have better assistance from a UE to a network node for managing AI/ML model performance, CSI-ReportConfig for performance monitoring could be introduced. For BM case 2, the UE will, based on the AI/ML model, generate or determine inference result(s) associated with the number of time instances of set A. However, since there are inference result(s) associated with the number of time instances of set A, how to configure dedicated CSI-ReportConfig for performance monitoring and set C may need further design. In one example for illustrating the issue, in FIG. 17, the 1-st timeline corresponds to the time instance of set A and timing of the inference report (e.g., t1, t1+P, t1+2P) and the 2-nd timeline and 3-rd timeline corresponds to two cases of time instance of set C and timing of the monitoring report (e.g., t2, t3, t4, which could have a periodic characteristic for the 2-nd timeline, and/or t5, t6 which could have a periodic characteristic for the 3-rd timeline), wherein CSI-ReportConfig for monitoring (for 2-nd or 3-rd timeline) is associated with CSI-ReportConfig for inference (for 1-st timeline). Preferably in certain embodiments, taking the 1-st and 2-nd timelines as an example, it is not clear whether Z1 is comparing which inference result corresponding to Y4~Y7. Preferably in certain embodiments, one measurement result from set C in Z1 may merely reflect coherence time around Z1 which means Y4 and Y5 could be used to have a performance check. However, the network node does not have information whether the inference result of Y6 and Y7 is good or not and whether there is a need to adjust for the AI/ML model or the number of time instances of set A (associated with one inference report). Preferably in certain embodiments, taking the 1-st and 3-rd timeline as an example, the monitoring report will be configured with periodicity longer than periodicity of the inference report or considering there may be more than one timing of inference report associated with one monitoring report. What should the UE report may need further design?

Configuration of set C:

For BM case 2 (temporal prediction), the UE expects to be configured with a same number of time instances associated with a number of time instances of set A in one inference report. Preferably in certain embodiments, the UE expects to be configured with at least one time instance of set C to be associated with one inference report.

Alternatively and/or preferably in certain embodiments, the UE expects to be configured with a second number of time instances of set C (associated with one monitoring report) to be associated with a first number of time instances of set A in one inference report. Preferably in certain embodiments, the second number could be smaller than or equal to the first number. Preferably in certain embodiments, the second number should be larger than one. Preferably in certain embodiments, the second number could be one. Preferably in certain embodiments, the second number should be larger than or equal to the first number. Preferably in certain embodiments, the second number of set C could correspond to down-sampling of the first number of set A.

The UE may send a monitoring report indicating more than one (reported) performance metric, which may correspond to or be associated with multiple timing offsets, referring to the timing of sending the inference report. It allows the network to get a comprehensive understanding of the relationship between different inference timings and the variation in prediction quality. It is also possible that the monitoring report indicates one reported performance metric (for a specific timing) or one or more timings if the corresponding performance metric(s) meet a specific rule based on configuration.

A monitoring report may comprise #number of reported performance metrics associated with CSI-ReportConfig for monitoring, wherein the #number of reported performance metrics could be determined based on any of the following bullets:

- The #number of reported performance metrics of CSI-ReportConfig for monitoring will be determined based on #number of time instances of set A (BM case 2),
- The #number of reported performance metrics of CSI-ReportConfig for monitoring will be determined based on #number of time instances of set C (BM case 2),
- The #number of reported performance metrics of CSI-ReportConfig for monitoring will be determined based on #number of inference reports associated with linked CSI-ReportConfig for inference (BM case 2),
- The #number of reported performance metrics of CSI-ReportConfig for monitoring will be explicitly configured or determined by #number of time instances of set A, #number of time instances of set C, information of mask, one or more bit-maps or one or more monitoring windows, or
- The #number of reported performance metrics of CSI-ReportConfig for monitoring will be determined as one.

Preferably in certain embodiments, the UE determines #number of reported performance metrics in a monitoring report based on an explicit signal or implicit method.

Preferably in certain embodiments, the following may relate to how the UE determines one measurement result. Preferably in certain embodiments, the following may relate to how the UE selects/determines a single measurement result in a measurement report.

Based on one or more rules listed in the bullets below, the UE could determine one/single performance metric (in one monitoring report) associated with which time instance (if the UE has multiple time instances of set C):

- The UE should indicate which time instance of set C corresponds to the lowest metric, or the UE should indicate which time instance of set A corresponds to the lowest (performance) metric,
- The UE applies filtering among the multiple time instances of set C (e.g., average, performing weighting according to ascending timing or closer timing), and/or the UE may perform an average operation for the one/single measurement result,
- The UE reports which time instance with the (performance) metric being lower than a threshold,
- The UE could be configured with whether to report according to the latest time instance of set C,
- The UE (always) reports a (very) first time instance of set C (between two consecutive monitoring reports) associated with the monitoring report (the monitoring report is one of the later report of the two consecutive monitoring reports), or
- UE (always) reports a (very) last time instance (between two consecutive monitoring reports) associated with the monitoring report (the monitoring report is one of the later reports of the two consecutive monitoring reports).

Preferably in certain embodiments, the time instance of set C could be replaced by the time instance of set A. Preferably in certain embodiments, the time instance of set C could be replaced by the time instance of the inference report. Preferably in certain embodiments, the timing of the inference report should be determined being earlier than a CSI reference resource or a CSI reference timing associated with a time instance of a monitoring report. Preferably in certain embodiments, the time instance of set C should be determined being earlier than a CSI reference resource or a CSI reference timing associated with a time instance of a monitoring report. Preferably in certain embodiments, the time instance of set A should be determined being earlier than a CSI reference resource or a CSI reference timing associated with a time instance of a monitoring report.

Preferably in certain embodiments, the #number of the time instance of set A may be further limited into any two consecutive time instances of the monitoring report associated with linked CSI-ReportConfig for monitoring.

Preferably in certain embodiments, the #number of the time instance of set C may be further limited into any two consecutive time instances of monitoring report associated with linked CSI-ReportConfig for monitoring.

Preferably in certain embodiments, the #number of the inference report associated with linked CSI-ReportConfig for inference may be further limited into any two consecutive time instances of the monitoring report associated with linked CSI-ReportConfig for monitoring.

Preferably in certain embodiments, the explicit configuration for the #number of performance metrics could be via CSI-ReportConfig for monitoring, CSI-ReportConfig for inference, trigger state, or a monitoring window.

Figure 20:
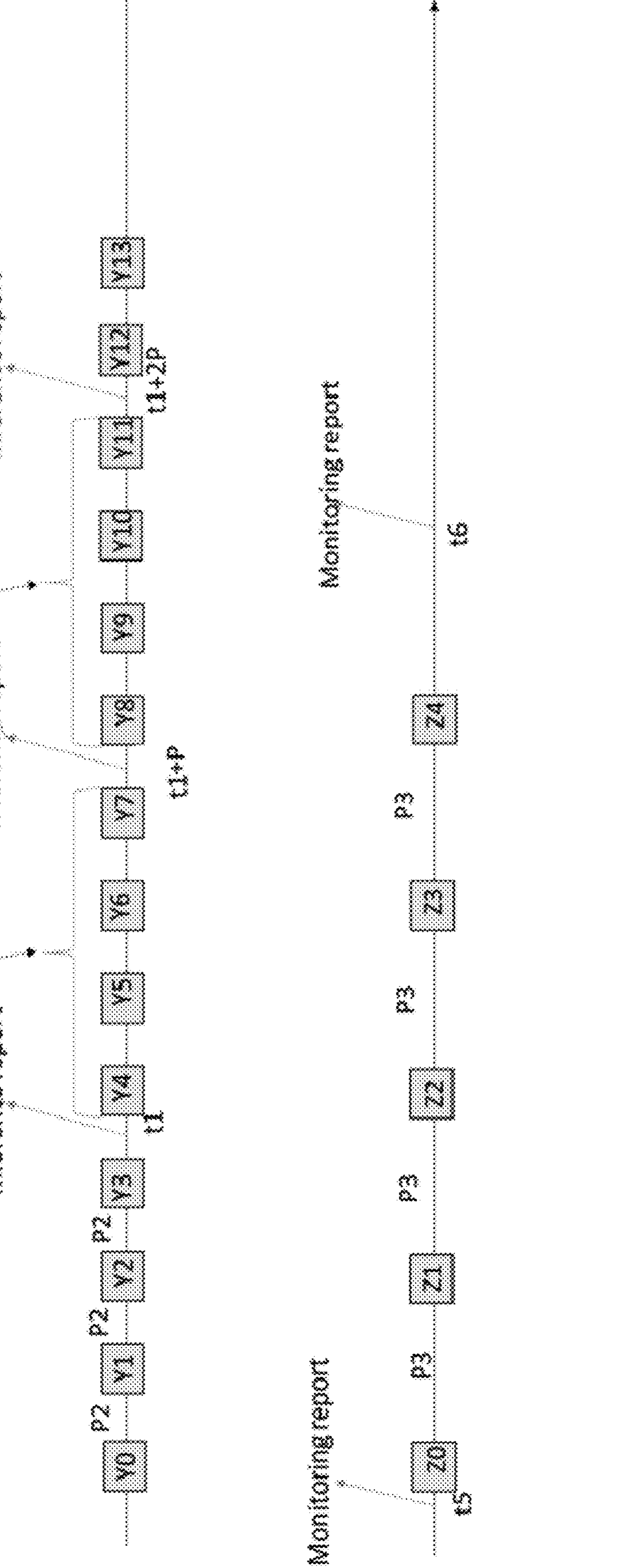
FIG. 20 is an example diagram showing the assumption that there is more than one time instance of set C associated with a monitoring report to be transmitted in t6, in accordance with embodiments of the present invention.

Preferably in certain embodiments, no matter if one inference report comprises one or more inference results, the UE determines a single performance metric for the one inference report in a monitoring report. Preferably in certain embodiments, a number of time instances of set C could be configured with the same or different as a number of time instances of set A with an inference result that the one inference report provides. Preferably in certain embodiments, the UE expects to be configured at least one time instance of set C associated with one inference report. Preferably in certain embodiments, the UE expects periodicity of set C is the same as periodicity of the inference report. Preferably in certain embodiments, subframe offset, slot offset, or milliseconds offset between each time instance of set C and time instance of the inference report could be equal or larger than 0. Preferably in certain embodiments, CSI-ReportConfig for monitoring will be associated with one set C. Preferably in certain embodiments, the ID of CSI-ReportConfig for inference will be indicated by CSI-ReportConfig for monitoring, and the one set C is associated with CSI-ReportConfig for inference. Preferably in certain embodiments, the UE could be configured with more time instances of set C associated with one time instance of the inference report. Alternatively in certain embodiments, the UE could be configured with one time instance of set C associated with more than one time instance of inference reports. Alternatively in certain embodiments, the UE could be configured with a number of reported performance metrics to be transmitted in a monitoring report. Preferably in certain embodiments, the number or reported performance metrics could be per time instance of the inference report, or per time instance of set A. In FIG. 20, when determining a monitoring report, the UE may determine the number of reported performance metrics for each time instance of the inference report (during t5 and t6 or associated with the time instance of the monitoring report in t6, e.g., inference report in t1 and inference report in t1+P), or the UE may determine the number of reported performance metrics for each time instance of set A (e.g., Y0~Y9).

Preferably in certain embodiments, in a measurement report, the UE may provide information associated with which time instance of set C corresponds to the lowest metric. Alternatively in certain embodiments, "time instance of set C" could be replaced by "time instance of inference report". Alternatively in certain embodiments, "time instance of set C" could be replaced by "time instance of set A". In one example, in FIG. 20, when reporting a single performance metric in a monitoring report, the UE would indicate this single performance metric is associated with which time instance of set C. In this example, a 5 bits bit-map associated with a monitoring report in t6 could indicate the single performance metric is associated with which time instance of set C (e.g., Z0~Z4). Preferably in certain embodiments, the 5 time instance of set C is associated with timing of a monitoring report (e.g., t6) or is between two consecutive monitoring reports (e.g., t5 and t6) associated with one CSI-ReportConfig for monitoring. In an alternative example, a 2 bits bit-map could be used to indicate the single performance metric is associated with which time instance of the inference report (e.g., t1, t1+P)

Preferably in certain embodiments, the UE may apply filtering for the more than one measurement result on the multiple time instances of set C. Preferably in certain embodiments, there may be some weighting value for each of the multiple time instances of set C. Preferably in certain embodiments, the multiple time instances of set C are associated with one time instance of a monitoring report. Preferably in certain embodiments, the weighting value could be predefined or configured by a network node.

Preferably in certain embodiments, the UE may report which time instance with the performance metric is lower than a threshold. Preferably in certain embodiments, the monitoring report comprises information that which time instance with performance metric is lower than a threshold. Preferably in certain embodiments, if all time instances are with performance metric larger than or equal to the threshold, the UE could skip transmitting and/or generating/determining the measurement report. Preferably in certain embodiments, information of which time instance with performance metric is lower than a threshold could be a bit-map. Preferably in certain embodiments, one/each bit of the bit-map corresponds to one time instance. Preferably in certain embodiments, the time instance could be the time instance of set A, or the time instance of set C, or the time instance of the inference report.

Preferably in certain embodiments, the UE could be configured to report based on latest the time instance of set C. Preferably in certain embodiments, based on whether configure this configuration or not, the UE could determine whether to report (always) based on the latest time instance of set C. Preferably in certain embodiments, the latest time instance of set C should be limited to be earlier than a CSI reference resource or CSI reference timing associated with a time instance of a monitoring report.

Preferably in certain embodiments, (based on an implicit method), the UE could determine to report based on the (very) first time instance of set C.

Preferably in certain embodiments, (based on an implicit method), the UE could determine to report based on the (very) last time instance of set C.

Preferably in certain embodiments, one CSI-ReportConfig for monitoring could be configured with more than one performance metric.

Preferably in certain embodiments, one CSI-ReportConfig for monitoring could be configured with more than one CSI-ReportConfig for inference. Preferably in certain embodiments, one CSI-ReportConfig for monitoring could be configured with more than one ID of CSI-ReportConfig for inference. Preferably in certain embodiments, the more than one CSI-ReportConfig may be configured for spatial prediction and temporal prediction. Preferably in certain embodiments, one time instance set C could be used to determine one performance metric for one CSI-ReportConfig for inference (temporal prediction) and another performance metric for another one CSI-ReportConfig for inference (spatial prediction). Preferably in certain embodiments, this may depend on the UE's capability to have one CSI-ReportConfig for monitoring configured with more than one CSI-ReportConfig for inference. Preferably in certain embodiments, when transmitting and/or generating a monitoring report associated with the one CSI-ReportConfig for monitoring, the monitoring report may comprise the one performance metric and the another one performance metric. Preferably in certain embodiments, the monitoring report may comprise more than one "the one performance metric". Preferably in certain embodiments, the more than one "the one performance metric" may be generated or determined per time instance of the inference report or per time instance of set A or per time instance of set C. Preferably in certain embodiments, the more than one "the another performance metric" may be generated or determined per time instance of the inference report or per time instance of set A or per time instance of set C.

Preferably in certain embodiments, one CSI-ReportConfig for inference (e.g., a first CSI-ReportConfig) could be configured to be associated with one or more than one CSI-ReportConfig for monitoring. Preferably in certain embodiments, the more than one CSI-ReportConfig for monitoring comprises at least a second CSI-ReportConfig for monitoring and a third CSI-ReportConfig for monitoring. Alternatively in certain embodiments, one limitation is that the UE does not expect that one CSI-ReportConfig for inference is configured to be associated with more than one CSI-ReportConfig for monitoring. Preferably in certain embodiments, the second CSI-ReportConfig could be configured with one set C with a first plurality of time instances. Preferably in certain embodiments, the third CSI-ReportConfig could be configured with another set C with a second plurality of time instances. Preferably in certain embodiments, the second CSI-ReportConfig could be configured with a first report quantity. Preferably in certain embodiments, the third CSI-ReportConfig could be configured with a second report quantity. Preferably in certain embodiments, both the second and the third CSI-ReportConfig are configured with a same report quantity (e.g., performance monitoring). Preferably in certain embodiments, the second CSI-ReportConfig could be configured with a first type performance metric. Preferably in certain embodiments, the third CSI-ReportConfig could be configured with a second type performance metric. Preferably in general, the UE could be configured with two CSI-ReportConfigs for managing an AI/ML model.

Preferably in certain embodiments, similar to the measurement window for set B, a concept of the monitoring window for set C could be introduced. Preferably in certain embodiments, the measurement window for set B could be replaced by the monitoring window for set C. Preferably in certain embodiments, the UE's behavior for monitoring/receiving set B could be replaced by the UE's behavior for monitoring/receiving set C. Preferably in certain embodiments, the monitoring window could be used for determining which time instance of set C needs to be monitored/received. Preferably in certain embodiments, the monitoring window is referenced to each time instance for the monitoring report. Preferably in certain embodiments, the monitoring window could be adjusted based on an RRC, MAC CE, and/or DCI signal. Preferably in certain embodiments, the monitoring window could be configured per associatedID, CSI-ReportConfig for monitoring, a trigger state. Preferably in certain embodiments, the monitoring window is used to determine one or more performance metrics in a monitoring report.

For example, in FIG. 11, there are three time instances of set C (e.g., Z0~Z2) during t5 and t6. When the UE determines or generates a monitoring report in t6, the UE determines three performance metrics based on a number of time instances of set C. Preferably in certain embodiments, each performance metric is associated with each of the three time instances of set C. Alternatively in certain embodiments, when the UE determines or generates a monitoring report in t6, the UE determines a number of performance metrics based on a number of inference reports during t5 and t6 (which the inference report is associated with the linked CSI-ReportConfig for inference). Alternatively in certain embodiments, when the UE determines or generates a monitoring report in t6, the UE determines one performance metric. Preferably in certain embodiments, the one performance metric is determined based on filtering one or more monitoring metrics (associated with one or more time instances of set B) or based on a performance metric corresponding to the lowest level. In this example, based on the measurement result from Z0, Z1, Z2, the UE could determine three performance metrics. The UE will determine the one performance metric to be provided in the monitoring report based on the performance metric associated with the lowest level (e.g., the worst prediction accuracy, or the largest RSRP difference). Alternatively in certain embodiments, the UE will determine the one performance metric to be provided in the monitoring report based on filtering or average the three performance metrics. Alternatively in certain embodiments, the UE could be configured with a number of metrics to be reported in a monitoring report. Preferably in certain embodiments, when the monitoring report (in t4) is configured with two performance metrics, the UE could determine two performance metrics based on the measurement result from Z2 and two of a plurality of time instances of set A associated with the latest (previous) inference report (which the inference report is associated with the linked CSI-ReportConfig for inference). For example, the UE could determine one performance metric based on the measurement result from Z2 and the prediction result from any two of Y8~Y11 which is indicated by the latest inference report in t+P.

Figure 18:
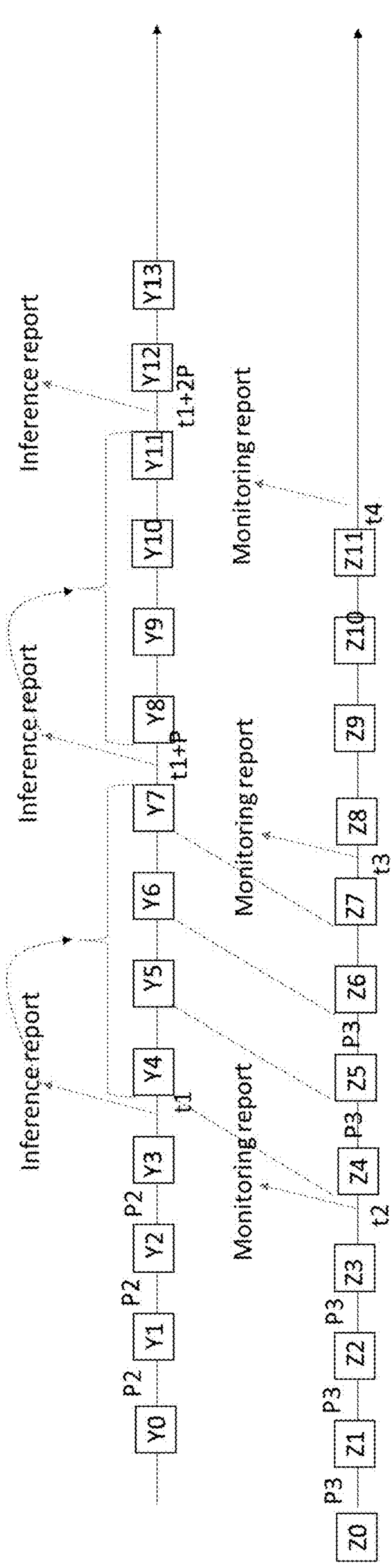
FIG. 18 is an example diagram showing a UE configured with set C to be associated with set A with one-to-one mapping, in accordance with embodiments of the present invention.

In FIG. 18, the UE is configured with set C to be associated with set A with one-to-one mapping. Preferably in certain embodiments, one time instance of set A is associated with one time instance of set C. Preferably in certain embodiments, the UE will perform measurement on set C. Preferably in certain embodiments, the UE assumes no set A on each time instance. Preferably in certain embodiments, when the UE generates or determines a monitoring report in t4, the UE could determine or generate four performance metrics in the monitoring report. Preferably in certain embodiments, the four performance metrics are determined based on {Z8, Y8}, {Z9, Y9}, {Z10, Y10}, {Z11, Y11}. Preferably in certain embodiments, Y8~Y11 corresponds to the time instance of set A which has an inference result being reported in a (latest) inference report (which is according to the linked CSI-ReportConfig for inference).

Figure 19:
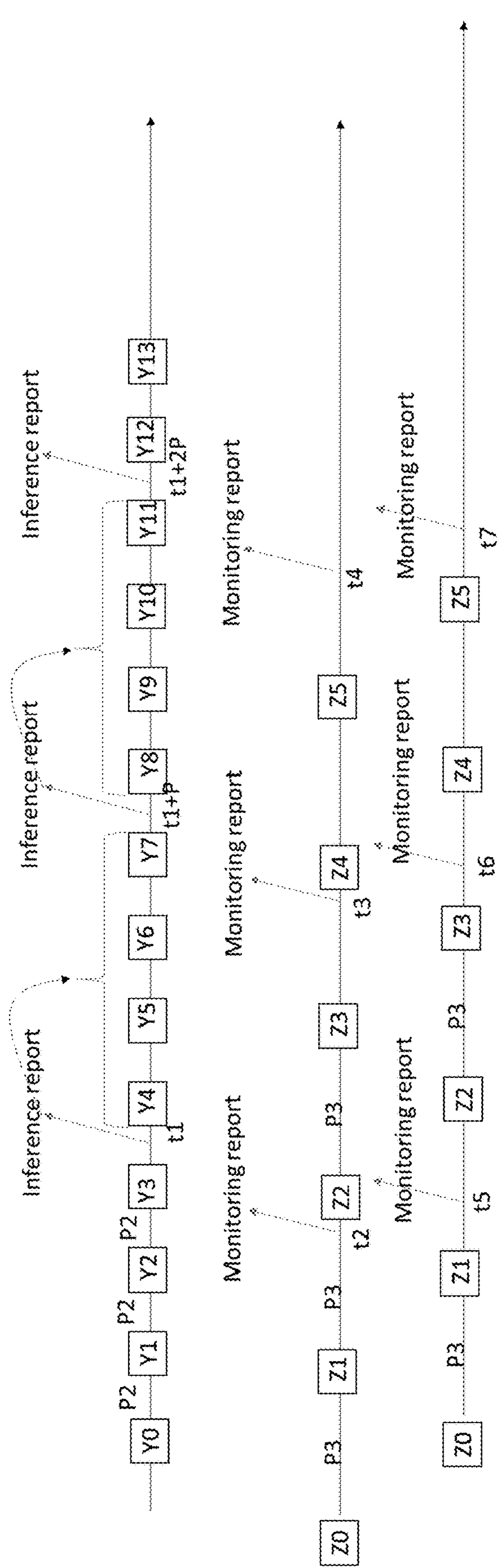
FIG. 19 is an example diagram showing that set C could be configured with more spares than set A (P3 is longer than P2), in accordance with embodiments of the present invention.

In FIG. 19, set C could be configured with more spares than set A (P3 is longer than P2). Any two consecutive timings of the monitoring report (e.g., t2, t3, t4) comprise two time instances of set C. Preferably in certain embodiments, when the UE determines a monitoring report in t4, the UE could determine 4 performance metrics based on a number of time instances of set A (e.g., Y8~Y11). Alternatively in certain embodiments, when the UE determines a monitoring report in t4, the UE could determine 2 performance metrics based on a number of time instances of set C (e.g., Z4, Z5). Preferably in certain embodiments, the UE could be configured or determine association between the time instance of set A and the time instance of set C. Preferably in certain embodiments, the time instance of set C (Zi) is associated with the time instance(s) of set $$A\left(Y\left(\frac{P3}{P2}i\right), Y\left(\frac{P3}{P2}i+1\right), \ldots\ Y\left(\frac{P3}{P2}(i+1)-1\right)\right).$$

In FIG. 19, the second timeline and the third timeline correspond to a different example of set C, wherein the third timeline corresponds to a down-sampling from the time instances of set A (without offset) while the second timeline may consider an offset between the time instance of set C and the time instance of set A.

In FIG. 20, assumes there is more than one time instance of set C associated with a monitoring report to be transmitted in t6. Based on a number of time instances of set C (associated with time instance t6) corresponding to five, the UE determines five performance metrics in the monitoring report. Alternatively in certain embodiments, based on a number of time instances of set A (associated with time instance t6) correspond to 10 (e.g., five time instance of set C times "P3/P2"). Alternatively in certain embodiments, based on a number of inference reports (associated with time instance t6) corresponding to two, the UE determines two performance metrics in the monitoring report. Alternatively in certain embodiments, the UE determines one performance metric in the monitoring report, wherein the one performance metric is determined based on filtering a plurality of performance metrics (e.g., 5, or 10 or 2).

Preferably in certain embodiments, Y8~Y11 is associated with Z4. Preferably in certain embodiments, the UE determines one (performance) metric based on one time instance of set C and one time instance of set A. In this example, the UE determines 4 (performance) metrics based on (Y8, Z4), (Y9, Z4), (Y10, Z4), and (Y11, Z4). Preferably in certain embodiments, for (Y8, Z4), the UE determines whether the Top-1/Top-K beam (or RS) corresponds to the inference result reported in t1+P for Y8. Preferably in certain embodiments, for (Y9, Z4), the UE determines whether the Top-1/Top-K beam (or RS) corresponds to the inference result reported in t1+P for Y9.

Alternatively and/or preferably in certain embodiments, only Y8 is associated with Z4. Preferably in certain embodiments, based on whether Zi is overlapping with which Yj, the UE determines association between Zi and Yj. In this example, the UE determines 1 (performance) metric based on (Y8, Z4). Preferably in certain embodiments, for (Y8, Z4), the UE determines whether the Top-1/Top-K beam (or RS) corresponds to the inference result reported in t1+P for Y8.

Alternatively and/or preferably in certain embodiments, a (coherent) window could be configured in respect to each time instance of set C. Preferably in certain embodiments, the (coherent) window could start from one time instance of set C and last an offset. Preferably in certain embodiments, the (coherent) window is used to determine whether one or more time instances of set A are included. Preferably in certain embodiments, based on the (coherent) window, the UE determines association Z4 and one or more Yis (e.g., Y8~Y11). Preferably in certain embodiments, based on the coherent window, the UE could determine that Z4 could associate with Y8. Preferably in certain embodiments, for (Y8, Z4), the UE determines whether the Top-1/Top-K beam (or RS) corresponds to the inference result reported in t1+P for Y8.

In one example, in FIG. 20, based on the (coherent) window for each Zi to be associated with two Yjs, the UE could determine 10 performance metrics. Preferably in certain embodiments, the 10 performance metrics are determined based on (Z0, Y0), (Z0, Y1), (Z1, Y2), (Z1, Y2), (Z2, Y4), (Z2, Y5), (Z3, Y6), (Z3, Y7), (Z4, Y8), (Z4, Y9).

Preferably in certain embodiments, a monitoring report in t6 (e.g., in FIG. 20) may comprise a single performance metric. Preferably in certain embodiments, the single performance metric may correspond to a lowest performance metric. Preferably in certain embodiments, the UE will report which time instance or a pair of time instances of set A and set C. Preferably in certain embodiments, assuming two time instances are associated with one time instance of set C, when the UE indicates which time instance pair, the UE should indicate one of Z0~Z4, and either the first or the second associated time instance of set A.

Alternatively and/or preferably in certain embodiments, there are multiple time instances of set A associated with one time instance of set C. The UE could determine one performance metric (for the multiple time instances of set A and the one time instance of set C). The UE could determine whether the Top-1/Top-K beam (or RS) is associated with any prediction result in any one of the multiple time instances of set A.

Preferably in certain embodiments, when a UE is configured with a CSI-ReportConfig associated with RSRP, CQI, PMI, RI (e.g., legacy report quantity), the UE determines one measurement result from a plurality of time instances associated with the measurement RS associated with the CSI-ReportConfig.

Preferably in certain embodiments, a measurement window and a prediction window could correspond to a sliding window. Preferably in certain embodiments, sliding means that a window may have the following characteristics [tj, tk], [tj+step, tk+step], [tj+i*step, tk+i*step], i=0, 1, 2, . . . , wherein a step may correspond to a sliding step (e.g., one time instance of set B or one slot or one Transmission Time Interval (TTI) or one symbol).

Alternatively in certain embodiments, a measurement window and a prediction window could correspond to an interleaving window.

Preferably in certain embodiments, a measurement window and a prediction window could correspond to sliding window. Preferably in certain embodiments, interleaving means that a measurement window may have the following characteristics [tj, tk] [tn, td], and a prediction window may have the following characteristics following the measurement window [tk+step, tm], [td+step, tc].

Preferably in certain embodiments, when determining one performance metric, the UE determines the one performance metric based on one prediction result (associated with one time instance of set A/B) and the Top-1/Top-K beam (or RS) in set C (associated with one time instance of set C) according to measurement of set C.

Preferably in certain embodiments, the Top-1/Top-K beam corresponds to a higher Layer 1 (L1)/Layer 3 (L3) RSRP associated with an RS among an RS set.

Preferably in certain embodiments, the lowest performance metric may mean or correspond that there is no Top-1/Top-K beam (or RS) in set C (associated with one time instance of set C) according to the measurement of set C being associated with one prediction result.

Preferably in certain embodiments, the lowest performance metric may be indicated by a specific bit or codepoint or specific information.

Preferably in certain embodiments, performance metric and metric could be inter-exchangeable.

Preferably in certain embodiments, performance metric could be replaced by measurement result of set C.

Preferably in certain embodiments, one TTI corresponds to one slot, one subframe, one sub-slot, one symbol, a set of consecutive symbols.

Preferably in certain embodiments, set A corresponds to a set of RSs (for inference).

Preferably in certain embodiments, set B corresponds to a set of RSs (for measurement).

Preferably in certain embodiments, set C corresponds to a set of RSs (for measurement)

Preferably in certain embodiments, CSI-ReportConfig corresponds to one CSI report configuration or one CSI report setting.

Preferably in certain embodiments, CSI-ReportConfig could be replaced by a report setting for inference.

Preferably in certain embodiments, inference and prediction could be inter-exchangeable.

Preferably in certain embodiments, the time instance of set A could be replaced by the time instance for inference.

Preferably in certain embodiments, the timing of the inference report could be replaced by the timing of the PUCCH or PUSCH resource for the inference report.

Preferably in certain embodiments, the ending position of a measurement window is reference to the time instance of the report (associated with inference).

Preferably in certain embodiments, the ending position of a measurement window could be a last RS position of set B in a last time instance with respect to a time instance of an inference report.

Preferably in certain embodiments, the starting position of a measurement window could be an earliest RS position of set B in an earliest N time instance (if size of the measurement window comprises N time instances of the set B) with respect to a time instance of an inference report.

Preferably in certain embodiments, the starting position of a prediction window is referenced to a last time instance of set B (in a corresponding measurement window).

Preferably in certain embodiments, the starting position of a prediction window could be an earliest RS position of set A in an earliest time instance (with an offset) to a last time instance of set B (in a corresponding measurement window).

Preferably in certain embodiments, the ending position of a prediction window could be a last RS position of set A in an M-th time instance (if size of the prediction window comprises M time instances of the set A) with respect to a last time instance of set B (in a corresponding measurement window).

Preferably in certain embodiments, the number of time instances of set B (or a measurement window) associated with a time instance of a report is earlier than the time instance of the report.

Preferably in certain embodiments, the measurement window could be replaced by a number of time instances for measurement (associated with inference). In one example, determining a measurement window could be replaced by determining a number of time instances for measurement (associated with inference).

Throughout the present disclosure, the UE does not perform beam sweeping and/or measurement for a whole set A.

Throughout the present disclosure, a beam report or AI/ML inference result corresponds to a CSI report associated with one or more L1-RSRPs and/or L3-RSRPs and/or one or more resources indexes/indicators/IDs.

For aperiodic CSI reporting, the UE could be configured with a plurality of trigger states. Configuration of a trigger state corresponds to CSI-AperiodicTriggerState or CSI-AssociatedReportConfigInfo. One trigger state could be configured with one CSI report setting (e.g., by CSI-ReportConfigId). One CSI report setting (e.g., CSI-ReportConfig) provides at least one CSI resource setting (e.g., by CSI-ResourceConfigId) and Quantity (e.g., reportQuantity). Based on the configured one CSI report setting, the UE could determine which CSI resource setting for one or more resources or AP CSI RS associated with the trigger state. One trigger state could be configured with one or more resources or AP CSI RS (e.g., by resourcesForChannel) which is associated with one CSI resource setting). Preferably in certain embodiments, the UE could be configured with Quasi Co-Location (QCL) information for each AP CSI RS of the one or more AP CSI RS or each resource of one or more resources associated with one trigger state. One CSI resource setting (e.g., CSI-ResourceConfig) indicates one or more CSI RS resources, time domain behavior of the one or more CSI RS resources (e.g., aperiodic, periodic, semi-persistent) and indicates which DL Bandwidth Part (BWP) for the one CSI resource setting (and one or more CSI RS resources). One CSI resource could correspond to a Non-Zero Power (NZP)-CSI-RS-Resource.

For the methods, alternatives, concepts, examples, and embodiments detailed above and herein, the following aspects and embodiments are possible.

Figure 21:
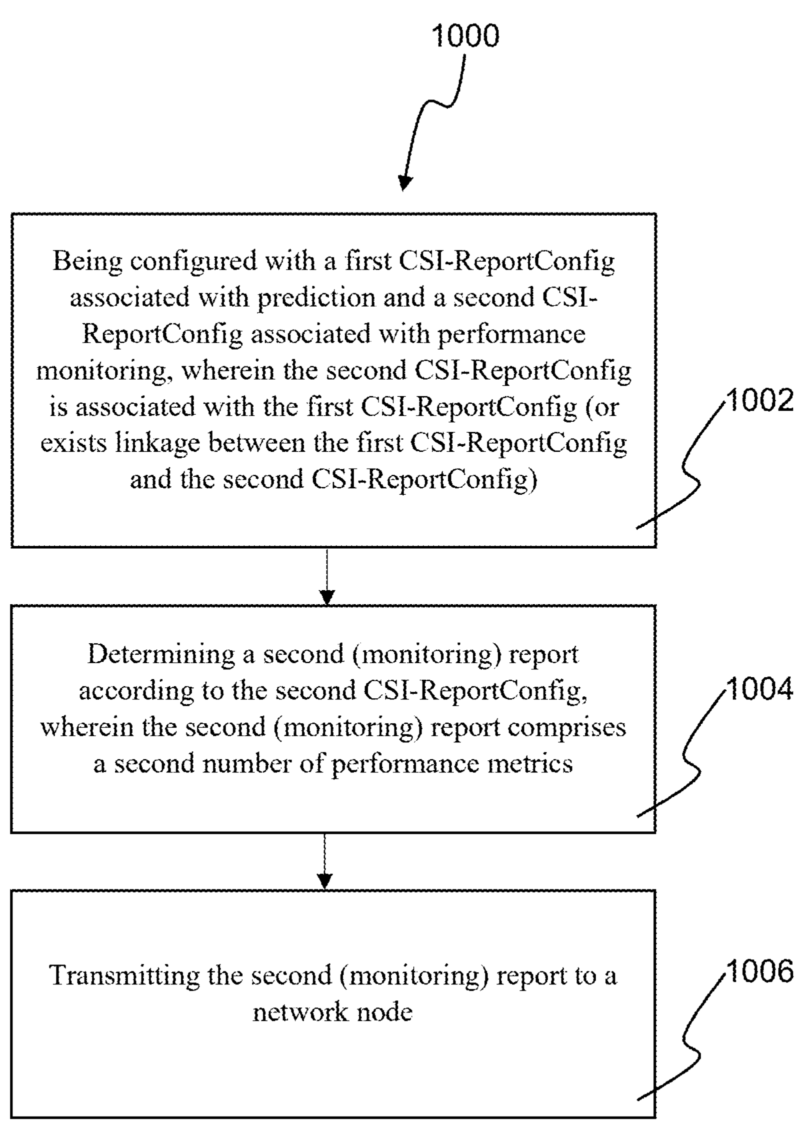
FIG. 21 is a flow diagram of a method of a UE in a wireless communication system comprising being configured with a first CSI-ReportConfig associated with prediction and a second CSI-ReportConfig associated with performance monitoring, determining a second (monitoring) report according to the second CSI-ReportConfig, and transmitting the second (monitoring) report to a network node, in accordance with embodiments of the present invention.

Referring to FIG. 21, with this and other concepts, systems, and methods of the present invention, a method 1000 for a UE in a wireless communication system comprises being configured with a first CSI-ReportConfig associated with prediction and a second CSI-ReportConfig associated with performance monitoring, wherein the second CSI-ReportConfig is associated with the first CSI-ReportConfig (or exists linkage between the first CSI-ReportConfig and the second CSI-ReportConfig) (step 1002), determining a second (monitoring) report according to the second CSI-ReportConfig, wherein the second (monitoring) report comprises a second number of performance metrics (step 1004), and transmitting the second (monitoring) report to a network node (step 1006).

Preferably in certain embodiments, the second number of performance metrics is determined based on a number of time instances of an prediction report (according to the first CSI-ReportConfig), a number of time instances of a second RS set (e.g., set A), or a number of time instances of a third RS set (e.g., set C), and/or the first RS set is configured to be associated with the first CSI-ReportConfig, and/or the third RS set is configured to be associated with the second CSI-ReportConfig, and/or the number of time instances of the prediction report corresponds to a time instance of the prediction report within two (consecutive) periodic time instances of a monitoring report (according to the second CSI-ReportConfig), and/or the number of time instances of the second RS set corresponds to a time instance of the second RS set within two (consecutive) periodic time instances of the monitoring report (according to the second CSI-ReportConfig), and/or the number of time instances of the third RS set corresponds to a time instance of the third RS set within two (consecutive) periodic time instances of the monitoring report (according to the second CSI-ReportConfig).

Preferably in certain embodiments, the number of performance metrics is determined based on one or more parameters, and/or the one or more parameters are configured per CSI-ReportConfig associated with monitoring.

Preferably in certain embodiments, the second number of performance metrics comprise more than one report quantity (e.g., two quantity) per time instance, and/or the per time instance corresponds to a time instance of the prediction report, time instance of the second RS set, or the third RS set, and/or the more than one report quantity is configured via the second CSI-ReportConfig, and/or the more than one report quantity is configured with an RSRP difference, prediction accuracy, probability of prediction, whether the Top-1/Top-K beam (or RS) from the third RS set is associated with a predicted Top-1/Top-K beam associated with the second RS set, and/or whether to report the more than one report quantity per time instance is configured via the second CSI-ReportConfig, and/or the UE reports whether to support reporting more than one report quantity per time instance associated with one CSI-ReportConfig (associated with monitoring).

Preferably in certain embodiments, the second number of performance metrics corresponds to one or a single performance metric, and/or the one or single performance metric is determined based on the (very) first time instance associated with the third RS set, and/or the one or single performance metric is determined based on the (very) latest time instance associated with the third RS set, and/or the one or single performance metric is determined based on the (very) first time instance associated with the prediction report, and/or the one or single performance metric is determined based on the (very) latest time instance associated with the prediction report, and/or the one or single performance metric is determined based on the (very) first time instance associated with the second RS set, and/or the one or single performance metric is determined based on the (very) latest time instance associated with the second RS set.

Preferably in certain embodiments, based on the first CSI-ReportConfig, the UE transmits a first (prediction) report comprising prediction result(s) associated with a first number of time instances of the second RS set, and/or the UE expects the third RS set configured to be associated with the second CSI-ReportConfig should have a one-to-one time instance mapping to the first number of time instances of the second RS set (e.g., periodicity should be the same between the second RS set and the third RS set), and/or the UE could be configured with multiple-to-one between the time instance of the second RS set to the time instance of the third RS set, and/or the UE could be configured with multiple-to-one between the time instance of the third RS set to the time instance of the second RS set.

Preferably in certain embodiments, the UE expects to be configured with at least one time instance of the third RS set (associated with the second CSI-ReportConfig) per time instance of the prediction report (associated with the first CSI-ReportConfig), and/or the UE does not expect that no time instance of the third RS set to be associated with the time instance of the prediction report (associated with the first CSI-ReportConfig).

Preferably in certain embodiments, the periodicity of the third RS set should be in multiple integer numbers of periodicity of the second RS set, and/or the UE could be configured with some offset between the time instance of the second RS set and the time instance of the third RS set, and/or at least one time instance of the third RS set and one time instance of the second RS set (fully or partially) overlap in time domain, and/or the UE expects that the third RS set is configured with some time instance (partially or fully) overlapping with the time instance of the second RS set in time domain, and/or the overlapping between the time instance of the second RS set and the time instance of the third RS set is to determine which pair of time instances is to determine the second number of performance metrics, and/or the UE determines the second number of performance metrics based on a number of overlapped time instances of the second RS set and the time instance of the third RS set.

Preferably in certain embodiments, the UE is configured with a monitoring window, and/or the monitoring window is configured associated with third RS set, and/or the monitoring window is configured associated with the second CSI-ReportConfig, and/or the UE monitors the time instance of the third RS set within the monitoring window, and/or the UE does not monitor the time instance of the third RS set outside the monitoring window, and/or the UE determines or starts a monitoring window in response to transmitting an prediction report (according to the first CSI-ReportConfig), and/or a length or size of the monitoring window is determined or configured to be the same as periodicity of the prediction report, and/or the length or size of the monitoring window is determined or configured to be the same as periodicity of the monitoring report.

Preferably in certain embodiments, a different CSI-ReportConfig for prediction could be configured with or determined with a same or different value of the measurement window.

Preferably in certain embodiments, if both a starting position and ending position of a time instance are later than a starting position of a window (e.g., coherent/coherent/measurement/prediction/monitoring), the time instance is within the window (or the window comprises the time instance), and/or if only the ending position of a time instance is later than a starting position of a window (e.g., coherent/measurement/prediction/monitoring), the time instance is not within the window (or the window does not comprise the time instance), and/or if both the starting position and ending position of a time instance are earlier than an ending position of a window (e.g., coherent/measurement/prediction/monitoring), the time instance is within the window (or the window comprises the time instance), and/or if only the starting position of a time instance is earlier than a starting position of a window (e.g., coherent/measurement/prediction/monitoring), the time instance is not within the window (or the window does not comprise the time instance).

Preferably in certain embodiments, if only the ending position of a time instance is later than a starting position of a window (e.g., coherent/measurement/prediction/monitoring), the time instance could be within the window (or the window could comprise the time instance), and/or if only the starting position of a time instance is earlier than a starting position of a window (e.g., coherent/measurement/prediction/monitoring), the time instance could be within the window (or the window could comprise the time instance).

Preferably in certain embodiments, the UE does not expect to be configured with a window such that only the ending position of a time instance is later than a starting position of a window (e.g., coherent/measurement/prediction/monitoring) or only the starting position of a time instance is earlier than a starting position of a window (e.g., coherent/measurement/prediction/monitoring).

Referring back to FIGS. 3 and 4, in one or more embodiments from the perspective of a UE in a wireless communication system, the device 300 includes a program code 312 stored in memory 310 of the transmitter. The CPU 308 could execute program code 312 to: (i) be configured with a first CSI-ReportConfig associated with prediction and a second CSI-ReportConfig associated with performance monitoring, wherein the second CSI-ReportConfig is associated with the first CSI-ReportConfig (or exists linkage between the first CSI-ReportConfig and the second CSI-ReportConfig); (ii) determine a second (monitoring) report according to the second CSI-ReportConfig, wherein the second (monitoring) report comprises a second number of performance metrics; and (iii) transmit the second (monitoring) report to a network node. Moreover, the CPU 308 can execute the program code 312 to perform all of the described actions, steps, and methods described above, below, or otherwise herein.

Note that any of above and herein methods, alternatives, examples, concepts, aspects, and embodiments can be combined or applied simultaneously, in whole or in part.

Referring to FIG. 22, with this and other concepts, systems, and methods of the present invention, a method 1010 for a UE in a wireless communication system comprises being configured with a first CSI-ReportConfig associated with prediction and a second CSI-ReportConfig associated with performance monitoring, wherein: the second CSI-ReportConfig is associated with the first CSI-ReportConfig or there exists linkage between the first CSI-ReportConfig and the second CSI-ReportConfig, and the second CSI-ReportConfig is configured with a third RS set (step 1012), generating one prediction report, associated with the first CSI-ReportConfig, providing prediction results associated with a first number of time instances for prediction, wherein the first number of time instances comprise a first time instance for prediction (step 1014), performing measurement on at least one time instance of the third RS set (step 1016), determining one performance metric based on at least whether the first time instance for prediction is within a window referenced to the at least one time instance of the third RS set and whether one or more Top-1 beams, Top-K beams, or RSs from the at least one time instance of the third RS set is associated with or maps to one or more predicted Top-1 beams, Top-K beams, or RSs associated with the first time instance for prediction (step 1018), and transmitting a monitoring report comprising at least information of the one performance metric to a network node (step 1020).

In various embodiments, the UE does not expect to be configured with the second CSI-ReportConfig as periodic and the first CSI-ReportConfig as aperiodic or semi-persistent, and/or the UE does not expect to be configured with the second CSI-ReportConfig as semi-persistent and the first CSI-ReportConfig as aperiodic.

In various embodiments, regardless of whether one prediction report comprises one or more prediction results associated with one or more time instances for prediction, the UE determines a single performance metric for the one prediction report in the monitoring report.

In various embodiments, each prediction result corresponds to one time instance for prediction, and/or each prediction result corresponds to one or more predicted Top-1 beams, Top-K beams, or RSs associated with a second RS set.

In various embodiments, the first CSI-ReportConfig is configured with a first RS set and a second RS set, the UE performs measurement on the first RS set, the UE generates or determines one prediction report, associated with the first CSI-ReportConfig, based on measurement on the first RS set, and/or the UE does not perform measurement on the second RS set.

In various embodiments, the UE generates or determines the monitoring report, associated with the second CSI-ReportConfig, based on measurement on the third RS set, the monitoring report comprises information associated with a second number of performance metrics, wherein the second number of performance metrics comprises the one performance metric, and/or the second number of performance metrics is configured via one or more parameters in the second CSI-ReportConfig.

In various embodiments, the window starts from each time instance of the third RS set and lasts an offset.

In various embodiments, the one or more Top-1 beams, Top-K beams, or RSs from the at least one time instance of the third RS set corresponds to a highest Top-1 beam, Top-K beam, L1-RSRP, or L3-RSRP among the third RS set, and/or the one or more predicted Top-1 beams, Top-K beams, or RSs from the first time instance for prediction in the one prediction report corresponds to a highest Top-1 beam, Top-K beam, L1-RSRP, or L3-RSRP among the second RS set.

In various embodiments, a timing of the one prediction report is earlier than a CSI reference resource or CSI reference timing associated with the monitoring report, a timing of the one prediction report is earlier than a timing of the monitoring report, the first time instance for prediction is not earlier than a timing of the prediction report, and/or the first time instance for prediction could be earlier than or later than a CSI reference resource or CSI reference timing associated with the monitoring report.

In various embodiments, the at least one time instance of the third RS set is earlier than a CSI reference resource or CSI reference timing associated with the monitoring report, the at least one time instance of the third RS set is later than a timing of the one prediction report, and/or the at least one time instance of the third RS set is earlier than the first time instance for prediction.

In various embodiments, if the first time instance for prediction is not within the window, the UE determines the one performance metric as no linkage or connection or that no Top-1 beam, Top-K beam, or RS from the at least one time instance of the third RS set is associated with or maps to the one or more predicted Top-1 beams, Top-K beams, or RSs associated with the first time instance for prediction, and/or if the first time instance for prediction is within the window, the UE determines the one performance metric based on whether one or more Top-1 beams, Top-K beams, or RSs from the at least one time instance of the third RS set is associated with or maps to the one or more predicted Top-1 beams, Top-K beams, or RSs associated with the first time instance for prediction.

In various embodiments, the first time instance for prediction corresponds to a latest time instance for prediction associated with the at least one time instance of the third RS set.

In various embodiments, the first number of time instances is one, or the first number of time instances is larger than one.

In various embodiments, the transmitting the monitoring report is under a condition that the UE has sufficient time instance of the third RS set for measurement.

In various embodiments, the UE drops (or does not transmit) the monitoring report if the UE has insufficient time instance of the third RS set for measurement.

In various embodiments, insufficient time instance of the third RS set for measurement corresponds to a number of time instances of the third RS set which the UE cannot determine the second number of performance metrics.

In various embodiments, insufficient time instance of the third RS set for measurement corresponds to a number of time instances of the third RS set which is smaller than the second number.

In various embodiments, insufficient time instance of the third RS set for measurement is in response to DL BWP change.

In various embodiments, insufficient time instance of the third RS set for measurement is in response to receiving (re) configuration for the second CSI-ReportConfig.

Referring back to FIGS. 3 and 4, in one or more embodiments from the perspective of a device (e.g., UE) in a wireless communication system, the device 300 includes a program code 312 stored in memory 310 of the transmitter. The CPU 308 could execute program code 312 to: (i) be configured with a first CSI-ReportConfig associated with prediction and a second CSI-ReportConfig associated with performance monitoring, wherein: the second CSI-ReportConfig is associated with the first CSI-ReportConfig or there exists linkage between the first CSI-ReportConfig and the second CSI-ReportConfig, and the second CSI-ReportConfig is configured with a third RS set; (ii) generate one prediction report, associated with the first CSI-ReportConfig, providing prediction results associated with a first number of time instances for prediction, wherein the first number of time instances comprise a first time instance for prediction; (iii) perform measurement on at least one time instance of the third RS set; (iv) determine one performance metric based on at least whether the first time instance for prediction is within a window referenced to the at least one time instance of the third RS set and whether one or more Top-1 beams, Top-K beams, or RSs from the at least one time instance of the third RS set is associated with or maps to one or more predicted Top-1 beams, Top-K beams, or RSs associated with the first time instance for prediction; and (v) transmit a monitoring report comprising at least information of the one performance metric to a network node. Moreover, the CPU 308 can execute the program code 312 to perform all of the described actions, steps, and methods described above, below, or otherwise herein.

Any combination of the above or herein concepts or teachings can be jointly combined, in whole or in part, or formed to a new embodiment. The disclosed details and embodiments can be used to solve at least (but not limited to) the issues mentioned above and herein.

It is noted that any of the methods, alternatives, steps, examples, and embodiments proposed herein may be applied independently, individually, and/or with multiple methods, alternatives, steps, examples, and embodiments combined together.

Various aspects of the disclosure have been described above. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. As an example of some of the above concepts, in some aspects, concurrent channels may be established based on pulse repetition frequencies. In some aspects, concurrent channels may be established based on pulse position or offsets. In some aspects, concurrent channels may be established based on time hopping sequences. In some aspects, concurrent channels may be established based on pulse repetition frequencies, pulse positions or offsets, and time hopping sequences.

Those of ordinary skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of ordinary skill in the art would further appreciate that the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

In addition, the various illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The steps of a method or algorithm described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Moreover, in some aspects, any suitable computer-program product may comprise a computer-readable medium comprising codes relating to one or more of the aspects of the disclosure. In some aspects, a computer program product may comprise packaging materials.

While the invention has been described in connection with various aspects and examples, it will be understood that the invention is capable of further modifications. This application is intended to cover any variations, uses or adaptation of the invention following, in general, the principles of the invention, and including such departures from the present disclosure as come within the known and customary practice within the art to which the invention pertains.

What is claimed is:

1. A method of a User Equipment (UE), comprising:

being configured with a first Channel State Information (CSI)-ReportConfig associated with prediction and a second CSI-ReportConfig associated with performance monitoring, wherein:

the second CSI-ReportConfig is associated with the first CSI-ReportConfig or there exists linkage between the first CSI-ReportConfig and the second CSI-ReportConfig, and the second CSI-ReportConfig is configured with a third Reference Signal (RS) set;

generating one prediction report, associated with the first CSI-ReportConfig, providing prediction results associated with a first number of time instances for prediction, wherein the first number of time instances comprise a first time instance for prediction;

performing measurement on at least one time instance of the third RS set;

determining one performance metric based on at least whether the first time instance for prediction is within a window referenced to the at least one time instance of the third RS set and whether one or more Top-1 beams, Top-K beams, or RSs from the at least one time instance of the third RS set is associated with or maps to one or more predicted Top-1 beams, Top-K beams, or RSs associated with the first time instance for prediction, wherein a timing of the one prediction report is earlier than a CSI reference resource or CSI reference timing associated with a monitoring report; and transmitting the monitoring report comprising at least information of the one performance metric to a network node.

2. The method of claim 1, wherein:

the UE does not expect to be configured with the second CSI-ReportConfig as periodic and the first CSI-ReportConfig as aperiodic or semi-persistent, and/or the UE does not expect to be configured with the second CSI-ReportConfig as semi-persistent and the first CSI-ReportConfig as aperiodic.

3. The method of claim 1, wherein regardless of whether one prediction report comprises one or more prediction results associated with one or more time instances for prediction, the UE determines a single performance metric for the one prediction report in the monitoring report.

4. The method of claim 1, wherein each prediction result corresponds to one time instance for prediction, and/or each prediction result corresponds to one or more predicted Top-1 beams, Top-K beams, or RSs associated with a second RS set.

5. The method of claim 1, wherein:

the first CSI-ReportConfig is configured with a first RS set and a second RS set, the UE performs measurement on the first RS set, the UE generates or determines one prediction report, associated with the first CSI-ReportConfig, based on measurement on the first RS set, and/or the UE does not perform measurement on the second RS set.

6. The method of claim 1, wherein:

the UE generates or determines the monitoring report, associated with the second CSI-ReportConfig, based on measurement on the third RS set, the monitoring report comprises information associated with a second number of performance metrics, wherein the second number of performance metrics comprises the one performance metric, and/or the second number of performance metrics is configured via one or more parameters in the second CSI-ReportConfig.

7. The method of claim 1, wherein the window starts from each time instance of the third RS set and lasts an offset.

8. The method of claim 1, wherein:

the one or more Top-1 beams, Top-K beams, or RSs from the at least one time instance of the third RS set corresponds to a highest Top-1 beam, Top-K beam, Layer 1 (L1)-Reference Signal Received Power (RSRP), or Layer 3 (L3)-RSRP among the third RS set, and/or the one or more predicted Top-1 beams, Top-K beams, or RSs from the first time instance for prediction in the one prediction report corresponds to a highest Top-1 beam, Top-K beam, L1-RSRP, or L3-RSRP among the second RS set.

9. The method of claim 1, wherein:

a timing of the one prediction report is earlier than a timing of the monitoring report, the first time instance for prediction is not earlier than a timing of the prediction report, and/or the first time instance for prediction could be earlier than or later than a CSI reference resource or CSI reference timing associated with the monitoring report.

10. The method of claim 1, wherein:

the at least one time instance of the third RS set is earlier than a CSI reference resource or CSI reference timing associated with the monitoring report, the at least one time instance of the third RS set is later than a timing of the one prediction report, and/or the at least one time instance of the third RS set is earlier than the first time instance for prediction.

11. The method of claim 1, wherein:

if the first time instance for prediction is not within the window, the UE determines the one performance metric as no linkage or connection or that no Top-1 beam, Top-K beam, or RS from the at least one time instance of the third RS set is associated with or maps to the one or more predicted Top-1 beams, Top-K beams, or RSs associated with the first time instance for prediction, and/or if the first time instance for prediction is within the window, the UE determines the one performance metric based on whether one or more Top-1 beams, Top-K beams, or RSs from the at least one time instance of the third RS set is associated with or maps to the one or more predicted Top-1 beams, Top-K beams, or RSs associated with the first time instance for prediction.

12. The method of claim 1, wherein the first time instance for prediction corresponds to a latest time instance for prediction associated with the at least one time instance of the third RS set.

13. The method of claim 1, wherein the first number of time instances is one, or the first number of time instances is larger than one.

14. A User Equipment (UE), comprising:

a memory; and a processor operatively coupled with the memory, wherein the processor is configured to execute a program code to:

be configured with a first Channel State Information (CSI)-ReportConfig associated with prediction and a second CSI-ReportConfig associated with performance monitoring, wherein:

the second CSI-ReportConfig is associated with the first CSI-ReportConfig or there exists linkage between the first CSI-ReportConfig and the second CSI-ReportConfig, and the second CSI-ReportConfig is configured with a third Reference Signal (RS) set;

generate one prediction report, associated with the first CSI-ReportConfig, providing prediction results associated with a first number of time instances for prediction, wherein the first number of time instances comprise a first time instance for prediction;

perform measurement on at least one time instance of the third RS set;

determine one performance metric based on at least whether the first time instance for prediction is within a window referenced to the at least one time instance of the third RS set and whether one or more Top-1 beams, Top-K beams, or RSs from the at least one time instance of the third RS set is associated with or maps to one or more predicted Top-1 beams, Top-K beams, or RSs associated with the first time instance for prediction, wherein a timing of the one prediction report is earlier than a CSI reference resource or CSI reference timing associated with a monitoring report; and transmit the monitoring report comprising at least information of the one performance metric to a network node.

15. The UE of claim 14, wherein:

the UE does not expect to be configured with the second CSI-ReportConfig as periodic and the first CSI-ReportConfig as aperiodic or semi-persistent, and/or the UE does not expect to be configured with the second CSI-ReportConfig as semi-persistent and the first CSI-ReportConfig as aperiodic.

16. The UE of claim 14, wherein regardless of whether one prediction report comprises one or more prediction results associated with one or more time instances for prediction, the UE determines a single performance metric for the one prediction report in the monitoring report.

17. The UE of claim 14, wherein each prediction result corresponds to one time instance for prediction, and/or each prediction result corresponds to one or more predicted Top-1 beams, Top-K beams, or RSs associated with a second RS set.

18. The UE of claim 14, wherein:

the first CSI-ReportConfig is configured with a first RS set and a second RS set, the UE performs measurement on the first RS set, the UE generates or determines one prediction report, associated with the first CSI-ReportConfig, based on measurement on the first RS set, and/or the UE does not perform measurement on the second RS set.

19. The UE of claim 14, wherein:

the UE generates or determines the monitoring report, associated with the second CSI-ReportConfig, based on measurement on the third RS set, the monitoring report comprises information associated with a second number of performance metrics, wherein the second number of performance metrics comprises the one performance metric, and/or the second number of performance metrics is configured via one or more parameters in the second CSI-ReportConfig.

20. The UE of claim 14, wherein the window starts from each time instance of the third RS set and lasts an offset.

* * * * *